United States Patent
Kawakami et al.

(10) Patent No.: US 12,492,970 B2
(45) Date of Patent: Dec. 9, 2025

(54) CONTROL METHOD FOR TEST SYSTEM, CONTROL METHOD FOR SMEAR PREPARATION DEVICE, TEST SYSTEM, AND SMEAR PREPARATION DEVICE

(71) Applicant: Sysmex Corporation, Kobe (JP)

(72) Inventors: Daiki Kawakami, Kobe (JP); Seiya Shinabe, Kobe (JP); Tomoyuki Asahara, Kobe (JP)

(73) Assignee: Sysmex Corporation, Hyogo (JP)

( * ) Notice: Subject to any disclaimer, the term of this patent is extended or adjusted under 35 U.S.C. 154(b) by 315 days.

(21) Appl. No.: 18/333,256

(22) Filed: Jun. 12, 2023

(65) Prior Publication Data

US 2023/0408381 A1 Dec. 21, 2023

(30) Foreign Application Priority Data

Jun. 17, 2022 (JP) .................. 2022-098427

(51) Int. Cl.
*G01N 1/30* (2006.01)
*G01N 1/28* (2006.01)
*G01N 33/49* (2006.01)
*G06T 7/00* (2017.01)

(52) U.S. Cl.
CPC ............ *G01N 1/2813* (2013.01); *G01N 1/30* (2013.01); *G01N 33/49* (2013.01); *G06T 7/0002* (2013.01)

(58) Field of Classification Search
CPC ........ G01N 1/2813; G01N 1/30; G01N 33/49; G06T 7/0002
See application file for complete search history.

(56) References Cited

U.S. PATENT DOCUMENTS

| | | | | |
|---|---|---|---|---|
| 2014/0093423 | A1* | 4/2014 | Yamasaki | G01N 35/1081 422/65 |
| 2015/0153552 | A1 | 6/2015 | Loney et al. | |
| 2017/0343454 | A1* | 11/2017 | Nakanishi | G02B 21/34 |
| 2018/0088021 | A1* | 3/2018 | Oda | G01N 35/026 |

FOREIGN PATENT DOCUMENTS

| | | |
|---|---|---|
| JP | 2018-017691 A | 2/2018 |
| JP | 2018-017693 A | 2/2018 |
| JP | 2018-169283 A | 11/2018 |
| WO | 2021/102984 A1 | 6/2021 |

OTHER PUBLICATIONS

Extended European search report issued on Nov. 16, 2023 in a counterpart European patent application No. 23179181.5.

* cited by examiner

*Primary Examiner* — Ming Shui
(74) *Attorney, Agent, or Firm* — Crowell & Moring LLP

(57) ABSTRACT

Disclosed is a control method for a test system including a smear imaging unit configured to image a smear of a specimen, the control method including: preparing a plurality of the smears; sequentially storing, in a storing container capable of storing therein a plurality of the smears, the smears having been prepared; and transporting, when information about a standby situation for imaging processing by the smear imaging unit satisfies a predetermined condition, the storing container that stores therein the smears to the smear imaging unit regardless of the number of the smears stored in the storing container.

11 Claims, 24 Drawing Sheets

FIG. 13

| TRANSPORT MODE | TRANSPORT CONDITION | | | | | |
|---|---|---|---|---|---|---|
| | MAXIMUM NUMBER OF SMEARS ARE STORED IN STORING CONTAINER | UPON TRANSITION TO STANDBY STATE | UPON ELAPSE OF SETTING TIME FROM STORING OF FIRST SMEAR IN STORING CONTAINER | IS REMAINING TIME OF IMAGING PROCESSING FOR SMEARS IN STORING CONTAINER EQUAL TO OR SHORTER THAN REQUIRED-FOR-ARRIVAL TIME? | NO STORING CONTAINERS THAT HAVE STARTED TO BE TRANSPORTED ARE PRESENT AT PREDETERMINED POSITIONS ON TRANSPORT PATH | IS ESTIMATED REMAINING TIME OF IMAGING PROCESSING EQUAL TO OR SHORTER THAN REQUIRED-FOR-ARRIVAL TIME? |
| FIRST TRANSPORT MODE | ○ | | | | | |
| SECOND TRANSPORT MODE | ○ | ○ | | | | |
| THIRD TRANSPORT MODE | | ○ | ○ | | | |
| FOURTH TRANSPORT MODE | ○ | ○ | | ○ | ○ | |
| FIFTH TRANSPORT MODE | ○ | ○ | | | | ○ |

TRANSPORT CONDITION FULFILLMENT DETERMINATION PROCESS (FOURTH TRANSPORT MODE)

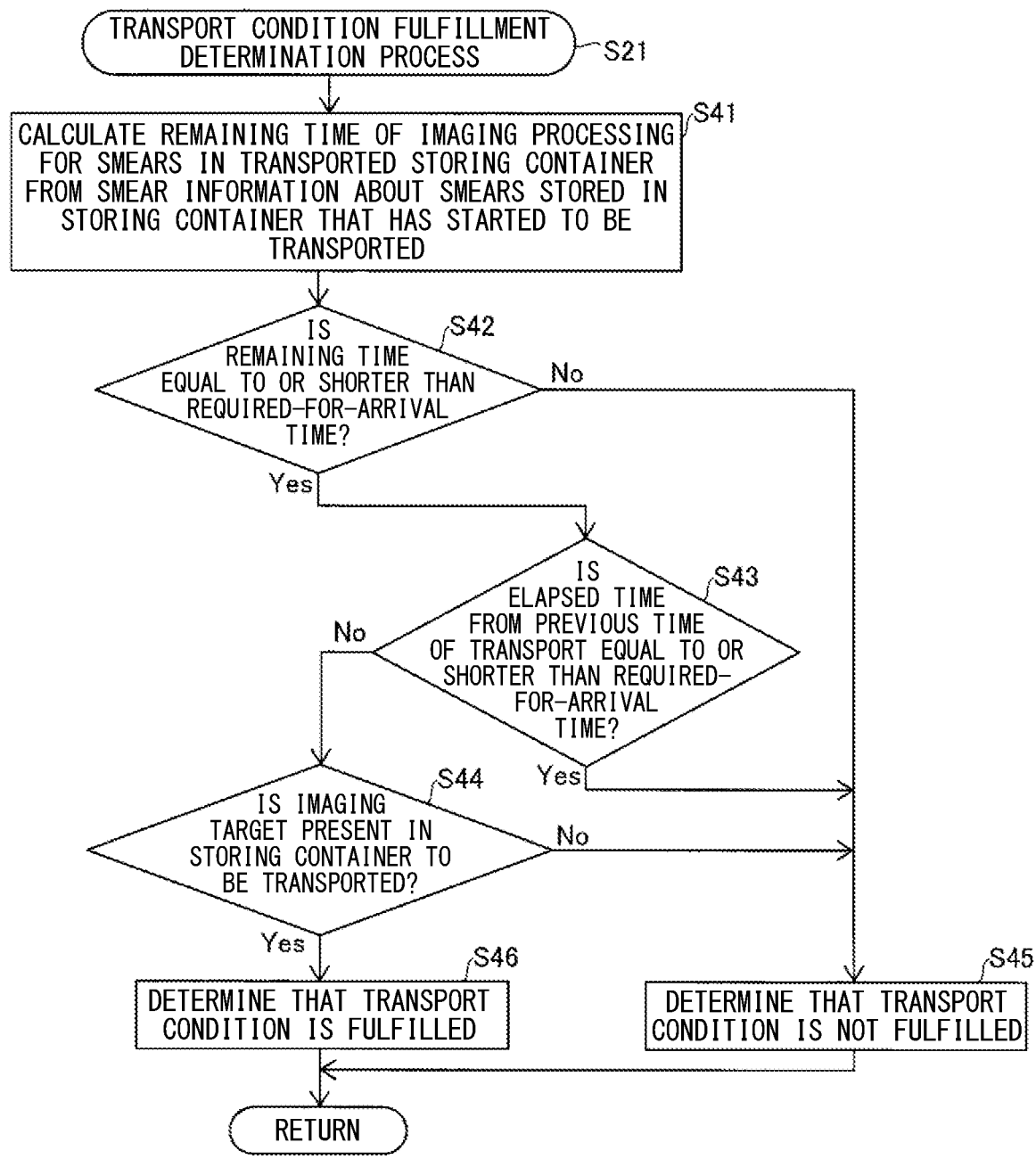

FIG. 19A

FIRST TRANSPORT MODE

| ELAPSED TIME (SEC.) | NUMBER OF STORED SMEARS | EVENT | |
|---|---|---|---|
| 0 | START STORING | | |
| 48 | 1 (CONTAINER 1) | | |
| 96 | 2 (CONTAINER 1) | | |
| ⋮ | | | |
| 480 | 10 (CONTAINER 1) | CONTAINER TRANSPORT 1 | |
| 528 | 11 (CONTAINER 2) | ↓ DURING TRANSPORT | |
| 537 | | ARRIVAL AT FIRST POSITION | |
| 576 | 12 (CONTAINER 2) | DURING IMAGING PROCESSING | |
| 624 | 13 (CONTAINER 2) | | |
| 657 | | CHECK FIRST IMAGE | |
| 720 | 15 (CONTAINER 2) | DURING IMAGING PROCESSING | |
| 768 | 16 (CONTAINER 2) | | |
| 777 | | CHECK SECOND IMAGE | |

FIG. 19B

FOURTH TRANSPORT MODE

| ELAPSED TIME (SEC.) | NUMBER OF STORED SMEARS | EVENT | |
|---|---|---|---|
| 0 | START STORING | | |
| 48 | 1 (CONTAINER 1) | CONTAINER TRANSPORT 1 | |
| 96 | 2 (CONTAINER 2) | ↓ DURING TRANSPORT | |
| 105 | | ARRIVAL AT FIRST POSITION | |
| 144 | 3 (CONTAINER 2) | DURING IMAGING PROCESSING | CONTAINER TRANSPORT 2 |
| 192 | 4 (CONTAINER 2) | | |
| 225 | | CHECK FIRST IMAGE | DURING TRANSPORT |
| 240 | 5 (CONTAINER 3) | | ↓ |
| 249 | | | ARRIVAL AT FIRST POSITION |
| 288 | 6 (CONTAINER 3) | | DURING IMAGING PROCESSING |
| 336 | 7 (CONTAINER 3) | | |
| 369 | | | CHECK SECOND IMAGE |
| 384 | 8 (CONTAINER 3) | | |
| 432 | 9 (CONTAINER 3) | | |

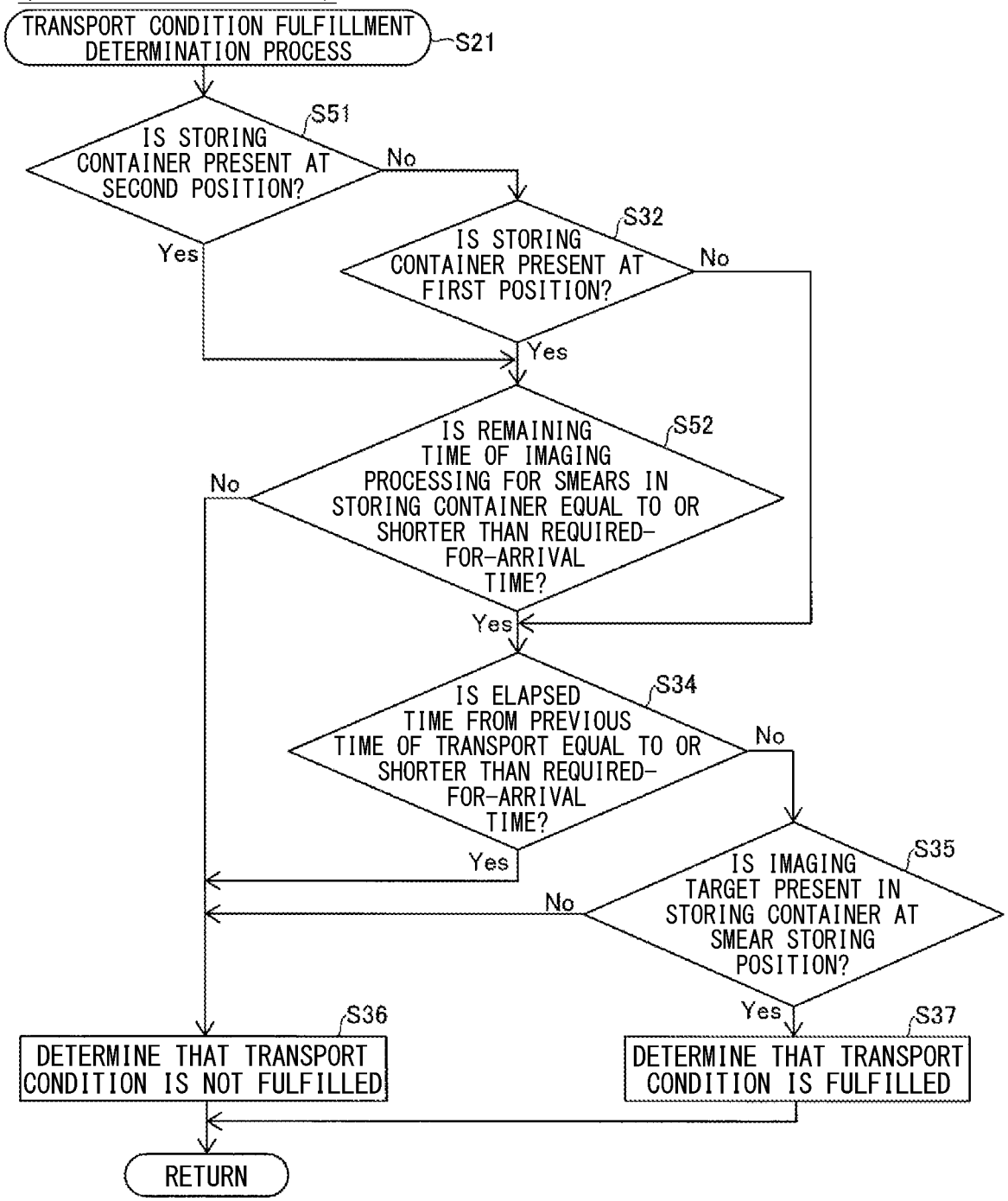

(SECOND MODIFICATION)
TRANSPORT CONDITION FULFILLMENT DETERMINATION PROCESS
(FOURTH TRANSPORT MODE)

(THIRD MODIFICATION)
TRANSPORT CONDITION FULFILLMENT DETERMINATION PROCESS
(FOURTH TRANSPORT MODE)

(FOURTH MODIFICATION)
TRANSPORT CONDITION FULFILLMENT DETERMINATION PROCESS
(FOURTH TRANSPORT MODE)

(FIFTH MODIFICATION)
TRANSPORT CONDITION FULFILLMENT DETERMINATION PROCESS
(FOURTH TRANSPORT MODE)

CONTROL METHOD FOR TEST SYSTEM, CONTROL METHOD FOR SMEAR PREPARATION DEVICE, TEST SYSTEM, AND SMEAR PREPARATION DEVICE

RELATED APPLICATIONS

This application claims priority from prior Japanese Patent Application No. 2022-098427, filed on Jun. 17, 2022, the entire content of which is incorporated herein by reference.

BACKGROUND OF THE INVENTION

1. Field of the Invention

The present invention relates to a test system including a smear imaging unit that images a smear of a specimen.

2. Description of the Related Art

Japanese Laid-Open Patent Publication No. 2018-17691 discloses a smear system including: a smear preparation device that prepares a smear slide; a smear transport device that transports a slide magazine storing therein a plurality of the smear slides; and a smear image-taking device that images the smear slides. In Japanese Laid-Open Patent Publication No. 2018-17691, the smear preparation device stores, after preparing a smear slide, the smear slide having been prepared into a slide magazine. A slide magazine that has storing portions having become full is transported from the smear preparation device. The slide magazine transported from the smear preparation device is transported toward the smear image-taking device by the smear transport device. The smear transport device can retain, on a transport path thereof, a plurality of the slide magazines that store therein smear slides not having yet been imaged.

In a laboratory, within a predetermined working time, a large number of smear slides are prepared and imaged by the smear system, and an operator checks the obtained smear images and reports the result of the checking to a person who has asked for the test. Therefore, there is an operator who requests to, after the working time starts, start checking a smear image early in order to start reporting the result of the checking early to a person who has asked for the test. In addition, there is also an operator who requests to start checking a large number of smear images early in order to complete the checking of the smear images within the predetermined working time.

However, in the above Japanese Laid-Open Patent Publication No. 2018-17691, a slide magazine that has storing portions having become full of smear slides having been prepared is transported from the smear preparation device, and thus it might be impossible to sufficiently adapt to the above requirements from the operators.

SUMMARY OF THE INVENTION

The scope of the present invention is defined solely by the appended claims, and is not affected to any degree by the statements within this summary.

In order to attain the above object, a control method for a test system (100) of the present invention is a control method for a test system (100) including a smear imaging unit (50) configured to image a smear (1) of a specimen, as shown in FIG. 1. The control method includes: preparing a plurality of the smears (1); sequentially storing, in a storing container (3) capable of storing therein a plurality of the smears (1), the plurality of smears (1) having been prepared; and transporting, when information about a standby situation for imaging processing by the smear imaging unit (50) satisfies a predetermined condition, the storing container (3) that stores therein the smears (1) to the smear imaging unit (50) regardless of the number of the smears (1) stored in the storing container (3).

The control method for the test system (100) of the present invention is a control method for a test system including a smear preparation unit (10) configured to prepare a smear (1) of a specimen and a smear imaging unit (50) configured to image the smear (1), as shown in FIG. 14. The control method includes: setting one transport mode from among a plurality of transport modes; preparing a plurality of the smears (1); sequentially storing, in a storing container (3) capable of storing therein a plurality of the smears (1), the smears (1) having been prepared; and transporting the storing container (3) that stores therein the smears (1) from the smear preparation unit (10) according to the transport mode having been set. The plurality of transport modes include a mode of transporting, regardless of a transport situation of the storing container (3), the storing container (3) that stores therein a maximum number of the smears (1) capable of being stored in the storing container (3), and a mode of transporting, depending on the transport situation of the storing container (3), the storing container (3) that stores therein the smears (1) the number of which is smaller than the maximum number.

A control method for a smear preparation device (10) of the present invention is a control method for a smear preparation device (10) to be incorporated in a test system (100) including a smear imaging unit (50) configured to image a smear (1) of a specimen, as shown in FIG. 1. The control method includes: preparing a plurality of the smears (1); sequentially storing, in a storing container (3) capable of storing therein a plurality of the smears (1), the smears (1) having been prepared; and sending out, when information about a transport situation of the storing container (3) satisfies a predetermined condition, the storing container (3) that stores therein the smears (1) from the smear preparation device (10) regardless of the number of the smears (1) stored in the storing container (3).

As shown in FIG. 1, a test system (100) of the present invention includes: a smear preparation unit (10) configured to prepare a plurality of smears (1) and sequentially store, in a storing container (3) capable of storing therein a plurality of the smears (1), the plurality of smears (1) having been prepared; a container transport unit (30) configured to transport the storing container (3) sent out from the smear preparation unit (10); a smear imaging unit (50) configured to image the smears (1) transported together with the storing container (3) from the container transport unit (30); and a controller (70) programmed to perform control to transport, when information about a standby situation for imaging processing by the smear imaging unit (50) satisfies a predetermined condition, the storing container (3) that stores therein the smears (1) to the smear imaging unit (50) regardless of the number of the smears (1) stored in the storing container (3).

As shown in FIG. 14, a test system (100) of the present invention includes: a smear preparation unit (10) configured to prepare a plurality of smears (1) and sequentially store, in a storing container (3) capable of storing therein a plurality of the smears (1), the plurality of smears (1) having been prepared; a container transport unit configured to transport the storing container (3) that is sent out from the smear preparation unit (10); a smear imaging unit (50) configured to image the smears (1) transported together with the storing container (3) from the container transport unit; and a controller (70) programmed to perform control to transport the storing container (3) that stores therein the smears (1) from the smear preparation unit (10) according to one transport mode having been set from among a plurality of transport modes. The plurality of transport modes include a mode of transporting, regardless of a transport situation of the storing container (3), the storing container (3) that stores therein a maximum number of the smears (1) capable of being stored in the storing container (3), and a mode of transporting, depending on the transport situation of the storing container (3), the storing container (3) that stores therein the smears (1) the number of which is smaller than the maximum number.

As shown in FIG. 1, the smear preparation device (10) of the present invention is a smear preparation device (10) capable of being combined with a test system (100) including a smear imaging device (50). The smear preparation device (10) includes: a preparation process part (10b) configured to prepare a plurality of smears (1); a transfer part (19) configured to sequentially store, in a storing container (3) capable of storing therein a plurality of the smears (1), the plurality of smears (1) having been prepared; a transport part (23) configured to be connectable to another device (30) forming the test system (100), and transport the storing container (3) that stores therein the smears (1); and a controller (70) programmed to perform control to send out, when information about a transport situation of the storing container (3) satisfies a predetermined condition, the storing container (3) that stores therein the smears (1) from the transport part (23) regardless of the number of the smears (1) stored in the storing container (3).

BRIEF DESCRIPTION OF THE DRAWINGS

FIG. 13 explains transport modes each for determining a transport timing;

FIG. 18 is a flowchart for explaining a transport condition fulfillment determination process based on the standby situation for imaging processing in a fifth transport mode;

FIG. 19A shows a flow of a process in a first transport mode;

FIG. 19B shows a flow of a process in the fourth transport mode;

FIG. 20 is a flowchart showing a transport condition fulfillment determination process in the fourth transport mode according to a first modification;

DETAILED DESCRIPTION OF THE PREFERRED EMBODIMENTS

Hereinafter, an embodiment will be described with reference to the drawings.

Overview of Test System

Firstly, the overview of a test system 100 according to the embodiment will be described with reference to FIG. 1.
[Test System]

Figure 1:
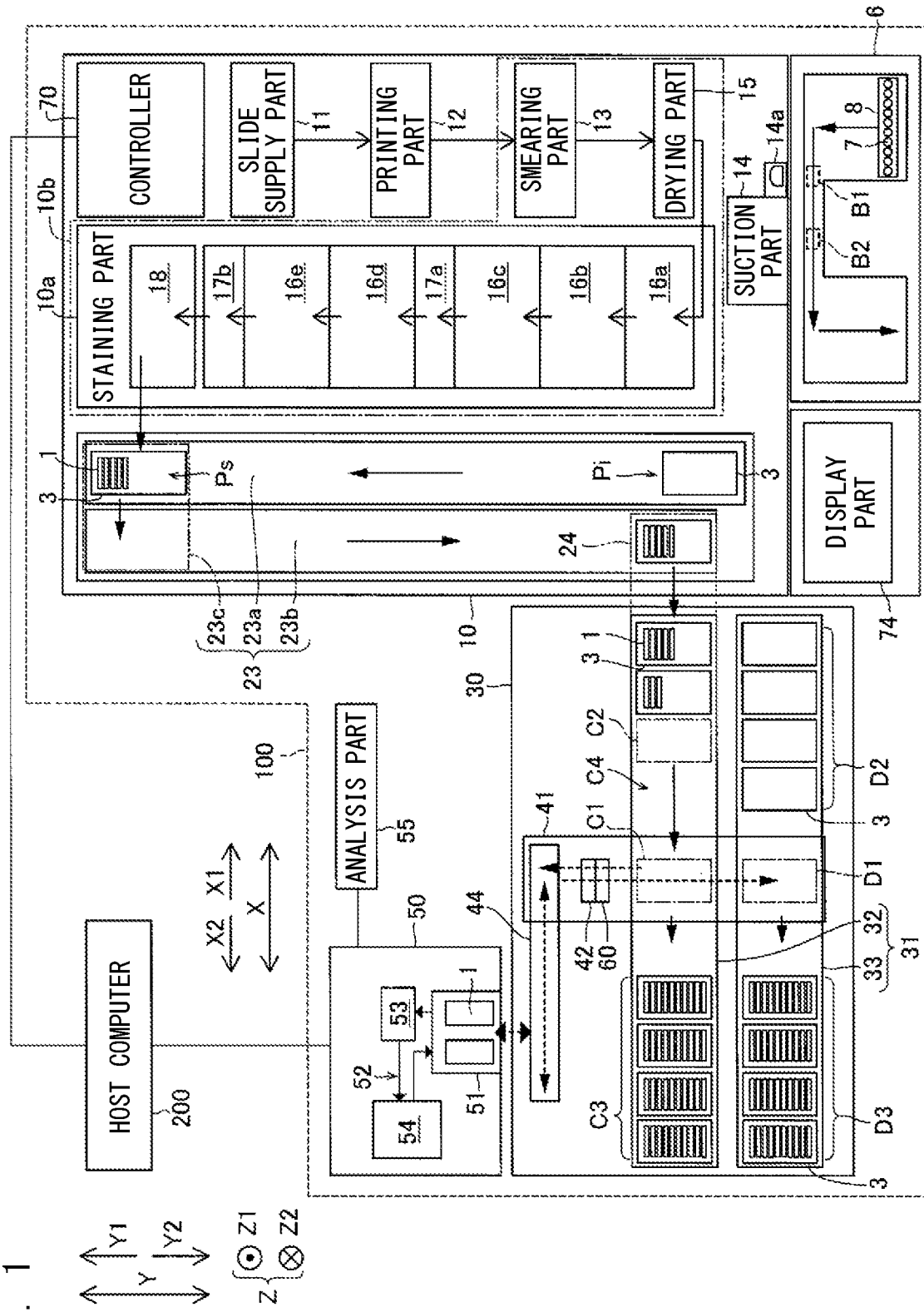
FIG. 1 is a plan view for explaining a test system according to an embodiment.

As shown in FIG. 1, the test system 100 according to the embodiment of the present disclosure includes a smear preparation unit 10, a container transport unit 30, and a smear imaging unit 50. In the smear preparation unit 10, smears 1 are prepared, and the smears 1 having been prepared are stored in a storing container 3. The storing container 3 that stores therein the smears 1 is transported from the smear preparation unit 10 to the container transport unit 30. In the container transport unit 30, the storing container 3 is transported from the smear preparation unit 10 to a predetermined position for supplying the smears 1 to the smear imaging unit 50, and the smears 1 in the storing container 3 are supplied to the smear imaging unit 50 by the container transport unit 30. In the test system 100, a series of operations from preparation of a smear 1 on which a specimen has been smeared to imaging of the specimen, can be automatically performed by the smear preparation unit 10, the container transport unit 30, and the smear imaging unit 50.

In the present specification, description will be given with an X direction shown in FIG. 1 being defined as a left-right direction, with a Y direction shown in FIG. 1 being defined as a front-rear direction, and with a Z direction shown in FIG. 1 being defined as an up-down direction. In addition, in FIG. 1, a Y2 side is defined as a front side, and a Y1 side is defined as a rear side. That is, in the test system 100, the smear preparation unit 10 is disposed rightward of the container transport unit 30, and the smear imaging unit 50 is disposed rearward of the container transport unit 30. The container transport unit 30 is disposed such that a portion thereof is opposed to the front side of the smear imaging unit 50. In the present specification, the term "lateral" is sometimes used in the sense of the left-right direction, and the terms "longitudinal" is sometimes used in the sense of the front-rear direction.

Figure 2:
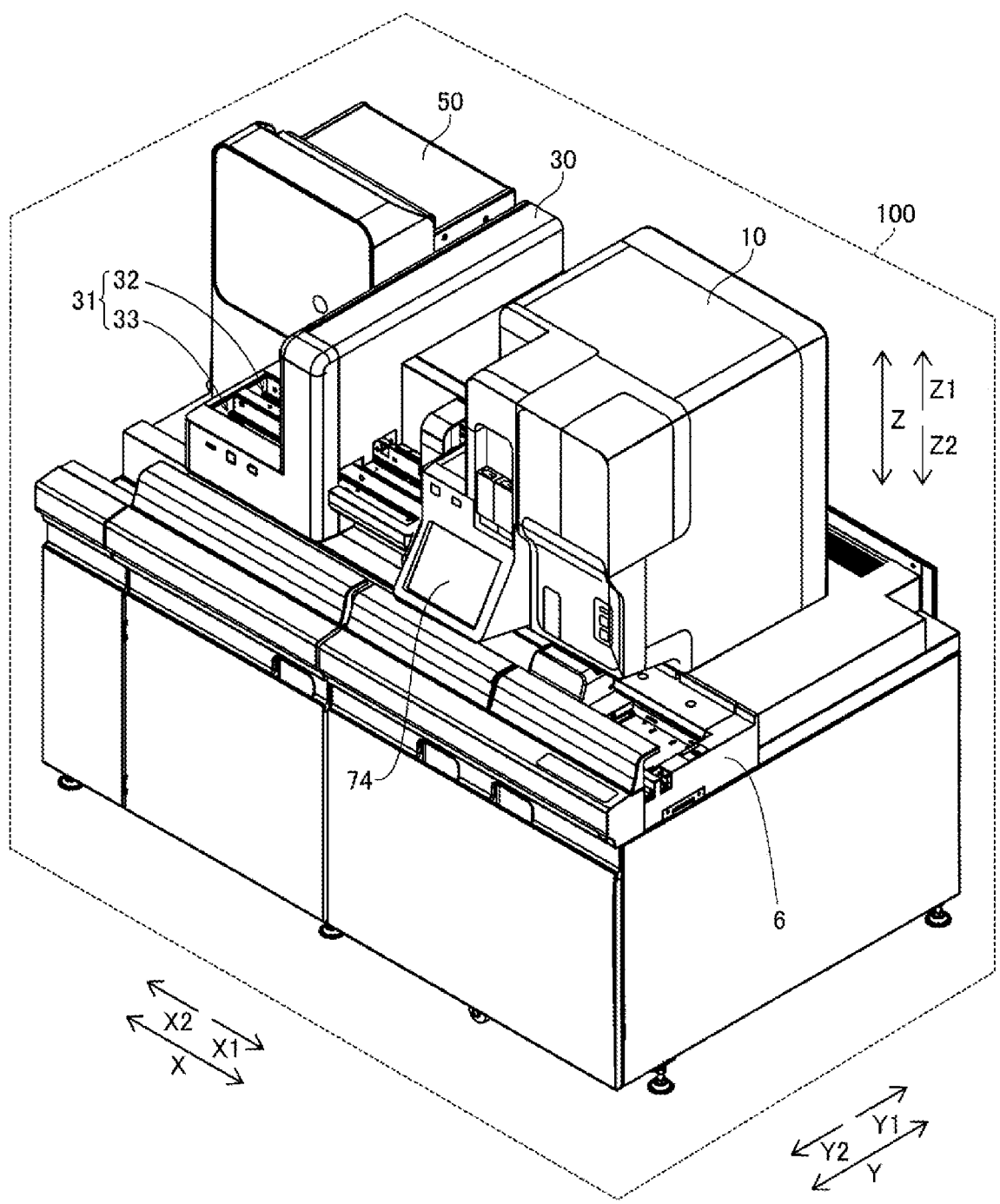
FIG. 2 is a perspective view for explaining the test system according to the embodiment.

As shown in FIG. 2, the smear preparation unit 10, the container transport unit 30, and the smear imaging unit 50 are accommodated in respective separate housings. The test system 100 in the present embodiment is structured through mutual connection between the smear preparation unit 10 as a smear preparation device and the smear imaging unit 50 as a smear imaging device by the container transport unit 30 as a transport device for storing containers 3 and smears 1. That is, the smear preparation unit 10 and the smear imaging unit 50 function also as devices independent of each other. The test system 100 may have a form, other than that in FIG. 2, in which the test system 100 is configured as a single tester accommodating the smear preparation unit 10, the container transport unit 30, and the smear imaging unit 50 in a single housing.

[Smear Preparation Unit]

The smear preparation unit 10 is a device that prepares a smear 1 by smearing blood as a specimen of a subject onto a glass slide 2 (see FIG. 3) and performing processing such as drying and staining. The specimen is not limited to blood. The smear preparation unit 10 is configured to prepare a plurality of the smears 1 according to smear preparation requests based on a plurality of respective specimens and store, in a storing container 3 capable of storing therein a plurality of the smears 1, the plurality of smears 1 having been prepared.

Figure 3:
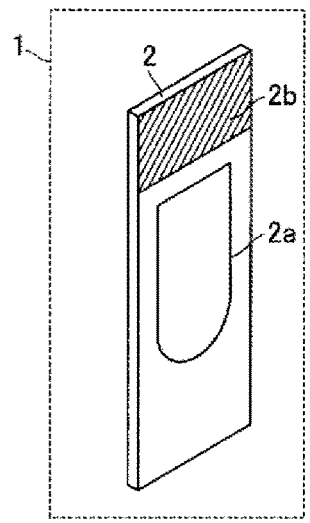
FIG. 3 is a perspective view of a smear.

As shown in FIG. 3, each of the smears 1 is prepared by smearing the specimen onto a center portion 2a of the glass slide 2 which is a rectangular sheet material made of glass. An upper portion (hatched portion) which is one end portion in the longitudinal direction of the smear 1 is provided with a frosted portion 2b as a region in which identification information described later is printed. The frosted portion 2b is a region in which processing that enables printing in ink has been performed by coating a glass surface with a synthetic resin. In the present specification, not only a glass slide 2 on which a smear preparation process by the smear preparation unit 10 has been completed, but also a glass slide 2 on which the smear preparation process has not yet been completed, is also referred to as a smear 1.

Figure 4:
FIG. 4 shows an example of printing on a frosted portion of the smear.

As shown in FIG. 4, the identification information printed on the frosted portion 2b includes specimen identification information A1 and necessity-of-imaging determination information A2. The specimen identification information A1 is information for identifying the specimen, such as a specimen number, a date, a reception number, and the name of the subject, and is printed in the form of letters, symbols, or the like on the frosted portion 2b. The smears 1 that are prepared include: a first-type smear 1 that is an imaging target; and a second-type smear 1 that is not an imaging target. The necessity-of-imaging determination information A2 is information for determining whether or not the specimen is to be imaged by the smear imaging unit 50 (whether the specimen is of the first type or the second type). Information as to whether the specimen is a first-type specimen or a second-type specimen to be subjected to a visual test with a microscope (so-called microscopic test) can be inputted to a host computer 200 (see FIG. 1) in advance when a request for a test is received.

The necessity-of-imaging determination information A2 is printed on the frosted portion 2b separately from the specimen identification information A1. As the necessity-of-imaging determination information A2, a two-dimensional code, letters, a figure, symbols, or the like is used. Examples of the necessity-of-imaging determination information A2 include geometric figures and various letters such as alphabets A, B, and C. In FIG. 4, the letters "DI" indicate that the smear is an imaging target. When "DI" has been printed, the smear is a first-type smear 1 that is an imaging target. In the case of a second-type smear 1 that is not an imaging target, another print pattern (for example, "X") that is different from "DI" and that indicates that the smear is of the second type, is formed. The necessity-of-imaging determination information A2 is recorded also in a two-dimensional code A3 together with the specimen identification information A1.

As shown in FIG. 1, the smear preparation unit 10 includes a slide supply part 11, a printing part 12, a smearing part 13, a suction part 14, a drying part 15, staining chambers 16a to 16e, washing chambers 17a and 17b, a drying chamber 18, a transfer part 19 (see FIG. 6), and a transport part 23. The staining chambers 16a to 16e, the washing chambers 17a and 17b, and the drying chamber 18 compose a staining part 10a in the smear preparation unit 10. Further, the smearing part 13, the drying part 15, and the staining part 10a compose a preparation process part 10b in the smear preparation unit 10. In the present embodiment, the preparation process part 10b prepares the smear 1 by smearing the specimen on the glass slide 2. The smear preparation unit 10 further includes: a fluid circuit part 21 (see FIG. 6) for respectively supplying a staining liquid and a washing liquid to the staining chambers 16a to 16e and the washing chambers 17a and 17b and discharging these liquids; and a controller 70 for controlling operation of the transfer part 19.

The slide supply part 11 stores therein a large number of unused glass slides 2 on which no specimens have yet been smeared. The slide supply part 11 supplies the glass slides 2, on which smearing has not yet been performed, one by one to the printing part 12. The printing part 12 prints various kinds of information (see FIG. 4) such as the specimen identification information A1 and the necessity-of-imaging determination information A2 onto the frosted portion 2b (see FIG. 3) of each of the glass slides 2. The printing part 12 supplies, to the smearing part 13, the glass slide 2 on which printing has been performed.

The suction part 14 suctions a specimen in a specimen container 7 transported by a specimen transport part 6. The specimen transport part 6 transports a specimen rack 8 capable of holding a plurality of specimen containers 7. Thus, the specimen transport part 6 sequentially transports the plurality of specimen containers 7 held by the specimen rack 8 to a reading position B1, and then sequentially transports the specimen containers 7 to a suction position B2. The plurality of specimen containers 7 are held side by side in a predetermined direction by the specimen rack 8. Each of the specimen containers 7 is provided with a barcode in which an identification (ID) of the corresponding specimen is recorded. The identification (ID) is read at the reading position B1 by an ID reading part 14a. The ID reading part 14a is implemented by an optical barcode reader. The suction part 14 suctions the specimen from inside the specimen container 7 transported to the suction position B2 and supplies the suctioned specimen to the smearing part 13.

The smearing part 13 smears the specimen suctioned by the suction part 14, onto the center portion 2a (see FIG. 3) of the glass slide 2 sent from the printing part 12. The smearing part 13 supplies, to the drying part 15, the smear 1 on which smearing processing has been performed.

The drying part 15 has a function of receiving the smear 1, on which the specimen has been smeared, from the smearing part 13 and drying the specimen smeared on the center portion 2a (see FIG. 3).

Figure 6:
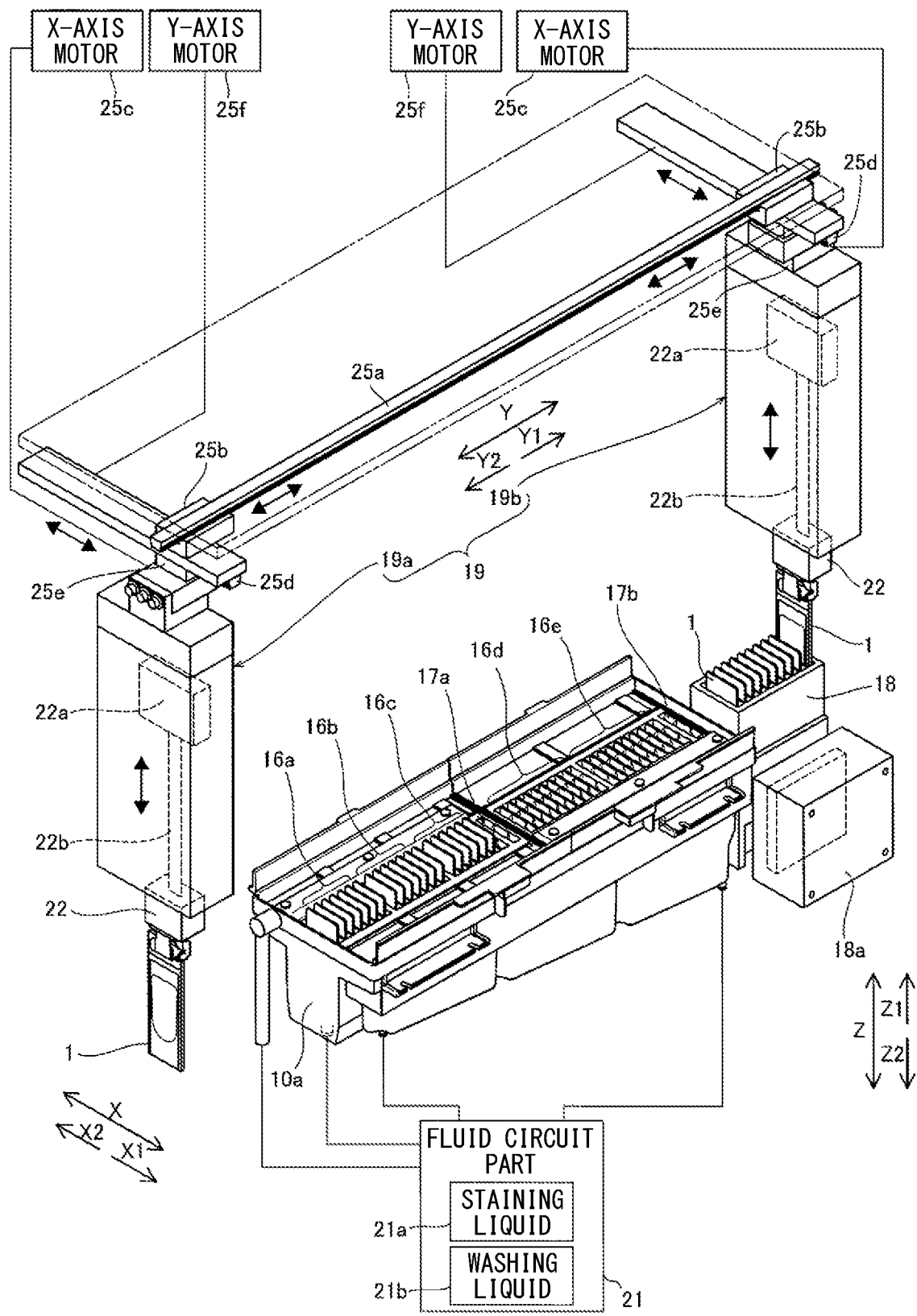
FIG. 6 is a perspective view for explaining staining chambers and a transfer part of a smear preparation unit.

As shown in FIG. 6, in the staining part 10a, the smear 1 on which the specimen has been smeared and that has been dried by the drying part 15 is subjected to staining processing in each of the staining chambers 16a, 16b, 16c, 16d, and 16e and washing processing in each of the washing chambers 17a and 17b, respectively. Thereafter, the smear 1 is subjected to drying processing in the drying chamber 18. When staining of the smear 1 is completed, the smear 1 having been stained is sent to the transport part 23 (see FIG. 1). Transfer of the smear 1 between these parts is performed by the transfer part 19.

Each of the staining chambers 16a to 16e is formed in the shape of a container having a recessed internal space and having an open upper surface, and, inside the staining chamber, a staining liquid 21a is stored such that the smear 1 on which the specimen has been smeared can be immersed therein. Likewise, each of the washing chambers 17a and 17b is also formed in the shape of such a container, and, inside the washing chamber, a washing liquid 21b is stored such that the stained smear 1 can be immersed therein. In the smear preparation unit 10, three staining chambers 16a, 16b, and 16c, the washing chamber 17a, two staining chambers 16d and 16e, and the washing chamber 17b are arranged in this order along the Y-axis direction, and these chambers are integrally formed of a synthetic resin, as portions composing one chamber. The number of the staining chambers 16 and the number of the washing chambers 17 only have to be selected as appropriate according to, for example, details of and the number of steps in the staining processing, and are not particularly limited in the present disclosure.

Each of the staining chambers 16a, 16b, 16c, 16d, and 16e and the washing chambers 17a and 17b has therein partitions. Each smear 1 is inserted between adjacent ones of the partitions, whereby the smear 1 is held so as to be upright along the Z direction in each of the chambers.

The transfer part 19 is configured to grip and transfer the smears 1 on each of which the corresponding specimen has been smeared. The transfer part 19 is configured to enable the smears 1 to be taken out from or put into the staining chambers 16a, 16b, 16c, 16d, and 16e or the washing chambers 17a and 17b one by one. Various configurations can each be employed as a configuration of the transfer part 19 for taking out or putting in the smears 1 one by one in this manner. The present embodiment employs, as the transfer part 19, a three-axis orthogonal robot that is movable in the horizontal direction (X direction and Y direction) and the up-down direction (Z direction) and that includes hand parts 22 for gripping each smear 1. As the hand parts 22, it is possible to use, for example, an opening/closing mechanism by which the smear 1 can be sandwiched to be gripped; and a suction mechanism for sucking a predetermined portion of the smear 1 by means of negative pressure so as to grip the smear 1.

The transfer part 19 includes a first transfer part 19a and a second transfer part 19b. The first transfer part 19a and the second transfer part 19b are each disposed on the upper side (in the Z1 direction) relative to the staining chambers 16a, 16b, 16c, 16d, and 16e and the washing chambers 17a and 17b. The first transfer part 19a and the second transfer part 19b are movable in the X direction by X-axis sliders 25b engaged with a common X-axis rail 25a and corresponding X-axis motors 25c. The first transfer part 19a and the second transfer part 19b are each movable in the Y direction by a Y-axis rail 25d, a Y-axis slider 25e engaged with the Y-axis rail 25d, and a Y-axis motor 25f. The first transfer part 19a and the second transfer part 19b are movable in the horizontal direction (X direction and Y direction) independently of each other. Each hand part 22 is movable in the Z direction by a Z-axis motor 22a and a transmission mechanism 22b. The hand part 22 can grip one smear 1 by sandwiching it in the thickness direction and release the gripped smear 1.

The drying chamber 18 is configured to dry each smear 1 having been subjected to the staining processing and the washing processing. In the drying chamber 18, the smear 1 can be held between adjacent ones of partitions so as to be upright along the Z direction. The drying chamber 18 is provided with an air blowing unit 18a for supplying hot air to the smear 1 held in the drying chamber 18.

The smear 1 for which the staining processing, the washing processing, and the drying processing have been ended is transferred to the transport part 23 shown in FIG. 1 by the transfer part 19. The transport part 23 is configured to transport a storing container 3.

Figure 5:
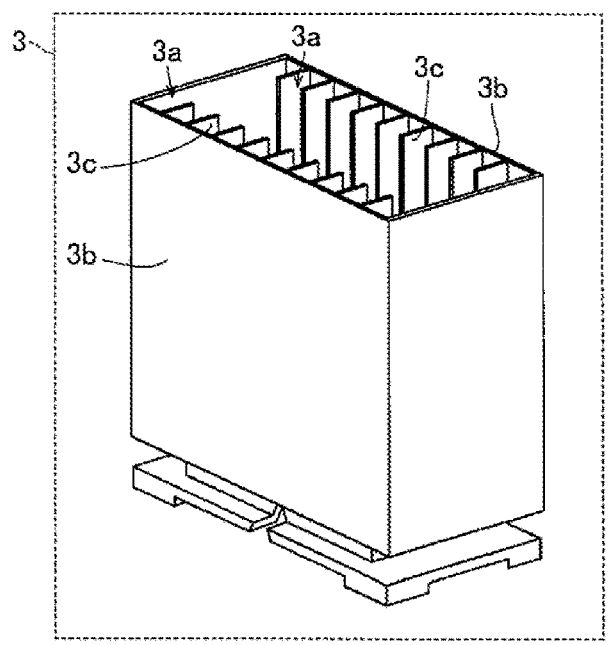
FIG. 5 is a perspective view for explaining a storing container.

As shown in FIG. 5, the storing container 3 has a plurality of storing portions 3a and is configured to be capable of storing therein a plurality of the stained smears 1. The storing container 3 has the shape of a box with an open upper surface and is provided with a plurality of partition portions 3c therein. The partition portions 3c are formed on the inner surfaces of a pair of opposed walls 3b so as to be opposed to each other in the short-side direction of the storing container 3. Each of the storing portions 3a is formed as a space between corresponding ones of the partition portions 3c that are adjacent to each other in the longitudinal direction of the storing container 3. The storing container 3 in the present embodiment has M storing portions 3a. In the present embodiment, the maximum number M of smears 1 capable of being stored in the storing container 3 is ten.

The transport part 23 includes: a send-in path 23a which allows accumulation thereon and transport therethrough of a plurality of empty storing containers 3; a send-out path 23b which allows accumulation thereon and transport therethrough of each of the storing containers 3 storing therein a plurality of smears 1; and a laterally-sending mechanism 23c which sends the storing container 3 from the send-in path 23a to the send-out path 23b. Each of the send-in path 23a and the send-out path 23b includes a belt conveyor and allows transport therethrough of the storing container 3 in the Y direction. In the transport part 23, when a user sets an empty storing container 3 at a loading portion Pi of the send-in path 23a, the storing container 3 is automatically transported in the Y1 direction toward a smear storing position Ps.

The transfer part 19 picks up smears 1 in the order from the first smear 1 for which the drying processing by the drying chamber 18 has been ended. Then, the transfer part 19 sequentially stores the smears 1 into the vacant storing portions 3a of the storing container 3 disposed at the smear storing position Ps. In the present embodiment, the smears 1 are stored in the storing container 3 one by one. When a transport timing described later arrives in the course of sequentially storing the smears 1 into the storing container 3, the storing container 3 at the smear storing position Ps is transferred from the send-in path 23a to the send-out path 23b by the laterally-sending mechanism 23c. The storing container 3 transferred onto the send-out path 23b is automatically transported to the Y2 side. The storing container 3 transported to the end on the Y2 side of the send-out path 23b is transferred to the container transport unit 30 by a laterally-sending part 24.

(Container Transport Unit)

The container transport unit 30 is configured to transport the storing container 3 transported from the smear preparation unit 10. The container transport unit 30 includes: a container transport path 31 through which the storing container 3 storing therein the plurality of smears 1 is transported; and a smear transfer part 41 which takes out any of the smears 1 stored in the storing container 3 transported through the container transport path 31, and which supplies the taken-out smear 1 to the smear imaging unit 50.

<Container Transport Path>

The container transport path 31 in the present embodiment has two rows of front and rear transport paths which are a first transport path 32 on the smear imaging unit 50 side (Y1 side); and a second transport path 33 on the front side (Y2 side) relative to the first transport path 32. Each of the first transport path 32 and the second transport path 33 includes a belt conveyor provided with a belt 32b (see FIG. 8) and a drive unit 32a (see FIG. 8) for driving the belt 32b, and allows the storing container 3 to be transported therethrough in the X direction.

The first transport path 32 includes a second position C2, a first position C1, and a first accumulation region C3, from an upstream side (X1 side) toward a downstream side (X2 side). The first position C1 is a position at which each smear 1 to be supplied to the smear imaging unit 50 is taken out from the storing container 3. The second position C2 is a position at which the storing container 3 stands by to be transported to the first position C1. The first accumulation region C3 is a region in which a storing container 3 is accumulated, the storing container 3 being a container from which first-type smears 1 to be imaged by the smear imaging unit 50 have been taken out so that only second-type smears 1 not to be imaged by the smear imaging unit 50 are stored in the container.

The first transport path 32 has an upstream-side (X1-side) end portion connected to the send-out path 23b of the smear preparation unit 10. The storing container 3 transported from the smear preparation unit 10 is transferred to the upstream end of the first transport path 32 by the laterally-sending part 24. The storing container 3 transferred onto the first transport path 32 is transported to the first position C1 when no storing container 3 is present at the first position C1. When a storing container 3 is already present at the first position C1, the storing container 3 transferred onto the first transport path 32 stands by at the second position C2. When there are a plurality of the storing containers 3 standing by, these storing containers 3 are arranged in the X1 direction from the second position C2 in the order from the first storing container 3 that has been transported from the smear preparation unit 10.

Figure 7:
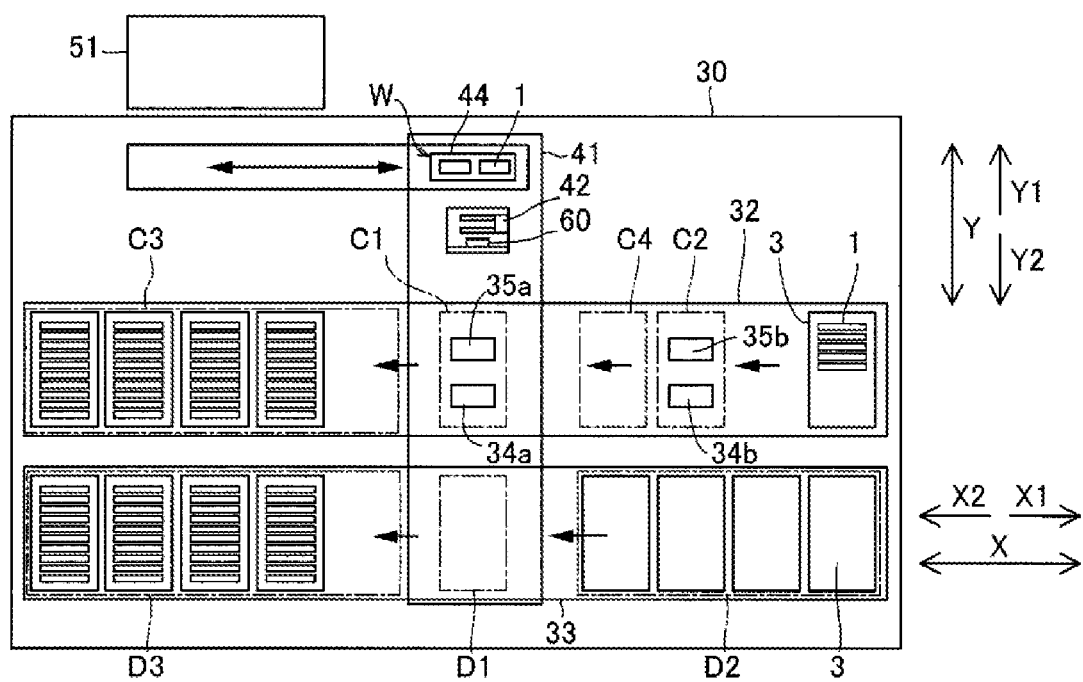
FIG. 7 is a plan view for explaining a container transport unit.

As shown in FIG. 7, a container sensor 34a and a container sensor 34b are respectively provided at the first position C1 and the second position C2. The container sensor 34a and the container sensor 34b are each a contact sensor for detecting presence/absence of a storing container 3. The sensor for detecting presence/absence of a storing container 3 may be, for example, an optical sensor, a magnetic sensor, a weight sensor, or an ultrasonic sensor.

The first transport path 32 includes locking mechanisms 35a and 35b at the first position C1 and the second position C2, respectively. The locking mechanisms 35a and 35b are each a mechanism for fixing a storing container 3 during a transport operation on the first transport path 32. When either of the locking mechanisms 35a and 35b unfixes the storing container 3, the storing container 3 is transported in the X direction through the transport operation on the first transport path 32. By switching between fixing and unfixing by the locking mechanisms 35a and 35b, the first transport path 32 enables, while a storing container 3 at one of the first position C1 and the second position C2 is kept fixed, only a storing container 3 at the other position to be transported therethrough.

Each first-type smear 1 that is an imaging target is taken out from the storing container 3 transported to the first position C1. When no first-type smear 1 is present anymore in the storing container 3, the first transport path 32 causes this storing container 3 to be transported from the first position C1 to the first accumulation region C3. When not a single first-type smear 1 is stored (only second-type smears 1 are stored) in the storing container 3, this storing container 3 is transported to the first accumulation region C3 without any smear 1 being taken out therefrom at the first position C1. When the storing container 3 is transported from the first position C1 to the first accumulation region C3, the first transport path 32 causes a next storing container 3 to be transported from the second position C2 to the vacant first position C1.

In the present embodiment, an interruption region C4 is provided between the first position C1 and the second position C2 on the first transport path 32. In the interruption region C4, a storing container 3 storing therein a smear 1 having been prepared not by the smear preparation unit 10 but manually, can be directly disposed by a user. When the storing container 3 disposed in the interruption region C4 is transported to the first position C1, the smear imaging unit 50 can be caused to execute imaging processing on the smear 1 having been prepared manually by the user.

The second transport path 33 includes a setting region D2, an imaged-smear storing position D1, and a second accumulation region D3, from the upstream side (X1 side) toward the downstream side (X2 side). The setting region D2 is a region in which empty storing containers 3 are accumulated. The empty storing containers 3 are disposed in the setting region D2 by a user. The imaged-smear storing position D1 is a position at which smears 1, for which imaging by the smear imaging unit 50 has been ended, are sequentially stored in a storing container 3. The imaged-smear storing position D1 is, in the Y direction, side by side with the first position C1 which is a smear take-out position. The second accumulation region D3 is a region in which storing containers 3 storing therein only first-type smears 1 imaged by the smear imaging unit 50 are accumulated.

The second transport path 33 causes each of the empty storing containers 3 to be transported from the setting region D2 to the imaged-smear storing position D1. The smears 1 for which imaging by the smear imaging unit 50 has been ended are sequentially stored in the storing container 3 at the imaged-smear storing position D1. That is, a first-type smear 1 is taken out from a storing container 3 on the first transport path 32 and is, after being imaged, stored in another storing container 3 on the second transport path 33. When the storing container 3 at the imaged-smear storing position D1 has become full, the second transport path 33 causes the storing container 3 at the imaged-smear storing position D1 to be transported from the imaged-smear storing position D1 to the second accumulation region D3. Thereafter, the second transport path 33 causes the next empty storing container 3 to be transported from the setting region D2 to the vacant imaged-smear storing position D1.

<Smear Transfer Part>

The smear transfer part 41 is provided on the upper side (in the Z1 direction) relative to the first transport path 32 and the second transport path 33. Similar to the transfer part 19 (see FIG. 6) of the smear preparation unit 10, the smear transfer part 41 is provided for gripping and transferring the smears 1. The smear transfer part 41 is configured to enable the smears 1 to be taken out from or put into the storing container 3 one by one. Various configurations can each be employed as a configuration of the smear transfer part 41 for taking out or putting in the smears 1 one by one in this manner. The present embodiment employs, as the smear transfer part 41, a two-axis orthogonal robot that is movable in the horizontal direction (Y direction) and the up-down direction (Z direction) and that includes a handling portion 42 (see FIG. 8) for gripping each smear 1. As the handling portion 42, it is possible to use, for example, an opening/closing mechanism by which the smear 1 can be sandwiched to be gripped; and a suction mechanism for sucking a predetermined portion of the smear 1 by means of negative pressure so as to grip the smear 1.

Figure 8:
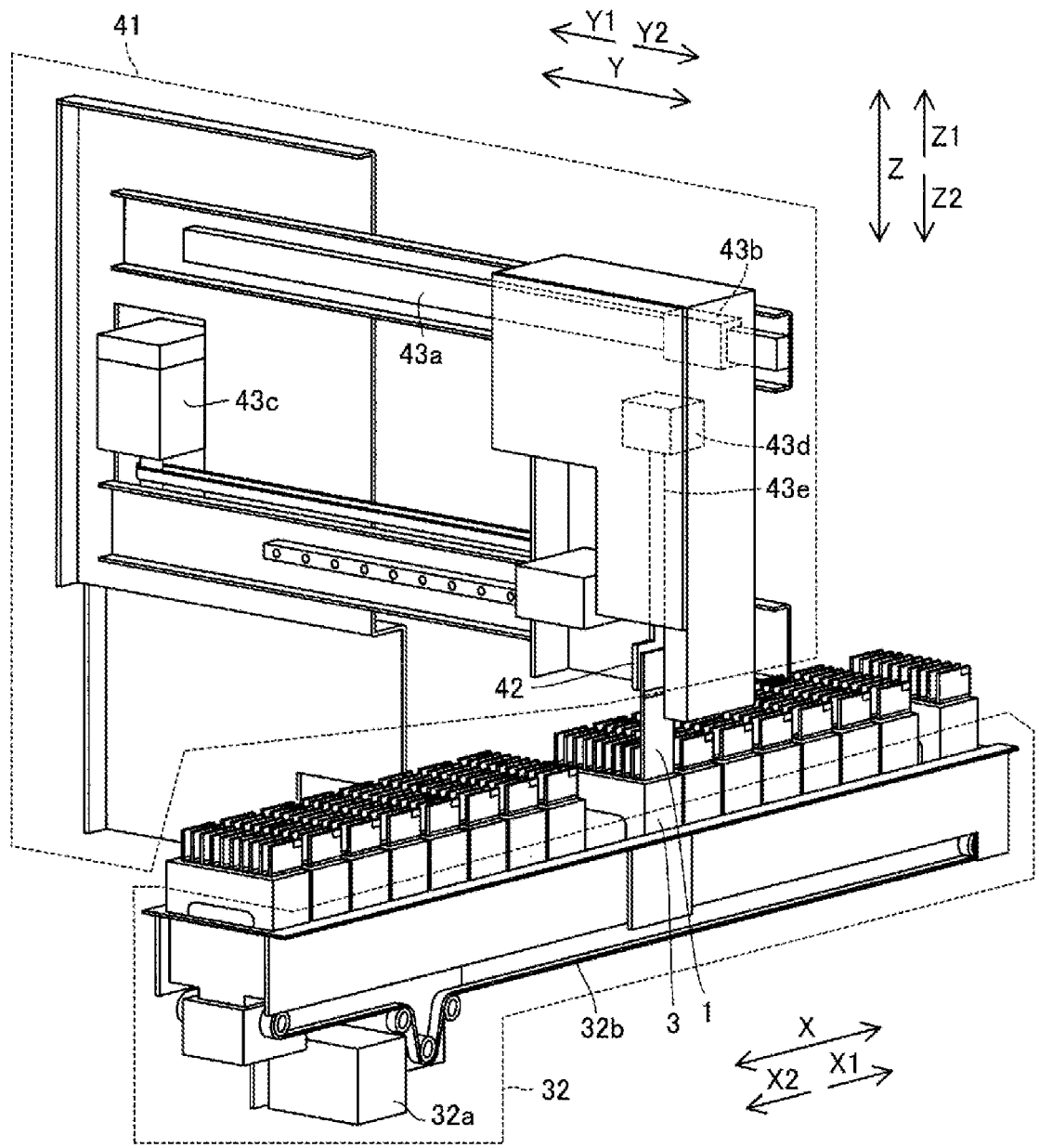
FIG. 8 a perspective view for explaining a smear transfer part.

As shown in FIG. 8, the smear transfer part 41 is movable in the horizontal direction (Y direction) by a Y-axis rail 43*a*, a Y-axis slider 43*b* engaged with the Y-axis rail 43*a*, and a Y-axis motor 43*c*. As the Y-axis motor 43*c*, for example, a stepping motor or a servomotor can be used. The Y-axis motor 43*c* moves the Y-axis slider 43*b* in the Y direction via a transmission mechanism implemented by a belt-pulley mechanism.

The smear transfer part 41 includes a Z-axis motor 43*d* and a transmission mechanism 43*e* for lifting and lowering the handling portion 42. The Z-axis motor 43*d* can lift and lower the handling portion 42 via the transmission mechanism 43*e*.

The handling portion 42 can, by a pair of gripping plates thereof, grip one smear 1 by sandwiching it in the thickness direction and release the gripped smear 1. The handling portion 42 is brought into contact with the front surface side and the back surface side of the smear 1, to grip the smear 1.

Figure 9:
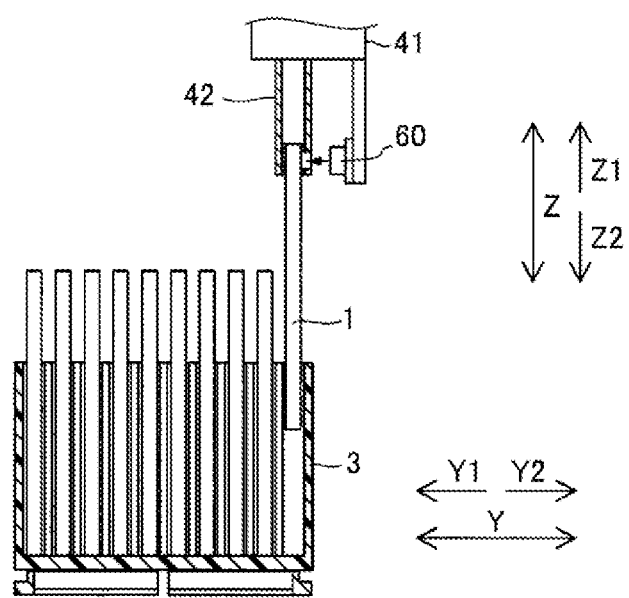
FIG. 9 is a schematic diagram for explaining a detector.

Here, the test system 100 (see FIG. 1) includes a detector 60 (see FIG. 7) which detects each smear 1 stored in the storing container 3 transported toward the smear imaging unit 50. The detector 60 is implemented by a camera provided to the smear transfer part 41. As shown in FIG. 9, the detector 60 is provided at a position opposed to the frosted portion 2*b* of the smear 1 picked up by the handling portion 42 of the smear transfer part 41. Consequently, the detector 60 images the necessity-of-imaging determination information A2 (see FIG. 4) printed on the frosted portion 2*b* of the smear 1 gripped by the handling portion 42.

Image data obtained through the imaging is used by the controller 70 (see FIG. 1) to determine whether or not the smear 1 in a state of being picked up by the handling portion 42 is one that is to be imaged by the smear imaging unit 50. When a storing container 3 is transported to the first position C1, the smear transfer part 41 takes out smears 1, which are stored in the storing container 3, by the handling portion 42 one by one and images the frosted portion 2*b* of each of the taken-out smears 1 by the detector 60.

A smear 1 determined as one that is to be imaged by the smear imaging unit 50 is transferred to a transfer position W by the smear transfer part 41 as shown in FIG. 7. The smear transfer part 41 includes a horizontal movement mechanism 44 at the transfer position W. The horizontal movement mechanism 44 is a mechanism, on the container transport unit 30 side, for relaying the smear 1 between the container transport unit 30 and the smear imaging unit 50.

The horizontal movement mechanism 44 is configured to move the smear 1 in the X direction between the transfer position W and a smear relay part 51 of the smear imaging unit 50. The horizontal movement mechanism 44 receives, at the transfer position W, the smear 1 from the smear transfer part 41, is moved in the X2 direction toward the smear relay part 51 of the smear imaging unit 50, and relays the imaging-target smear 1 to the smear relay part 51. The horizontal movement mechanism 44 receives the smear 1 having been imaged from the smear relay part 51, is moved in the X1 direction toward the transfer position W, and relays, at the transfer position W, the smear 1 having been imaged to the smear transfer part 41.

(Smear Imaging Unit)

With reference back to FIG. 1, the smear imaging unit 50 is configured to image each smear 1 transported together with the storing container 3 from the container transport unit 30. The smear imaging unit 50 includes the smear relay part 51, a transport part 52, an oil applying part 53, an imaging part 54, and an analysis part 55.

The smear relay part 51 is configured to receive each imaging-target smear 1 from the horizontal movement mechanism 44 and relays the smear 1 having been imaged to the horizontal movement mechanism 44. The transport part 52 transports the received imaging-target smear 1 to the oil applying part 53. The oil applying part 53 applies immersion oil to the specimen smeared on the smear 1. The immersion oil is used for increasing a numerical aperture and obtaining a clear image. The transport part 52 transports the smear 1 to the imaging part 54. The imaging part 54 includes a microscope and a camera. The imaging part 54 takes a microscopic image (hereinafter, referred to as "smear image") of the smear 1. The smear image having been taken is outputted to the analysis part 55. The smear 1 having been imaged is returned to the smear relay part 51 by the transport part 52 and relayed from the smear relay part 51 to the horizontal movement mechanism 44.

A configuration regarding control of the test system 100 will be described with reference to FIG. 10.

The smear preparation unit 10 includes a controller 70, a storage 71, a communication part 72, an I/O (input/output) board 73, a display part 74, and an input part 75. The container transport unit 30 includes the detector 60, a communication part 81, and an I/O board 82. The smear imaging unit 50 includes a controller 91, a communication part 92, and an I/O board 93.

A drive mechanism 76 is connected to the I/O board 73 of the smear preparation unit 10. The drive mechanism 76 is a collective term for a motor, a sensor, a valve, and the like provided to the parts of the smear preparation unit 10.

The controller 70 is formed so as to include a memory and a processor such as a CPU or an FPGA, and controls each part of the smear preparation unit 10 through execution, by the processor, of a program 71a stored in the storage 71. The controller 70 includes, as function blocks for the program 71a, a first controller 70a which controls the smear preparation unit 10 and a second controller 70b which controls the container transport unit 30. The first controller 70a controls the drive mechanism 76 via the I/O board 73. That is, the first controller 70a controls an operation of preparing a smear 1 and an operation of transporting a storing container 3 that are performed by the smear preparation unit 10. The second controller 70b controls the container transport unit 30 via the communication part 72.

The storage 71 is a storage implemented by a flash memory and stores therein, in addition to the above program 71a, smear information 71b about smears 1 prepared by the smear preparation unit 10. The smear information 71b includes: the type (the first type or the second type) of each of individual smears 1 stored in a storing container 3; and a transport start time point at which the storing container 3 that stores therein the smears 1 has been transported from the smear storing position Ps. In the present embodiment, the storage 71 stores therein information 71c about a standby situation for imaging processing by the smear imaging unit 50.

The display part 74 can display a setting screen 120 (see FIG. 14) for the controller 70. The input part 75 receives an input operation for the controller 70. The display part 74 is implemented by a liquid crystal display device, and the input part 75 is implemented by a touch panel provided to the display part 74. The communication part 72 is a communication interface for performing communication with the communication part 81 of the container transport unit 30 and the host computer 200. The communication part 72 and the communication part 81 are connected to each other by, for example, a cable (USB cable) according to the USB standard. The communication part 72 is connected to the host computer 200 by, for example, a cable (so-called LAN cable) according to the Ethernet standard. Alternatively, the communication part 72 may be communicably connected to the communication part 81 and the host computer 200 wirelessly.

A transport mechanism 83 is connected to the I/O board 82 of the container transport unit 30. The transport mechanism 83 is a collective term for a motor, a sensor, and the like provided to the container transport unit 30. The detector 60 and the I/O board 82 are each connected to the communication part 81. The communication part 81 is a communication interface for performing communication with the communication part 72 of the smear preparation unit 10.

The second controller 70b controls the transport mechanism 83 and the detector 60 such that detection (i.e., imaging of the frosted portion 2b) by the detector 60 is executed on each of individual smears 1 in a storing container 3 transported to the first position C1. The second controller 70b extracts the necessity-of-imaging determination information A2 through image processing performed on an image of the frosted portion 2b and determines whether the smear 1 is of the first type (is an imaging target) or the second type (is not an imaging target). The second controller 70b controls the transport mechanism 83 to select a smear 1 determined as being of the first type (being an imaging target) on the basis of a detection result from the detector 60 and supply the smear 1 to the smear imaging unit 50. The second controller 70b causes a smear 1 determined as being of the second type (being not an imaging target) on the basis of a detection result from the detector 60 to be kept stored in the storing container 3 at the first position C1 without supplying the smear 1 to the smear imaging unit 50.

The controller 91 of the smear imaging unit 50 is implemented by, for example, a computer including a CPU and a memory. The communication part 92 is a communication interface for performing communication with the analysis part 55 and the host computer 200. The imaging part 54 and the transport part 52 are connected to the I/O board 93 of the smear imaging unit 50. Various mechanisms such as a motor, a sensor, and a valve composing the oil applying part 53 and the like are connected to the I/O board 93, but are not shown in FIG. 10. The controller 91 obtains a microscopic image of the smear 1 by the imaging part 54 via the I/O board 93. The controller 91 transmits the obtained microscopic image to the analysis part 55 via the communication part 92.

The analysis part 55 is implemented by a personal computer (PC) and is mainly composed of: a body composed of a CPU, a ROM, a RAM, etc.; a display part implemented by a liquid crystal display; and an input device composed of a keyboard and a mouse.

The analysis part 55 executes image processing and/or classification processing on the smear image having been taken by the imaging part 54. Specifically, the analysis part 55 executes cell characteristics extraction processing, identification-and-classification processing, and predetermined processing such as cut-out of a blood cell image, automatic classification of blood cells, and counting for each type of blood cell. The image data having been taken and an analysis result can be displayed on the display part or outputted via a printer.

<Control Method for Test System>

Figure 11A:
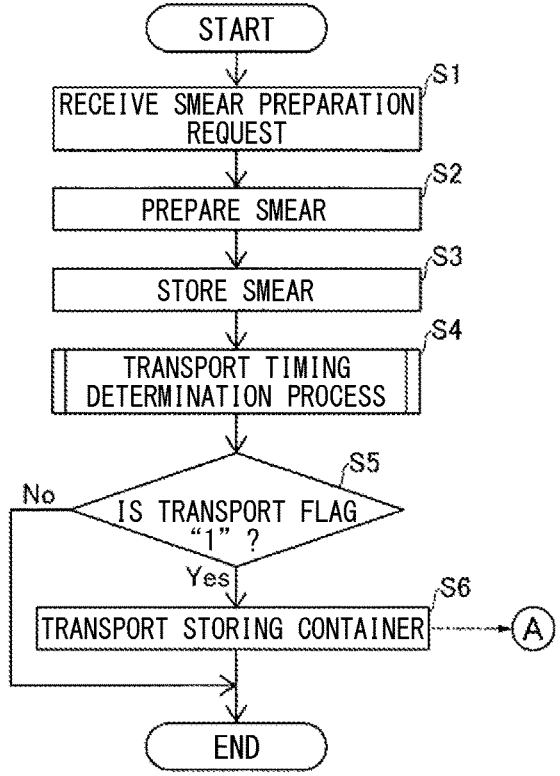
FIGS. 11A and 11B are each a flowchart showing a control method for the test system.
Figure 11B:
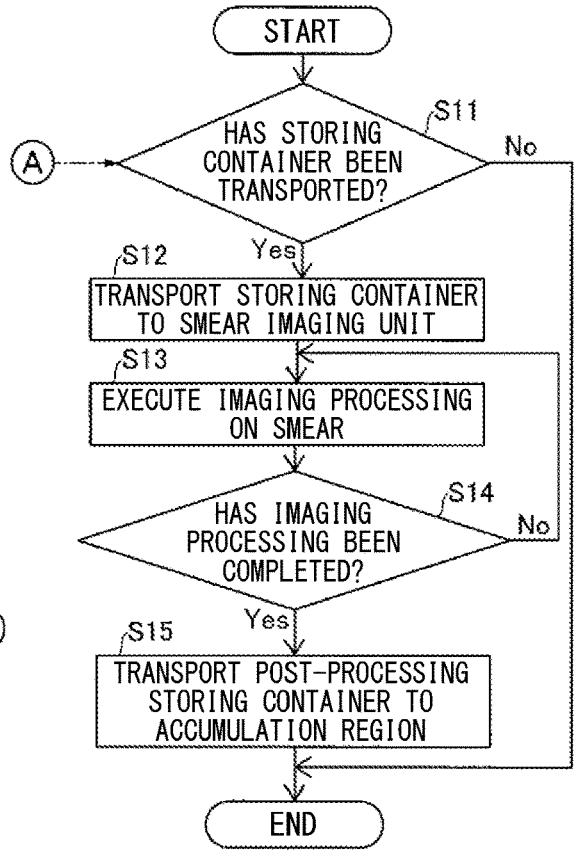

Next, a control method for the test system 100 in the present embodiment will be described. As shown in FIGS. 11A and 11B, the control method for the test system 100 in the present embodiment is a control method for the test system 100 including the smear imaging unit 50 which images a smear 1 of a specimen. The control method includes at least the following steps:

(1) Preparing a plurality of the smears 1 (S2)
(2) Sequentially storing, in a storing container 3 capable of storing therein a plurality of the smears 1, the plurality of smears 1 having been prepared (S3)
(3) Transporting, when information about a standby situation for imaging processing by the smear imaging unit 50 satisfies a predetermined condition, the storing container 3 that stores therein the smears 1 to the smear imaging unit 50 regardless of the number of the smears 1 stored in the storing container 3 (S4 to S6)

Figure 10:
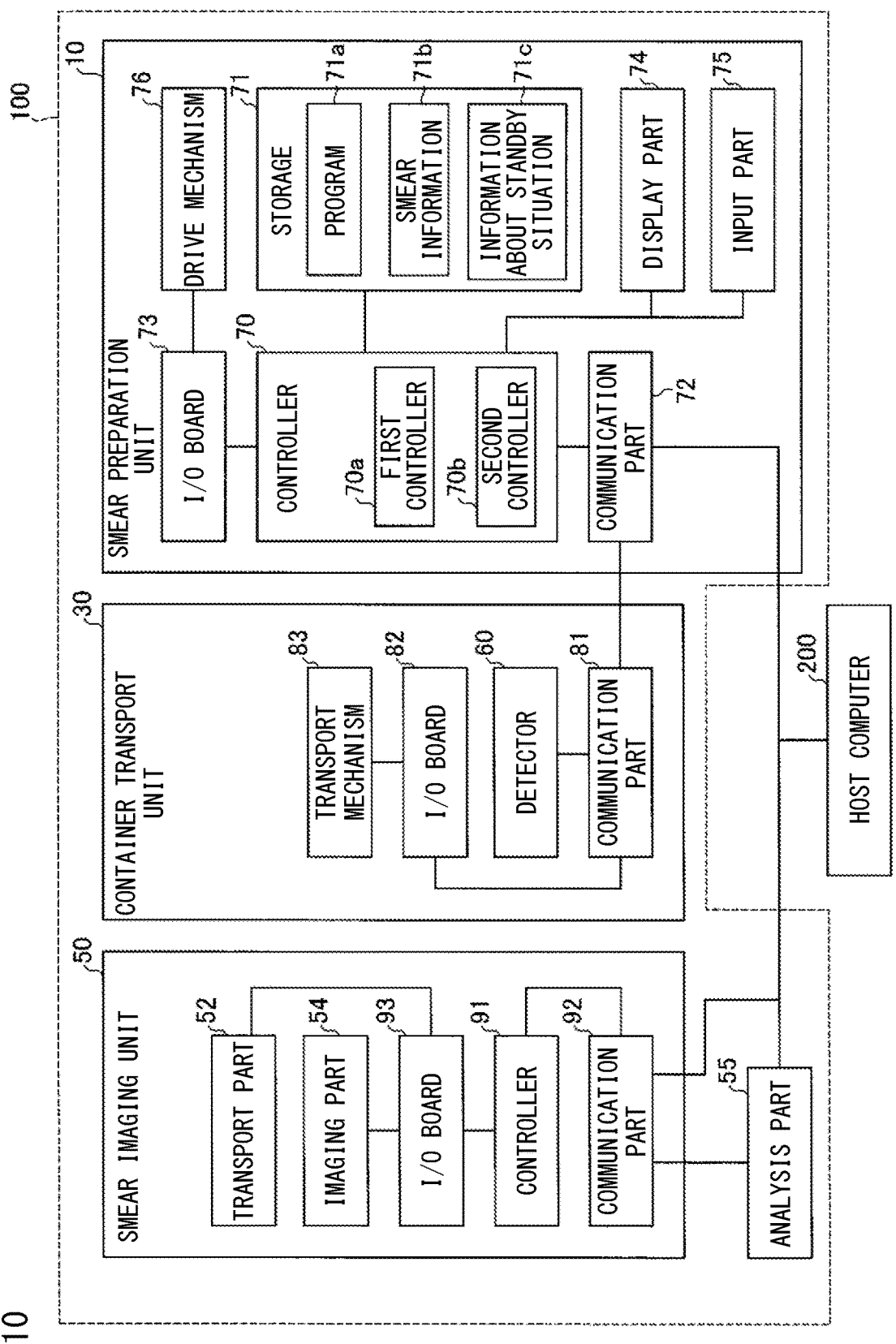
FIG. 10 is a block diagram showing a configuration regarding control of the test system.

These steps (1) to (3) are performed by the controller 70 (see FIG. 10). That is, the controller 70 is configured to perform control to transport, when the information 71c (see FIG. 10) about the standby situation for imaging processing by the smear imaging unit 50 satisfies the predetermined condition, the storing container 3 that stores therein the smears 1 to the smear imaging unit 50 regardless of the number of the smears 1 stored in the storing container 3.

Consequently, even when smears 1 are not stored in all the plurality of storing portions 3a of a storing container 3, i.e., even when a storing container 3 has not become full, the storing container 3 can be transported to the smear imaging unit 50 according to the standby situation for imaging processing by the smear imaging unit 50. Thus, when there are no smears 1 standing by to undergo imaging processing by the smear imaging unit 50 or few smears 1 standing by to undergo imaging processing by the smear imaging unit 50 at timings such as a timing immediately after a working time for an operator starts or a timing at which smear preparation is started, the smears 1 can be supplied to the smear imaging unit 50 earlier than in a case where the storing container 3 is transported after the storing container 3 has become full. Therefore, imaging processing by the smear imaging unit 50 can be started earlier than in said case. As a result, it is possible to adapt to various requirements from operators who perform tasks of checking smear images.

Hereinafter, a specific flow of the control method for the test system 100 will be described. Control (S1 to S6) of the smear preparation unit 10 shown in FIG. 11A is executed by the controller 70 (first controller 70*a*). Control (S11, S12, S14, and S15) of the container transport unit 30 in FIG. 11B is executed by the controller 70 (second controller 70*b*). Control (S13) of the smear imaging unit 50 in FIG. 11B is executed by the controller 91.

As preliminary work before the test system 100 starts operation, a specimen rack 8 holding specimen containers 7 is disposed by a user in the specimen transport part 6 of the smear preparation unit 10. A predetermined number of empty storing containers 3 are disposed by the user in each of the loading portion Pi on the send-in path 23*a* of the smear preparation unit 10 and the setting region D2 on the second transport path 33 of the container transport unit 30. Then, when an instruction to start preparing smears is received from the user, the test system 100 starts control processes shown in FIGS. 11A and 11B. For the configuration of the test system 100, see FIG. 1, and, for the configuration regarding control of the test system 100, see FIG. 10.

In step S1 of FIG. 11A, the first controller 70*a* receives a smear preparation request. The first controller 70*a* causes the specimen transport part 6 to transport the specimen rack 8 and causes the ID reading part 14*a* to obtain an identification (ID) of each specimen transported to the reading position B1. The first controller 70*a* transmits, via the communication part 72, the identification (ID) of each specimen to the host computer 200 and receives, via the communication part 72, a smear preparation request stored in the host computer 200 in association with the identification (ID) from the host computer 200. The smear preparation request includes at least the identification (ID) of the specimen; information as to whether or not the specimen is an imaging target; and a test item for the specimen.

In step S2, the first controller 70*a* performs the following control for executing an operation of preparing a smear 1. Specifically, under the control of the first controller 70*a*, the slide supply part 11 supplies an unused glass slide to the printing part 12, and the printing part 12 prints various kinds of information corresponding to the smear preparation request such as specimen identification information A1, necessity-of-imaging determination information A2, and a two-dimensional code onto the frosted portion 2*b* of the supplied glass slide, and supplies, to the smearing part 13, the glass slide on which printing has been performed. In parallel with this, the suction part 14 suctions the specimen in the specimen container 7 transported to the suction position B2 by the specimen transport part 6 and supplies the suctioned specimen to the smearing part 13. The smearing part 13 smears, on the center portion 2*a* of the glass slide 2 on which printing has been performed and that has been supplied from the printing part 12, the specimen supplied from the suction part 14. The smear 1 on which the specimen has been smeared is supplied from the smearing part 13 to the drying part 15, and the smeared specimen is subjected to drying processing in the drying part 15. Then, the smear 1 having been subjected to the drying processing is supplied to the staining part 10*a*. The smear 1 supplied to the staining part 10*a* is loaded into some or all of the staining chambers 16*a* to 16*e* and the washing chambers 17*a* and 17*b* according to a predetermined sequence by the transfer part 19, whereby the specimen is subjected to staining processing and washing processing. The smear 1 having been subjected to the staining processing and the washing processing is loaded into the drying chamber 18 by the transfer part 19, and is subjected to drying processing in the drying chamber 18. As a result of the series of processing, the process of preparing one smear 1 is completed.

In step S3, the first controller 70*a* performs control to store, in a storing container 3, the smear 1 having been prepared. The first controller 70*a* operates, at the timing of starting the smear preparation operation, the transport part 23 such that the leading one of the storing containers 3 having been set in the loading portion Pi is disposed at the smear storing position Ps in advance. Then, when the smear 1 is prepared in step S3, the first controller 70*a* causes the transfer part 19 to take out the smear 1 from the drying chamber 18 and store the taken-out smear 1 into a vacant storing portion 3*a* of the storing container 3 at the smear storing position Ps.

In step S4, the first controller 70*a* executes a transport timing determination process of determining whether or not a transport timing for the storing container 3 has arrived. In the transport timing determination process, the first controller 70*a* sets a transport flag for the storing container 3 to either "1 (to be transported)" or "0 (not to be transported)". The transport flag is a variable for determining, in a transport control process for the storing container 3 at the smear storing position Ps, whether or not to transport the storing container 3 from the smear storing position Ps. The transport flag is binary data, i.e., "0" or "1". Details of the transport timing determination process in step S4 will be described later.

In step S5, the first controller 70*a* determines whether or not the value of the transport flag is "1". When the value of the transport flag is "0", the first controller 70*a* ends one time of preparation process for the smear 1, without transporting the storing container 3.

Meanwhile, when the value of the transport flag is "1", the first controller 70*a* causes, in step S6, start of transport of the storing container 3 from the smear storing position Ps toward the smear imaging unit 50. That is, the first controller 70*a* causes the laterally-sending mechanism 23*c* to transfer the storing container 3 at the smear storing position Ps from the send-in path 23*a* to the send-out path 23*b* and causes the transferred storing container 3 to be transported through the send-out path 23*b* to the laterally-sending part 24. The first controller 70*a* causes the laterally-sending part 24 to send out the storing container 3 to the first transport path 32 of the container transport unit 30. When transport of the storing container 3 is executed in step S6, the first controller 70*a* sets (resets) the value of the transport flag to "0".

The first controller 70*a* sequentially performs the process from step S1 to step S6 on a plurality of the specimen containers 7 held by the specimen rack 8. When suction of specimens in all the specimen containers 7 held by the specimen rack 8 is completed, the same process is performed on a next specimen rack 8. Thus, the process from step S1 to step S6 is continuously executed at different start timings as long as specimens to be subjected to this process are present in the specimen transport part 6. As a result of repeatedly executing steps S1 to S6, a plurality of smears 1 are sequentially prepared, with a unit number of the smears 1 (one smear 1) being prepared in step S2 of each round. Then, the smears 1 are stored at a predetermined storing time interval T1, with a unit number of the smears 1 (one smear 1) being stored in step S3 of each round. The storing time interval T1 is, for example, 48 seconds. Thus, the first controller 70a also executes determination as to the transport timing for the storing container 3 in step S4 and S5 at the predetermined cycle, i.e., the storing time interval T1.

Next, the flow in FIG. 11B will be described. In step S11, the second controller 70b determines whether or not the storing container 3 has been transported from the smear preparation unit 10. The second controller 70b obtains, from the first controller 70a, information as to whether or not the transport operation (step S6) has been executed. When the transport operation has been executed, the second controller 70b advances the process to step S12. Meanwhile, when the transport operation in step S6 has not been started, the second controller 70b ends the process.

In step S12, the second controller 70b performs the following control for transporting the storing container 3 to the smear imaging unit 50. Specifically, under the control of the second controller 70b, the storing container 3 received on the first transport path 32 is transported toward the first position C1 through the first transport path 32. When the container sensor 34a has detected that a storing container 3 has already been disposed at the first position C1, the received storing container 3 is transported until the received storing container 3 is detected by the container sensor 34b at the second position C2. When the container sensor 34b has detected that a storing container 3 has already been disposed at the second position C2, the received storing container 3 is transported to a position on the X1 side relative to the second position C2.

When the storing container 3 is transported to the first position C1, the second controller 70b causes the detector 60 to perform determination as to the smear. Specifically, the second controller 70b causes the smear transfer part 41 to take out the smears 1 in the storing container 3 at the first position C1 one by one, and causes the detector 60 to image (see FIG. 9) the frosted portion 2b of each of the taken-out smears 1. The second controller 70b checks the printed content of the necessity-of-imaging determination information A2 on the basis of the image of the frosted portion 2b, to determine whether this smear 1 is an imaging target (is of the first type) or is not an imaging target (is of the second type). When a storing container 3 disposed in the interruption region C4 is transported to the first position C1, each smear 1 stored in the storing container 3 has been manually prepared, and thus has no necessity-of-imaging determination information A2 printed thereon. In the case where a smear 1 has no necessity-of-imaging determination information A2 printed thereon as well, the second controller 70b determines that the smear 1 is an imaging target (is of the first type). Determination as to the smear type is performed on all the smears 1 stored in the storing container 3.

In step S13, the controller 91 of the smear imaging unit 50 executes imaging processing on the smear.

First, the second controller 70b causes the smear transfer part 41 to take out an imaging-target (first-type) smear 1 among the smears 1 in the storing container 3 at the first position C1; and relay the taken-out smear 1 to the smear relay part 51 via the horizontal movement mechanism 44. The controller 91 causes the smear relay part 51 to receive the imaging-target smear 1 from the container transport unit 30 (horizontal movement mechanism 44) and causes the transport part 52 to transport the smear 1. The controller 91 causes the imaging part 54 to image the smear 1. After the imaging, the controller 91 causes the transport part 52 to return the smear 1 having been imaged to the smear relay part 51 and causes the smear 1 to be relayed from the smear relay part 51 to the horizontal movement mechanism 44. At this time, when a next imaging-target smear 1 is held by the horizontal movement mechanism 44, the controller 91 causes the smear relay part 51 to receive the next smear 1.

When the horizontal movement mechanism 44 receives the smear 1 having been imaged, the second controller 70b causes the smear transfer part 41 to take out, at the transfer position W, the smear 1 having been imaged from the horizontal movement mechanism 44; and store the smear 1 having been imaged into a vacant storing portion 3a of a storing container 3 having been transported to the imaged-smear storing position D1.

In step S14, the second controller 70b determines whether or not imaging processing has been completed for all the imaging-target (first-type) smears 1 among the smears 1 in the storing container 3 disposed at the first position C1. Specifically, when the storing container 3 stores therein only non-imaging-target (second-type) smears 1 or stores therein no smears 1 at all, the second controller 70b determines that imaging processing has been completed for this storing container 3. When the storing container 3 stores therein one or more imaging-target (first-type) smears 1, the second controller 70b determines that imaging processing has not been completed, and returns the process to step S13.

When the second controller 70b determines that imaging processing has been completed for the imaging-target smears 1, the second controller 70b advances the process to step S15 in which, through the first transport path 32, the storing container 3 disposed at the first position C1 is transported from the first position C1 to the first accumulation region C3, and the next storing container 3 having been on standby at the second position C2 is transported to the first position C1.

In this manner, the second controller 70b causes the container transport unit 30 to sequentially transport the storing containers 3 transported from the smear preparation unit 10 to the first position C1; take out, one by one, imaging-target smears 1 in the storing container 3 disposed at the first position C1; and supply the smear 1 to the smear imaging unit 50. When the storing container 3 disposed at the first position C1 has no imaging-target smears 1 anymore, the second controller 70b performs control to transport the storing container 3 from the first position C1 to the first accumulation region C3 and transport the next storing container 3 to the first position C1.

<Transport Timing Determination Process>

Figure 12:
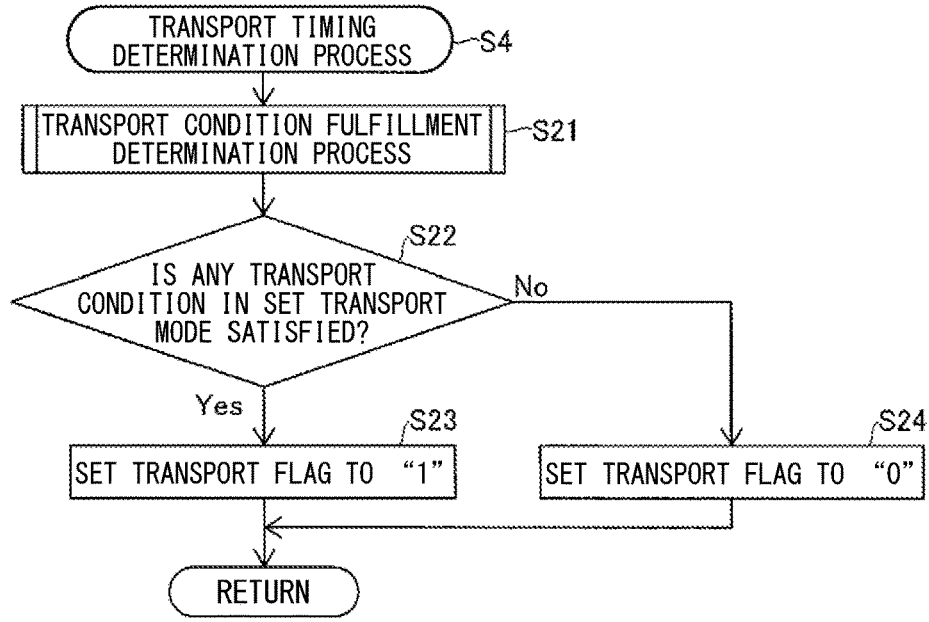
FIG. 12 is a flowchart showing a transport timing determination process for a storing container.

Next, details of the transport timing determination process shown in step S4 of FIG. 11A will be described. As shown in FIG. 12, the transport timing determination process involves determination based on whether or not a preset transport condition is satisfied. That is, the first controller 70a executes a transport condition fulfillment determination process in step S21. The transport condition fulfillment determination process is a process of determining whether or not a transport condition in a preset transport mode is satisfied. A part or the entirety of the transport condition as to which determination is performed differs according to the transport mode. In the transport condition fulfillment determination process, the first controller 70a determines that "the transport condition is fulfilled" or "the transport condition is not fulfilled".

In step S22, the first controller 70a determines, on the basis of the result of the transport condition fulfillment determination process in step S21, whether or not the transport condition in the preset transport mode is satisfied. When the result of the determination in step S21 is that "the transport condition is fulfilled", the first controller 70a sets the value of the transport flag to "1" in step S23. As a result, the storing container 3 is transported in step S6 of FIG. 11A. Meanwhile, when the result of the determination in step S21 is that "the transport condition is not fulfilled", the first controller 70a sets the value of the transport flag to "0" in step S24. In this case, it is determined in step S5 of FIG. 11A that the transport timing has not arrived, and the process is ended without transporting the storing container 3.

<Transport Mode>

In the present embodiment, the controller 70 (first controller 70a) is configured to receive selection of any transport mode 110 from among a plurality of types of transport modes 110 (see FIG. 13) including at least a transport mode for which a transport condition including a predetermined condition based on the information 71c about the standby situation has been set. When the transport condition having been set for the selected transport mode 110 is satisfied, the controller 70 (first controller 70a) causes the storing container 3 that stores therein the smears 1 to be transported to the smear imaging unit 50.

Consequently, each of transport of the storing container 3 and imaging by the smear imaging unit 50 can be performed at a transport timing based on a requirement from the user. Specifically, depending on how large the number of smear preparation requests is or the situation of the user, there are various cases including not only a case where a smear image is desired to be checked at an early stage but also a case where the transport frequency is desired to be decreased, and other cases. Thus, the test system 100 can be operated according to the requirement from the user.

In the example shown in FIG. 13, five types of transport modes, i.e., a first transport mode to a fifth transport mode, are set as the plurality of types of transport modes 110. Among the transport modes, transport modes 110 for which the transport condition based on the information 71c about the standby situation has been set are two transport modes which are the fourth transport mode and the fifth transport mode. Hereinafter, the transport modes 110 will be sequentially described. Rows in FIG. 13 indicate the respective transport modes 110, i.e., the first transport mode to the fifth transport mode, and columns in FIG. 13 indicate respective transport conditions applied to the transport modes 110. Each round mark shown in FIG. 13 indicates that the transport condition in the column provided with the round mark is applied to the corresponding transport mode 110. When a plurality of round marks are provided in a single row, this means that the corresponding transport mode 110 includes a plurality of transport conditions. When any one of these plurality of transport conditions is satisfied, it is determined that the transport condition is satisfied.

Figure 14:
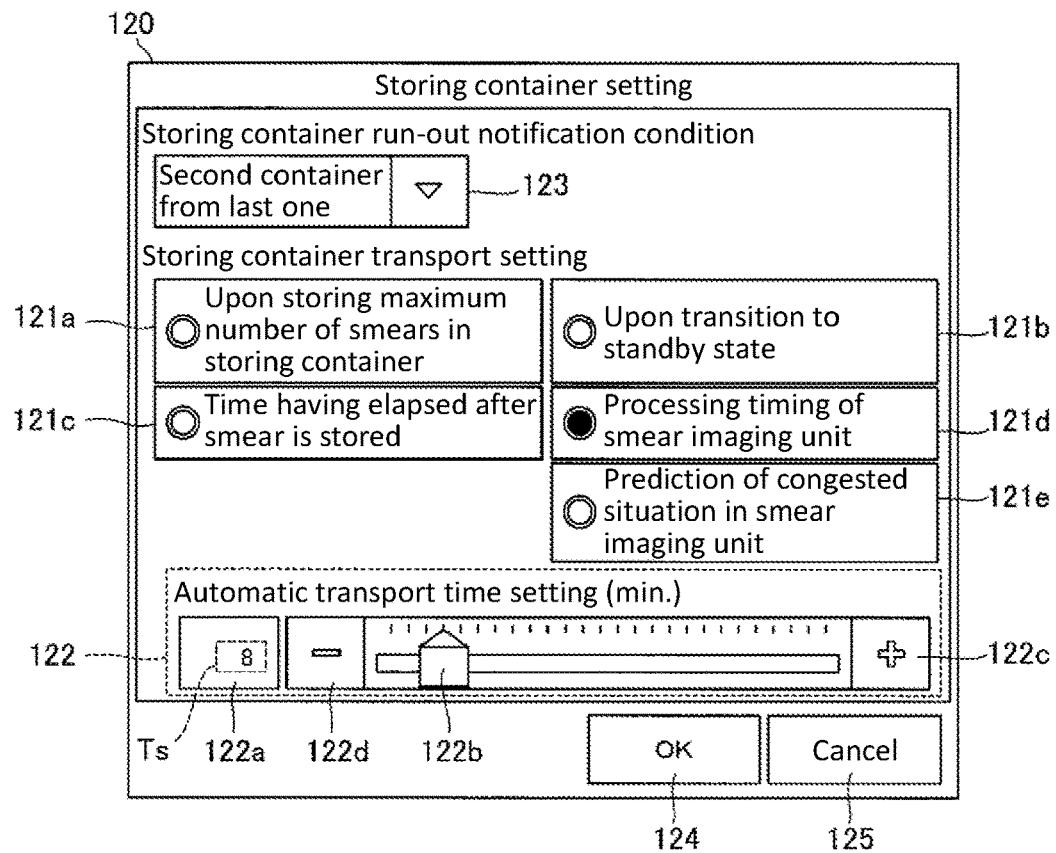
FIG. 14 explains an example of a transport mode setting screen.

FIG. 14 shows an example of the setting screen 120 for setting any of the transport modes. The first controller 70a causes the display part 74 to display the setting screen 120 and receives an input operation from a user, to select a transport mode.

The setting screen 120 includes five types of choices 121a to 121e which are each of a radio button type, in the item "Storing container transport setting".

When the choice 121a displayed with the text "Upon storing maximum number of smears in storing container" is selected, the first controller 70a is operated in the first transport mode. When the choice 121b displayed with the text "Upon transition to standby state" is selected, the first controller 70a is operated in the second transport mode. When the choice 121c displayed with the text "Time having elapsed after smear is stored" is selected, the first controller 70a is operated in the third transport mode. When the choice 121c is selected, a time input portion 122, for a setting time Ts described later, displayed on the lower side of the setting screen 120 becomes able to be set. Meanwhile, when the choice 121c is not selected, the time input portion 122 is displayed in a grayed-out manner so as not to receive any input operation. The time input portion 122 includes a display field 122a for the setting time Ts, and a slider 122b. When a user moves the slider 122b, a numerical value corresponding to the position of the slider 122b is set and displayed in the display field 122a. In addition, the numerical value of the setting time Ts can be adjusted by unit amount each time either of a plus button 122c and a minus button 122d is selected. When the choice 121d displayed with the text "Processing timing of smear imaging unit" is selected, the first controller 70a is operated in the fourth transport mode. When the choice 121e displayed with the text "Prediction of congested situation in smear imaging unit" is selected, the first controller 70a is operated in the fifth transport mode.

The item "Storing container run-out notification condition" on the upper side of the setting screen 120 is provided with a notification condition input portion 123 for setting a condition according to which a notification that the number of empty storing containers 3 accumulated on the send-in path 23a shown in FIG. 1 has decreased is given. When a storing container 3 that stores therein smears 1 is transported, replenishment with an empty storing container 3 from the send-in path 23a is performed. Thus, replenishment with an empty storing container 3 is performed by a user before the storing containers 3 accumulated on the send-in path 23a run out. The first controller 70a causes the display part 74 to display a predetermined report message when the number of remaining storing containers 3 accumulated on the send-in path 23a becomes equal to the set number inputted to the notification condition input portion 123.

When an OK button 124 is selected, the first controller 70a reflects the set content in the storage 71. When a cancel button 125 is selected, the first controller 70a closes the setting screen 120 without reflecting the set content.

<First Transport Mode>

The transport condition in the first transport mode shown in FIG. 13 is that a maximum number M of smears 1 capable of being stored in the storing container 3 are stored. For the first transport mode, no transport condition other than the condition regarding the maximum number is set. That is, in the first transport mode, the first controller 70a does not cause a storing container 3 at the smear storing position Ps shown in FIG. 15 to be transported until the maximum number M of smears 1 are stored in the storing container 3, and the first controller 70a causes the storing container 3 to be transported when the maximum number M of smears 1 are stored in the storing container 3. As described above, the maximum number M is 10 in the present embodiment.

<Second Transport Mode>

The second transport mode in FIG. 13 includes two transport conditions, i.e., the condition that "the maximum number M of smears 1 capable of being stored in the storing container 3 are stored" and the condition that "the smear preparation unit 10 enters a standby state". The standby state is a state where smear preparation is not being performed in the smear preparation unit 10; and no smear 1 planned to be stored next exists at the determination timing. For example, when the smear preparation process has been performed on all the specimen containers 7 having been set in the specimen transport part 6, the smear preparation unit 10 is kept in the standby state until a next specimen rack 8 is set and the smear preparation process is restarted.

Figure 15:
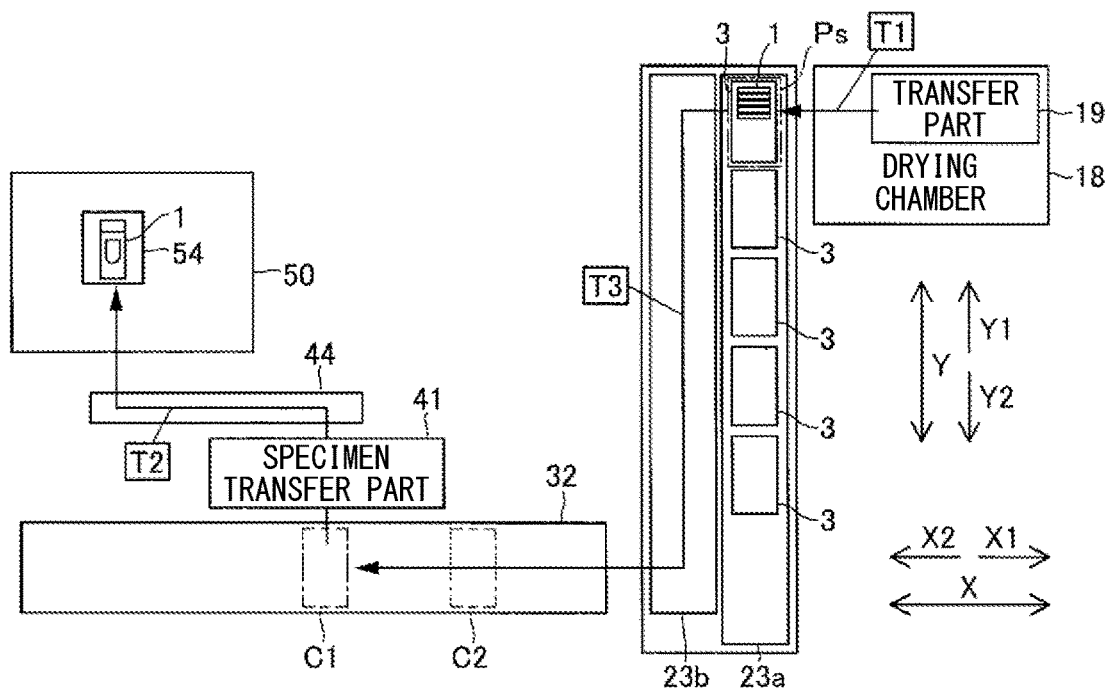
FIG. 15 is a plan view for explaining a transport path for smears and storing containers.

In the second transport mode, when the maximum number M of smears 1 are stored in the storing container 3 at the smear storing position Ps shown in FIG. 15, the first controller 70a causes transport of the storing container 3, and meanwhile, when the smear preparation unit 10 enters the standby state before the stored number becomes the maximum number M, the first controller 70a causes transport of the storing container 3 even though the stored number is not the maximum number M.

<Third Transport Mode>

The third transport mode in FIG. 13 includes two transport conditions, i.e., the condition that "the smear preparation unit 10 enters the standby state" and "a setting time (referred to as "setting time Ts") elapses from storing of a first smear 1 in the storing container 3". As shown in FIG. 14, when the third transport mode is set, the first controller 70a can receive setting of the value of the setting time Ts from storing of the first smear 1. In the third transport mode, when the smear preparation unit 10 enters the standby state or the setting time Ts elapses from storing of the first smear 1 in the storing container 3, the first controller 70a causes transport of the storing container 3.

As described above, storing of the smear 1 is executed at the predetermined storing time interval T1, and thus the value of the setting time Ts can be set in a range in which $0 \leq Ts \leq \{(M-1) \times T1\}$ is satisfied. In the case of Ts=0, the storing container 3 is transported at the timing at which the first smear 1 is stored in the storing container 3. In the case of Ts=$\{(M-1) \times T1\}$, transport is performed at the timing of arrival at the maximum number M as long as smears 1 are stored at the storing time interval T1, but, when preparation of smears 1 is temporarily interrupted, the storing container 3 is transported at the elapse of the setting time Ts even without arrival at the maximum number M.

<Fourth Transport Mode>

The fourth transport mode in FIG. 13 includes, as described above, the predetermined condition based on the information 71c (see FIG. 10) about the standby situation for imaging processing. In the present embodiment, whether or not the predetermined condition is satisfied is determined on the basis of the information 71c about the standby situation. Consequently, in particular, when there are no or few smears 1 standing by to undergo imaging processing by the smear imaging unit 50, smear images can be taken early.

Specifically, the fourth transport mode includes four transport conditions, i.e., the condition that "the maximum number M of smears 1 capable of being stored in the storing container 3 are stored", the condition that "the smear preparation unit 10 enters the standby state", the condition that "the remaining time (hereinafter, referred to as "remaining time Tr") lasting until imaging processing for smears 1 in a storing container 3 that has started to be transported is ended is equal to or shorter than a required-for-arrival time T3", and the condition that "no storing containers 3 that have started to be transported are present at predetermined positions on the transport path". The information 71c about the standby situation for imaging processing includes: information (see FIG. 16) about the remaining time Tr lasting until imaging processing is ended; and information about presence/absence of a storing container 3 that has started to be transported and that is present at either of the predetermined positions on the transport path.

In the transport condition that "the remaining time Tr lasting until imaging processing for smears 1 in a storing container 3 that has started to be transported is ended is equal to or shorter than the required-for-arrival time T3", the required-for-arrival time T3 (see FIG. 15) is a time that the storing container 3 at the smear storing position Ps takes to arrive at the first position C1 from start of transport of the storing container 3. In the present embodiment, the required-for-arrival time T3 is longer than the storing time interval T1. The required-for-arrival time T3 is, for example, 57 seconds.

In the fourth transport mode, the first controller 70a obtains the remaining time Tr lasting until imaging processing is ended, on the basis of a detection result, from the detector 60, regarding the smears 1 stored in the storing container 3 that has started to be transported; and a time (hereinafter, referred to as "unit time T2") required for performing imaging processing on one smear 1. The time T2 required for imaging processing may be considered to be a time interval from a timing at which one smear 1 is taken out from the storing container 3 at the first position C1 to a timing at which a next smear 1 is taken out from the storing container 3 at the first position C1. The unit time T2 has a constant value predetermined according to the specifications of the smear imaging unit 50 and is, for example, 120 seconds.

Figure 16:
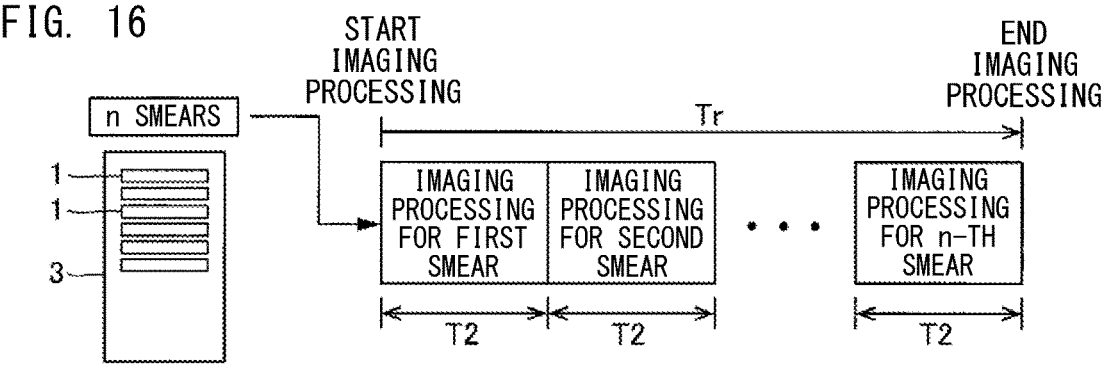
FIG. 16 explains a remaining time lasting until imaging processing is ended.

As shown in FIG. 16, the first controller 70a obtains the number n of the imaging-target (first-type) smears 1 in the storing container 3 at the first position C1 on the basis of the detection result from the detector 60 (see FIG. 9). The remaining time Tr from the present timing until imaging processing for all the first-type smears 1 stored in the storing container 3 at the first position C1 is completed, is calculated according to a product (n×T2) of the number n and the unit time T2 required for performing imaging processing on one smear 1.

Consequently, since the smears 1 in the storing container 3 that has started to be transported are actually detected by the detector 60, the remaining time Tr lasting until imaging processing for the smears 1 in the storing container 3 that has already started to be transported is ended, can be accurately calculated. That is, even when the number n of the smears 1 in the storing container 3 that has started to be transported varies (even when storing has not necessarily been performed to the full capacity), the remaining time Tr can be accurately ascertained.

The first controller 70a controls the transport timing for the storing container 3 on the basis of information about the remaining time Tr when a storing container 3 is present at the first position C1. In this manner, the predetermined condition includes the condition that the remaining time Tr is equal to or shorter than the predetermined time (required-for-arrival time T3) when a storing container 3 is present at the first position C1. Consequently, even when a storing container 3 is present at the first position C1, when the remaining time Tr of imaging processing for smears 1 in the storing container 3 is short, it is known that the storing container 3 that stores therein the smears 1 standing by to undergo imaging processing is to become absent on the transport path in a short time. In view of this, the remaining time Tr is taken into account, whereby the storing container 3 can be transported such that the smear imaging unit 50 does not enter a standby state of waiting for supply of smears 1. That is, the time during which the smear imaging unit 50 is not executing imaging processing can be shortened.

In the present embodiment, no detector is provided at the second position C2. Therefore, when a storing container 3 is present at the second position C2, the remaining time Tr cannot be accurately determined on the basis of the detection result from the detector 60. Thus, determination as to the transport condition that "the remaining time Tr is equal to or shorter than the required-for-arrival time T3" in the fourth transport mode, is performed when no storing container 3 is present at the second position C2.

Next, the transport condition that "no storing containers 3 that have started to be transported are present at the predetermined positions on the transport path" will be described. The predetermined condition includes the condition that no storing containers 3 being transported are present at the predetermined positions. The first controller 70a controls the transport timing for the storing container 3 according to this condition on the basis of the information about presence/absence of a storing container 3 that has started to be transported and that is present at either of the predetermined positions on the transport path.

Consequently, when a storing container 3 that has already started to be transported is present on the transport path, it is known that imaging processing for smears 1 in the storing container 3 can be performed without delay. Meanwhile, when no storing container 3 that has started to be transported is present on the transport path, it is known that execution of no transport of the storing container 3 leads to elongation of the standby time on the smear imaging unit 50 side. Thus, when transport of the storing container 3 is executed according to whether or not a storing container 3 that has started to be transported is present on the transport path, the standby time for start of imaging processing can be shortened.

As shown in FIG. 15, in the present embodiment, the predetermined positions on the transport path include: the first position C1 at which a smear 1 to be supplied to the smear imaging unit 50 is taken out from a storing container 3; and the second position C2, on the upstream side relative to the first position C1, at which a storing container 3 stands by to be transported to the first position C1.

In the present embodiment, the predetermined condition includes the condition that a storing container 3 is absent at at least one of the first position C1 and the second position C2. Consequently, when a storing container 3 is present at at least one of the first position C1 and the second position C2, a storing container 3 that stores therein smears 1 standing by to undergo imaging processing is present on the transport path, and thus it can be determined that there is a low probability that start of imaging processing is delayed, even when the storing container 3 is not immediately transported. When a storing container 3 is present at neither the first position C1 nor the second position C2, it can be determined that there is a high probability that the smear imaging unit 50 stands by without being able to start imaging processing, even when the smear imaging unit 50 enters a state of being able to execute imaging processing on smears 1 in a next storing container 3. Thus, when transport of the storing container 3 is executed according to whether or not a storing container 3 is present at at least one of the first position C1 and the second position C2, the standby time for start of imaging processing by the smear imaging unit 50 can be shortened. In the present embodiment, the first controller 70a controls transport of the storing container 3 on the basis of information about presence/absence of a storing container 3 at at least the second position C2.

In the present embodiment, the predetermined condition includes the condition that a storing container 3 is present at neither the first position C1 nor the second position C2. That is, when no storing container 3 is present at the second position C2, the first controller 70a controls the transport timing for the storing container 3 further on the basis of information about presence/absence of a storing container 3 at the first position C1. Here, whether the smear imaging unit 50 is performing imaging processing or is in the standby state of waiting for supply of smears 1 can be determined on the basis of presence/absence of a storing container 3 at the first position C1. When the smear imaging unit 50 is in the standby state, swifter transport of the storing container 3 enables swifter start of imaging processing by the smear imaging unit 50. Thus, when a storing container 3 is present at neither the first position C1 nor the second position C2, transport of the storing container 3 is executed, whereby the standby time for start of imaging processing by the smear imaging unit 50 can be shortened.

<Description of Details of Fourth Transport Mode>

A transport condition fulfillment determination process based on the information 71c about the standby situation for imaging processing in the fourth transport mode will be described with reference to FIG. 17. Thus, two transport conditions in the fourth transport mode, i.e., the condition that the maximum number M of smears 1 capable of being stored in the storing container 3 are stored and the condition that the smear preparation unit 10 enters the standby state, will not be described here. This processing corresponds to the processing in step S21 shown in FIG. 12.

In step S31, the first controller 70a determines whether or not a storing container 3 is present at the second position C2, on the basis of an output from the container sensor 34b. When a storing container 3 is present at the second position C2, the first controller 70a determines that the transport condition is not fulfilled, in step S36. Meanwhile, when no storing container 3 is present at the second position C2, the first controller 70a determines, on the basis of an output from the container sensor 34a, whether or not a storing container 3 is present at the first position C1, in step S32. When no storing container 3 is present at the first position C1, the first controller 70a advances the process to step S34.

Meanwhile, when a storing container 3 is present at the first position C1, the first controller 70a determines whether or not the remaining time Tr lasting until imaging processing for smears 1 stored in the storing container 3 at the first position C1 is ended is equal to or shorter than the required-for-arrival time T3, in step S33. When the remaining time Tr is longer than the required-for-arrival time T3 prestored in the storage 71, the first controller 70a determines that the transport condition is not fulfilled, in step S36. Meanwhile, when the remaining time Tr lasting until imaging processing is ended is equal to or shorter than the required-for-arrival time T3, the first controller 70a advances the process to step S34.

In step S34, the first controller 70a determines whether or not the elapsed time from a previous time of transport of a storing container 3 (hereinafter, referred to as "elapsed time Te") is equal to or shorter than the required-for-arrival time T3. Specifically, the first controller 70a obtains, on the basis of information stored in the storage 71 and related to a transport start time point of a storing container 3 that has started to be transported, an elapsed time Te from the transport start time point of the previously transported storing container 3 to the present timing. When the obtained elapsed time Te from the previous time of transport is equal to or shorter than the required-for-arrival time T3 prestored in the storage 71, the first controller 70a controls transport of the storing container 3 so as not to start transport of the storing container 3. That is, the first controller 70a determines that the transport condition is not fulfilled, in step S36. Meanwhile, when the obtained elapsed time Te from the previous time of transport is longer than the required-for-arrival time T3, the first controller 70a advances the process to step S35.

Regarding this step S34, when a storing container 3 is transported from the smear storing position Ps, the storing container 3 arrives at the first position C1 after the required-for-arrival time T3 elapses from the transport start time point as shown in FIG. 15. Thus, when the elapsed time Te from the previous transport start time point is equal to or shorter than the required-for-arrival time T3, it is known that the previously transported storing container 3 is transported to the first position C1 without delay. Thus, when the elapsed time Te is equal to or shorter than the required-for-arrival time T3 in step S34, transport of the storing container 3 is controlled so as not to start transport of the storing container 3, whereby it is possible to inhibit transport from being executed more than necessary in a state where the number of the smears 1 stored in the storing container 3 is small.

Meanwhile, when the elapsed time Te from the previous transport start time point is longer than the required-for-arrival time T3, the previously transported storing container 3 is expected to have already arrived at the first position C1 or the second position C2. Thus, when the storing container 3 is present at neither the first position C1 nor the second position C2, it is known that no storing container 3 is present on the transport path. In view of this, when the elapsed time Te from the previous transport start time point is longer than the required-for-arrival time T3, the first controller 70a advances the process to step S35.

In this manner, in the fourth transport mode, the information 71c (see FIG. 10) about the standby situation includes information about the transport start time point of each storing container 3, and the predetermined condition further includes a condition regarding the transport start time point of the previously transported storing container 3.

Thus, by taking into account the information about the transport start time point of the previously transported storing container 3, it is possible to ascertain that the storing container 3 is being transported even though the storing container 3 is present at neither the first position C1 nor the second position C2. Therefore, it is possible to inhibit transport from being executed more than necessary in a state where the number of the smears 1 stored in the storing container 3 is small.

Figure 17:
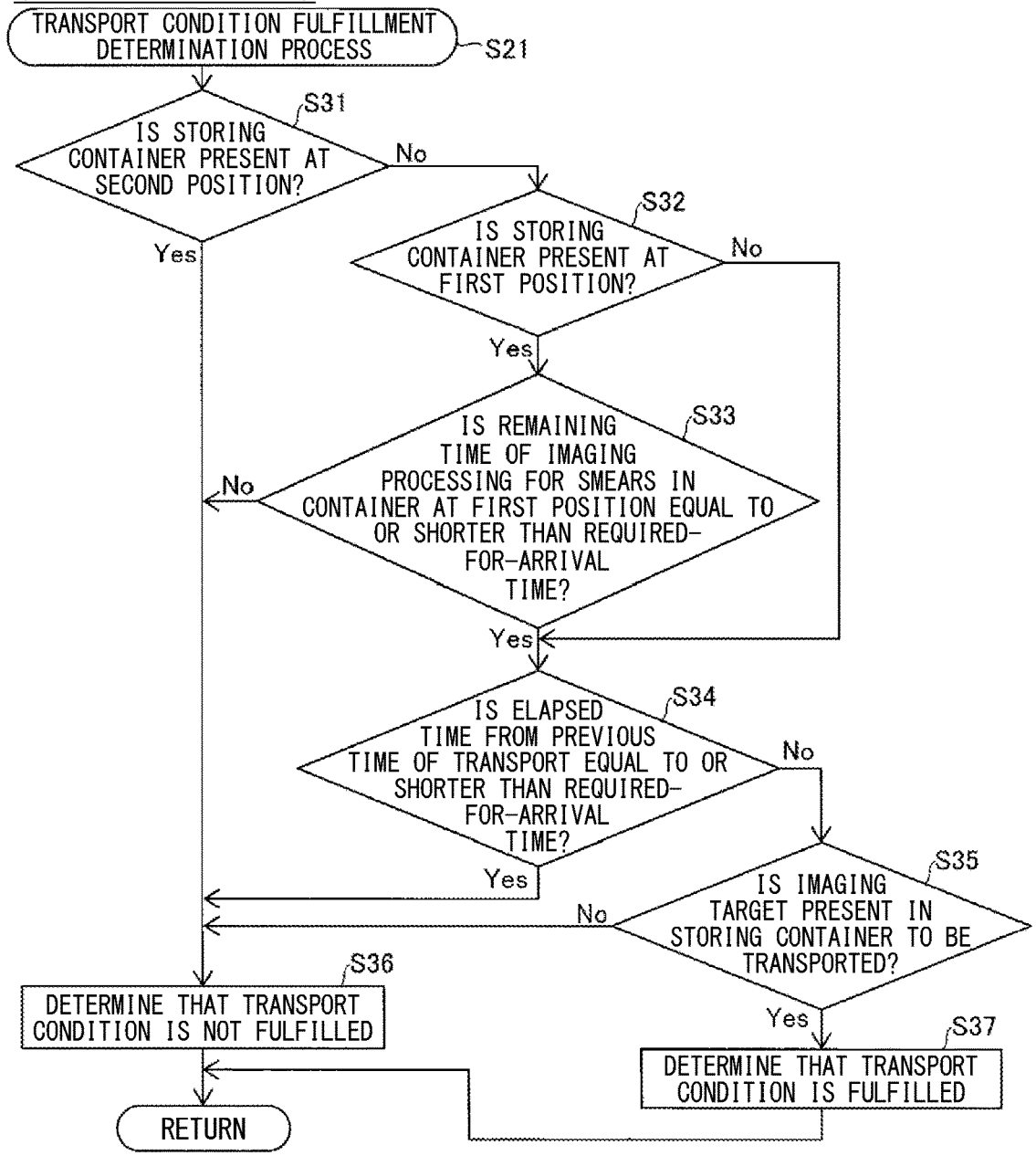
FIG. 17 is a flowchart for explaining a transport condition fulfillment determination process based on a standby situation for imaging processing in a fourth transport mode.

In step S35 of FIG. 17, the first controller 70a determines whether or not an imaging-target (first-type) smear 1 is present in the storing container 3 to be transported this time (the storing container 3 at the smear storing position Ps). The first controller 70a determines, on the basis of the smear information 71b about the smears 1 stored in the storing container 3 at the smear storing position Ps, whether or not a first-type smear 1 is stored in the storing container 3 at the smear storing position Ps. When not a single first-type smear 1 is stored in the storing container 3 at the smear storing position Ps (the number of first-type smears 1 is zero), the first controller 70a determines that the transport condition is not fulfilled, in step S36. Meanwhile, when one or more first-type smears 1 are stored in the storing container 3 at the smear storing position Ps, the first controller 70a determines that the transport condition is fulfilled, in step S37. As a result, the transport flag is set to "1" in step S23 shown in FIG. 12.

In this manner, in the present embodiment, the predetermined condition includes the condition that a first-type smear 1 is present in the storing container 3 at the smear storing position Ps in a case where the elapsed time Te from the transport start time point of the previously transported storing container 3 is longer than the required-for-arrival time T3. The first controller 70a controls the transport timing for the storing container 3 on the basis of presence/absence of a first-type smear 1 in the storing container 3 at the smear storing position Ps.

Here, when no imaging-target smear 1 is present in the storing container 3 at the smear storing position Ps in FIG. 15, start of imaging by the smear imaging unit 50 is not hastened even when the storing container 3 is transported. In view of this, determination as to presence/absence of a first-type smear 1 is performed, whereby a next storing container 3 can be transported in consideration of whether or not start of imaging by the smear imaging unit 50 can be hastened.

<Fifth Transport Mode>

The fifth transport mode in FIG. 13 includes, as described above, a transport condition based on the information 71c about the standby situation for imaging processing. One of differences between the fifth transport mode and the fourth transport mode is as follows. That is, in the fourth transport mode, the remaining time Tr lasting until imaging processing is ended is obtained on the basis of the detection result from the detector 60, whereas, in the fifth transport mode, the remaining time Tr lasting until imaging processing is ended is estimated on the basis of the smear information 71b about smears 1 having been prepared by the smear preparation unit 10.

Specifically, the fifth transport mode includes three transport conditions, i.e., the condition that "the maximum number M of smears 1 capable of being stored in the storing container 3 are stored", the condition that "the smear preparation unit 10 enters the standby state", and the condition that "the remaining time Tr lasting until imaging processing for smears 1 in a storing container 3 that has started to be transported is ended is equal to or shorter than the required-for-arrival time T3". In the fifth transport mode, the information 71c about the standby situation includes information about the remaining time Tr lasting until imaging processing for smears 1 in a storing container 3 that has started to be transported is ended.

The first controller 70a obtains the remaining time Tr on the basis of the smear information 71b (see FIG. 10) about smears 1 stored, by the smear preparation unit 10, in a storing container 3 that has started to be transported; and the unit time T2 required for performing imaging processing on one smear 1.

Consequently, when the number n of the smears 1 stored by the smear preparation unit 10 is obtained from the smear information 71b, the remaining time Tr lasting until imaging processing for the smears 1 in the storing container 3 that has started to be transported is ended can be calculated. When the remaining time Tr is long, it can be determined that there is a low probability that start of imaging processing is delayed, even when the storing container 3 is not immediately transported. Meanwhile, when the remaining time Tr is short, it can be determined that there is a high probability that imaging processing cannot be started, even when the smear imaging unit 50 enters a state of being able to execute imaging processing on smears 1 in the next storing container 3. Thus, the standby time for start of imaging processing by the smear imaging unit 50 can be effectively shortened by executing transport of the storing container 3 according to information about the remaining time Tr. Further, the number n of smears 1 can be obtained on the basis of a record regarding storing, in the storing container 3, that has been actually performed by the smear preparation unit 10. Thus, even when the number of the smears 1 in the storing container 3 that has started to be transported varies (even when storing has not necessarily been performed to the full capacity), the remaining time Tr can be accurately calculated.

Specifically, each time one smear 1 is stored in a storing container 3, the first controller 70a stores smear information 71b about the smear 1 into the storage 71. The smear information 71b includes: the type (the first type or the second type) of the stored smear 1; and the transport start time point at which the storing container 3 storing therein the smear 1 is transported from the smear storing position Ps. Thus, when the storing container 3 is transported, the first controller 70a can obtain, from the smear information 71b, the number n of imaging-target (first-type) smears 1 stored in the storing container 3. Each time a storing container 3 is transported, the first controller 70a adds the value of the product (n×T2) of the number n of imaging-target smears 1 stored in the storing container 3 and the unit time T2 to the remaining time Tr lasting until imaging processing is completed. For example, the sequence according to which storing containers 3 are transported is represented by a variable x, and the number of first-type smears 1 stored in the x-th transported storing container 3 is defined as nx. The remaining time Tr is calculated as follows: remaining time Tr=T3+ (n1×T2)+(n2×T2)+ . . . +(nx×T2). The first controller 70a counts down the remaining time Tr over time, to obtain the value of the remaining time Tr at the present timing. Then, when the remaining time Tr becomes equal to or shorter than the required-for-arrival time T3, the first controller 70a transports the next storing container 3.

In the fifth transport mode, the remaining time Tr is calculated on the basis of a record of smears 1 stored by the smear preparation unit 10, without using any detection result from the detector 60. Thus, the position of the storing container 3 that has started to be transported (whether the storing container 3 is located at the first position C1, the second position C2, or another position) is not taken into account. Therefore, determination as to fulfillment of the transport condition is performed according to the relationship in magnitude between the estimated remaining time Tr and the required-for-arrival time T3 regardless of presence/absence of a storing container 3 at the first position C1 and the second position C2.

<Description of Details of Fifth Transport Mode>

A transport condition fulfillment determination process based on the information 71c about the standby situation for imaging processing in the fifth transport mode will be described with reference to FIG. 18. Thus, two transport conditions in the fifth transport mode, i.e., the condition that the maximum number M of smears 1 capable of being stored in the storing container 3 are stored and the condition that the smear preparation unit 10 enters the standby state, will not be described here. This processing corresponds to the processing in step S21 shown in FIG. 12.

In step S41, the first controller 70a calculates, from the smear information 71b about smears 1 stored in storing containers 3 that have started to be transported, the remaining time Tr of imaging processing for the smears 1 in all the storing containers 3 that have started to be transported.

In step S42, the first controller 70a determines whether or not the remaining time Tr at the present timing calculated in step S41 is equal to or shorter than the required-for-arrival time T3 prestored in the storage 71. When the remaining time Tr at the present timing is longer than the required-for-arrival time T3, the first controller 70a determines that the transport condition is not fulfilled, in step S45. Meanwhile, when the remaining time Tr at the present timing is equal to or shorter than the required-for-arrival time T3, the first controller 70a advances the process to step S43.

In step S43, the first controller 70a determines whether or not the elapsed time Te from a previous time of transport of a storing container 3 is equal to or shorter than the required-for-arrival time T3. The processing in step S43 is the same as that in step S34 of FIG. 17. When the elapsed time Te from the previous time of transport to the present timing is equal to or shorter than the required-for-arrival time T3 prestored in the storage 71, the first controller 70a determines that the transport condition is not fulfilled, in step S45. Meanwhile, when the elapsed time Te from the previous time of transport to the present timing is longer than the required-for-arrival time T3, the first controller 70a advances the process to step S44.

In step S44, the first controller 70a determines whether or not an imaging-target (first-type) smear 1 is present in the storing container 3 to be transported this time (the storing container 3 at the smear storing position Ps). The processing in step S44 is the same as that in step S35 of FIG. 17. When not a single first-type smear 1 is stored in the storing container 3 at the smear storing position Ps (the number of first-type smears 1 is zero), the first controller 70a determines that the transport condition is not fulfilled, in step S45. Meanwhile, when one or more first-type smears 1 are stored in the storing container 3 at the smear storing position Ps, the first controller 70a determines that the transport condition is fulfilled, in step S46.

As described above, the plurality of types of transport modes 110 include: a first transport mode (either of the fourth transport mode and the fifth transport mode in FIG. 13) in which a transport timing is determined to have arrived when the information 71c about the standby situation satisfies the transport condition including the predetermined condition; and a second transport mode (the first transport mode in FIG. 13) in which the transport timing is determined to have arrived when the number of the smears 1 stored in the storing container 3 has reached the maximum number of smears 1 capable of being stored in the storing container 3.

Consequently, when the transport mode is set to the first transport mode (either of the fourth transport mode and the fifth transport mode), the storing container 3 is transported according to the standby situation for imaging processing by the smear imaging unit 50, whereby a smear image can be taken and a user can check the smear image at an early stage. Meanwhile, when the transport mode is set to the second transport mode, a storing container 3 is transported after the storing container 3 has become full, whereby the number of times a storing container 3 is transported can be reduced. Here, in the case of a test system 100 having a configuration in which a user collects a storing container 3 transported to the smear imaging unit 50 and manually disposes a storing container 3 at a setting position used for storing smears 1 in the smear preparation unit 10, increase in the number of times a storing container 3 is transported leads to increase in the frequencies of the collecting task and the disposition task by the user. In view of this, a storing container 3 is transported after the storing container 3 has become full, whereby the number of times a storing container 3 is transported can be inhibited from increasing.

In the present embodiment, the first controller 70a performs, when preparation of a plurality of smears 1 is started, transport control for a storing container 3 based on whether or not the information 71c about the standby situation for imaging processing satisfies the predetermined condition.

Consequently, immediately after a working time of an operator starts (immediately after preparation of smears 1 is started), since no smear 1 standing by to undergo imaging processing by the smear imaging unit 50 is present, the storing container 3 can be transported on the basis of the predetermined condition regardless of the number of smears 1 stored in the storing container 3. As a result, the time from start of preparation of smears 1 until the first smear 1 is supplied to the smear imaging unit 50 can be effectively shortened.

Effects of Present Embodiment

Next, effects of the present embodiment will be described. Regarding preparation and imaging of smears 1 by the test system 100, there are the following three needs:
(First Need) This is the need to check smear images of first-type smears 1 at as early a stage as possible after smear preparation is started.
(Second Need) This is the need to reduce the frequency of a task of replenishment with storing containers 3 as much as possible.
(Third Need) This is the need to start a microscopic test of second-type smears 1 at as early a stage as possible after smear preparation is started.

In the present embodiment, when the fourth transport mode or the fifth transport mode is selected, both the first need and the second need among these needs can be satisfied. Hereinafter, this effect will be described on the basis of specific examples. The third need will be described later.

As shown in FIG. 15, smears 1 having been prepared are stored, one by one, in the storing container 3 at the smear storing position Ps at the storing time interval T1. The storing container 3 transported from the smear storing position Ps arrives at the first position C1 at the elapse of the required-for-arrival time T3. Each time the unit time T2 elapses, one of the smears 1 stored in the storing container 3 at the first position C1 is taken out and undergoes imaging processing. As an example, it is assumed that T1 is 48 seconds, T3 is 57 seconds, and T2 is 120 seconds.

For example, when the first transport mode is selected, the flow of the process from start of smear preparation is as shown in FIG. 19A. Meanwhile, when the fourth transport mode is selected, the flow of the process from start of smear preparation is as shown in FIG. 19B. In FIGS. 19A and 19B, "Elapsed time" indicates the elapsed time from start of storing of smears 1 into the storing container 3. Since the storing time interval T1 is 48 seconds, description will be given while "the timing 48 seconds before the first smear 1 is stored" is regarded as an initial value (0 seconds) of the elapsed time. That is, the storing-start timing is defined such that the first smear 1 is stored 48 seconds after the elapsed time starts to be counted. "Number of stored smears" indicates the number of accumulated smears 1 stored in any of storing containers 3 by the smear preparation unit 10 after smear preparation is started. "Event" indicates the timing at which transport of the storing container 3, arrival thereof at the first position C1, or the like occurs. In FIGS. 19A and 19B, it is assumed that all the smears 1 having been prepared are imaging targets (are of the first type).

In the first transport mode, after smear preparation is started, the storing container 3 at the smear storing position Ps is not transported until the stored number in the storing container 3 reaches the maximum number M (=10). Thus, it roughly takes a time (M×T1=480 seconds) before container transport is performed for the first time from the start of smear storing. Imaging processing is started after the elapse of the required-for-arrival time T3 from the transport, i.e., a total of 537 seconds later. On the assumption that it becomes possible to perform smear image checking after the elapse of the unit time T2, it roughly takes a time of 657 seconds (see a broken-line portion) before checking of a first smear image becomes possible.

Subsequently to imaging processing of obtaining the first smear image, a next smear image can be checked each time the unit time T2 (=120 seconds) elapses. The second image can be checked roughly 777 seconds later (see a broken-line portion).

In the fourth transport mode shown in FIG. 19B, the transport timing for the first storing container 3 after smear preparation is started is the timing at which an imaging-target (first-type) smear 1 is stored for the first time. The reason is as follows. That is, in FIG. 17, a storing container 3 is present at neither the first position C1 nor the second position C2 (No in both steps S31 and S32), the remaining time Tr of imaging processing is zero (Yes in step S33), and the result of the determination in step S34 is No since no previous time of transport has been performed, whereby, when the result of the determination in step S35 is Yes, the transport condition is fulfilled.

Thus, the storing container 3 is transported at the timing (at the elapse of 48 seconds) at which one smear 1 is stored in the storing container 3. After 105 seconds elapses, i.e., after the required-for-arrival time T3 elapses from the start of the transport, the storing container 3 arrives at the first position C1, and imaging processing is started. It becomes possible to check a first smear image after the elapse of the unit time T2, i.e., a total of roughly 225 seconds later (see a broken-line portion). In this manner, it becomes possible to check a first taken image roughly 225 seconds after smear storing is started.

In the case of the fourth transport mode, transport of a second storing container 3 is started at the timing at which: the remaining time Tr of imaging processing becomes equal to or shorter than the required-for-arrival time T3; the elapsed time Te from the previous time of transport becomes longer than the required-for-arrival time T3; and one or more first-type smears 1 are stored in the second storing container 3. Since imaging processing of obtaining the first smear image is ended 225 seconds later, the remaining time Tr becomes equal to or shorter than the required-for-arrival time T3, 168 seconds after smear storing is started. The elapsed time Te from the previous time of transport becomes longer than the required-for-arrival time T3, 105 seconds after smear storing is started. When the only smears 1 having been prepared are imaging targets (are of the first type), the above transport condition is satisfied, 168 seconds after smear storing is started. However, since the transport timing is determined each time of elapse of the storing time interval T1, the second storing container 3 is transported at the timing at which a third smear 1 is stored in the second storing container 3. That is, the second storing container 3 is transported, 192 seconds after smear storing is started. Three smears 1, i.e., second to fourth smears 1, are stored in the storing container 3.

249 seconds after smear storing is started, the second storing container 3 arrives at the first position C1, and imaging processing is started. It becomes possible to check a second smear image after the elapse of the unit time T2, i.e., a total of roughly 369 seconds later (see a broken-line portion).

In this manner, when the fourth transport mode is selected, a taken image of a smear 1 can be checked at an earlier stage than in a case where the storing container 3 is transported after the storing container 3 has become full. Thus, the above first need is satisfied. The transport operation in which a taken image of a smear 1 can be checked at an early stage is executed in the same manner also when specimens are supplied and smear preparation is restarted after the smear preparation unit 10 enters the standby state. Therefore, in the fourth transport mode, a taken image of a smear 1 can be checked at a particularly early stage immediately after continuous smear preparation is started (or restarted).

Meanwhile, in the first transport mode, a storing container 3 is transported each time ten smears 1 are stored therein, whereas, in the fourth transport mode, a storing container 3 is transported with the stored number therein being smaller than ten, whereby empty storing containers 3 are consumed early on the send-in path 23a (see FIG. 15). However, since the unit time T2 (=120 seconds) of imaging processing for one smear 1 is longer than the storing time interval T1 (=48 seconds) that a smear 1 takes to be stored in a storing container 3, continuation of smear preparation leads to generation of storing containers 3 standing by to undergo imaging processing, and one or more storing containers 3 come to stand by at the second position C2 of the container transport unit 30.

In this case, in the fourth transport mode as well, the process is advanced from step S31 to step S36 in FIG. 17, and thus the transport condition based on the information 71c about the standby situation for imaging processing is no longer satisfied. Consequently, similar to the first transport mode, another transport condition, i.e., the condition that "the maximum number M of smears 1 capable of being stored in the storing container 3 are stored", is satisfied, whereby the storing container 3 is transported. As a result, in the fourth transport mode, the transport frequency of storing containers 3 increases at an initial stage of smear preparation shown in FIG. 19B, but the level of consumption (transport frequency) of storing containers 3 becomes equivalent to that in the first transport mode as long as smear preparation is continuously performed. As a result, both the first need and the second need described above can be satisfied in the fourth transport mode.

The fifth transport mode shown in FIG. 18 is also basically the same as the fourth transport mode. In a situation where congestion has not occurred in imaging processing by the smear imaging unit 50 and the estimated remaining time Tr of imaging processing is short, the storing container 3 is transported with the stored number therein being smaller than the maximum number M in the same manner as in FIG. 19B, whereby a taken image of a smear 1 can be checked at an early stage.

Then, when smear preparation is continued and one or more storing containers 3 come to stand by at the second position C2, the estimated remaining time Tr of imaging processing is elongated, whereby the transport condition shown in FIG. 18 is no longer satisfied (the process is advanced to step S45). As a result, the storing container 3 is transported when the transport condition that "the maximum number M of smears 1 capable of being stored in the storing container 3 are stored" is satisfied in the same manner as in the first transport mode. Therefore, in the fifth transport mode as well, the level of consumption (transport frequency) of storing containers 3 becomes equivalent to that in the first transport mode in the same manner as in the fourth transport mode. Thus, both the first need and the second need can be satisfied in the fifth transport mode.

(Other Effects of Test System)

In addition, the present embodiment described above is also an example of the following configuration. That is, the test system 100 in the present embodiment includes: the smear preparation unit 10 which prepares a plurality of smears 1 and sequentially stores, in a storing container 3 capable of storing therein a plurality of the smears 1, the plurality of smears 1 having been prepared; the container transport unit 30 which transports the storing container 3 that is sent out from the smear preparation unit 10; the smear imaging unit 50 which images the smears 1 transported together with the storing container 3 from the container transport unit 30; and the controller 70 which performs control to transport the storing container 3 that stores therein the smears 1 from the smear preparation unit 10 according to one transport mode (see FIG. 13) having been set from among a plurality of transport modes. The plurality of transport modes include: a mode (the first transport mode in FIG. 13) of transporting, regardless of a transport situation of the storing container, the storing container 3 that stores therein a maximum number of the smears 1 capable of being stored in the storing container 3; and a mode (either of the fourth transport mode and the fifth transport mode in FIG. 13) of transporting, depending on the transport situation of the storing container 3, the storing container 3 that stores therein the smears 1 the number of which is smaller than the maximum number.

In addition, the control method for the test system 100 in the present embodiment is a control method for the test system 100 including the smear preparation unit 10 which prepares a smear 1 of a specimen and the smear imaging unit 50 which images the smear 1. As shown in FIGS. 11A and 11B to FIG. 14, the control method includes the following steps:

(1) setting one transport mode from among a plurality of transport modes (see FIG. 14);
(2) preparing a plurality of the smears 1 (S2 in FIG. 11A);
(3) sequentially storing, in a storing container 3 capable of storing therein a plurality of the smears 1, the smears 1 having been prepared (S3 in FIG. 11A); and
(4) transporting the storing container 3 that stores therein the smears 1 from the smear preparation unit 10 according to the transport mode having been set (S4 to S6 in FIG. 11A).

Here, the plurality of transport modes include: a mode (the first transport mode in FIG. 13) of transporting, regardless of a transport situation of the storing container 3, the storing container 3 that stores therein a maximum number of the smears 1 capable of being stored in the storing container 3; and a mode (either of the fourth transport mode and the fifth transport mode in FIG. 13) of transporting, depending on the transport situation of the storing container 3, the storing container 3 that stores therein the smears 1 the number of which is smaller than the maximum number.

With the above configuration, when the transport mode is set to the mode (the fourth transport mode or the fifth transport mode) of transporting, depending on the transport situation of the storing container 3, the storing container 3 that stores therein the smears 1 the number of which is smaller than the maximum number, even before a storing container 3 has become full, the storing container 3 can be transported according to the transport situation of the storing container 3. As a result, the smears 1 can be supplied to the smear imaging unit 50 early, and imaging processing by the smear imaging unit 50 can be started early, whereby an operator can start checking a smear image early. Meanwhile, when the transport mode is set to the mode (first transport mode) of transporting, regardless of the transport situation of the storing container 3, the storing container 3 that stores therein the maximum number of the smears 1 capable of being stored in the storing container 3, after a storing container 3 has become full, the storing container 3 is transported according to the transport situation of the storing container 3, whereby the number of times a storing container 3 is transported can be inhibited from increasing more than necessary. As a result, it is possible to adapt to various requirements from operators who perform tasks of checking smear images.

(Effect of Smear Preparation Device)

In addition, as described above, the smear preparation unit 10 in the present embodiment is implemented by a smear preparation device capable of being combined with the test system 100 including a smear imaging device (smear imaging unit 50). The smear preparation unit 10 includes: the preparation process part 10b which prepares a plurality of smears 1; the transfer part 19 which sequentially stores, in a storing container 3 capable of storing therein a plurality of the smears 1, the plurality of smears 1 having been prepared; a transport part 23 which is configured to be connectable to another device (container transport unit 30) forming the test system 100 and transports the storing container 3 that stores therein the smears 1; and the controller 70 which performs control to send out, when information about a transport situation of the storing container 3 satisfies a predetermined condition, the storing container 3 that stores therein the smears 1 from the transport part 23 regardless of the number of the smears 1 stored in the storing container 3.

In addition, the control method for the smear preparation device (smear preparation unit 10) in the present embodiment is a control method for a smear preparation device to be incorporated in the test system 100 including the smear imaging unit 50 which images a smear 1 of a specimen. As shown in FIG. 11A, the control method includes the following steps:

(1) preparing a plurality of the smears 1 (S2);
(2) sequentially storing, in a storing container 3 capable of storing therein a plurality of the smears 1, the smears 1 having been prepared (S3); and
(3) sending out, when information about a transport situation of the storing container 3 satisfies a predetermined condition, the storing container 3 that stores therein the smears 1 from the smear preparation device regardless of the number of the smears 1 stored in the storing container 3 (S4 to S6).

Consequently, even when a storing container 3 has not become full, the storing container 3 can be transported to the smear imaging unit 50 according to the transport situation of the storing container 3 in the test system 100. Thus, in a situation where transport of the storing container 3 to the smear imaging unit 50 is delayed in a case where there are no smears 1 standing by to undergo imaging processing by the smear imaging unit 50 or few smears 1 standing by to undergo imaging processing by the smear imaging unit 50, the smears 1 can be supplied to the smear imaging unit 50 early by transporting the storing container 3 before the storing container 3 has become full. Consequently, imaging processing by the smear imaging unit 50 can be started early, whereby it is possible to adapt to various requirements from operators who perform tasks of checking smear images.

[Modifications]

It should be noted that the embodiment disclosed herein is merely illustrative in all aspects and should not be considered as being restrictive. The scope of the present disclosure is defined not by the description of the above embodiment but by the scope of the claims, and further includes meaning equivalent to the scope of the claims and all modifications within said scope.

Hereinafter, modifications of the present disclosure will be described. Firstly, a modification of control of the transport timing for a storing container 3 will be described.

(First Modification)

In the above embodiment, an example has been shown in which the detector 60 for detecting each smear 1 picked up from a storing container 3 by the smear transfer part 41 is provided correspondingly to the first position C1, but is not provided correspondingly to the second position C2. However, the detector 60 may be provided correspondingly to not only the first position C1 but also the second position C2. That is, the detector 60 may be configured to be able to detect each smear 1 stored in a storing container 3 at the first position C1; and each smear 1 stored in a storing container 3 at the second position C2. A first modification shown in FIG. 20 indicates a transport condition fulfillment determination process in the fourth transport mode according to this case.

The first modification in FIG. 20 differs in that steps S51 and S52 are provided instead of steps S31 and S33 in the above embodiment (FIG. 17). In step S51, the first controller 70a determines, on the basis of an output from the container sensor 34b, whether or not a storing container 3 is present at the second position C2. When a storing container 3 is present at the second position C2, the first controller 70a advances the process to step S52. In this case, in step S52, the first controller 70a determines whether or not the remaining time Tr of imaging processing for smears in the storing container 3 at the second position C2 is equal to or shorter than the required-for-arrival time T3. When the remaining time Tr of imaging processing for the smears 1 stored in the storing container 3 at the second position C2 is longer than the required-for-arrival time T3, the first controller 70a determines that the transport condition is not fulfilled, in step S36. Meanwhile, when the total remaining time Tr is equal to or shorter than the required-for-arrival time T3, the first controller 70a advances the process to step S34.

When no storing container 3 is present at the second position C2 in step S51, the first controller 70a advances the process to step S32 and determines whether or not a storing container 3 is present at the first position C1. When a storing container 3 is present at the first position C1, the first controller 70a determines whether or not the remaining time Tr of imaging processing for smears in the storing container 3 at the first position C1 is equal to or shorter than the required-for-arrival time T3, in step S52. When the remaining time Tr is longer than the required-for-arrival time T3, the first controller 70a determines that the transport condition is not fulfilled, in step S36. Meanwhile, when the remaining time Tr is equal to or shorter than the required-for-arrival time T3, the first controller 70a advances the process to step S34. The other processing is the same as that in steps S32 to S37 in the above first embodiment.

As in the first modification, the remaining time Tr of imaging processing for the smears 1 stored in the storing container 3 at the first position C1 and the remaining time Tr of imaging processing for the smears 1 stored in the storing container 3 at the second position C2 may be calculated on the basis of detection results from the detector 60, and the transport timing may be controlled on the basis of these remaining times Tr.

(Second Modification)

Figure 21:
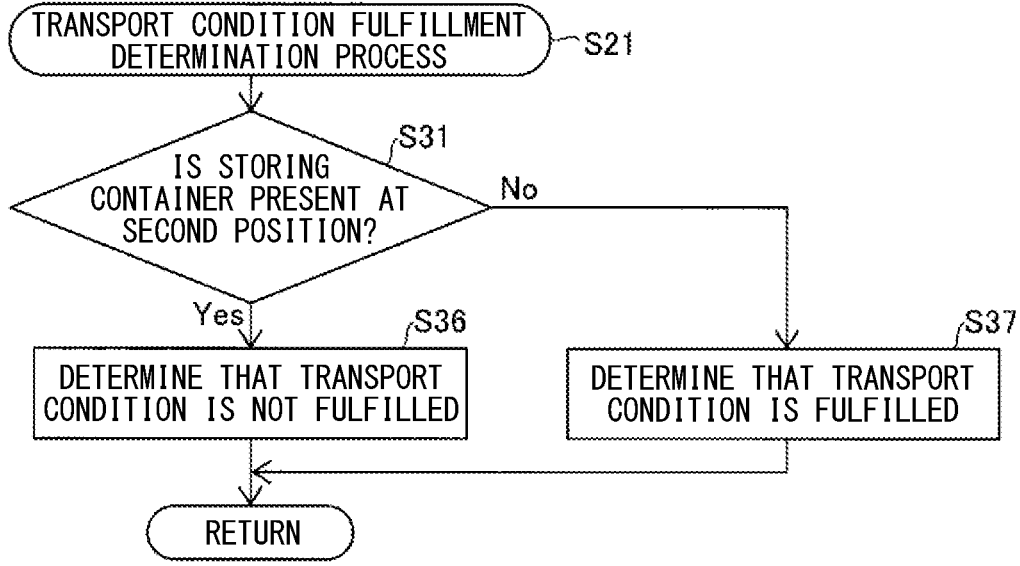
FIG. 21 is a flowchart showing a transport condition fulfillment determination process in the fourth transport mode according to a second modification.

A transport condition fulfillment determination process in the fourth transport mode according to a second modification is shown in FIG. 21. In the second modification, steps S32 to S35 in the above embodiment shown in FIG. 17 are not provided.

In step S31 of FIG. 21, the first controller 70a determines, on the basis of the output from the container sensor 34b, whether or not a storing container 3 is present at the second position C2. When a storing container 3 is present at the second position C2, the first controller 70a determines that the transport condition is not fulfilled, in step S36. Meanwhile, when no storing container 3 is present at the second position C2, the first controller 70a determines that the transport condition is fulfilled, in step S37.

As in the second modification, the transport timing for the storing container 3 may be controlled on the basis of only information about presence/absence of a storing container 3 at the second position C2. That is, the predetermined condition may include only the condition that no storing container 3 is present at a predetermined position (second position C2) on the transport path.

(Third Modification)

Figure 22:
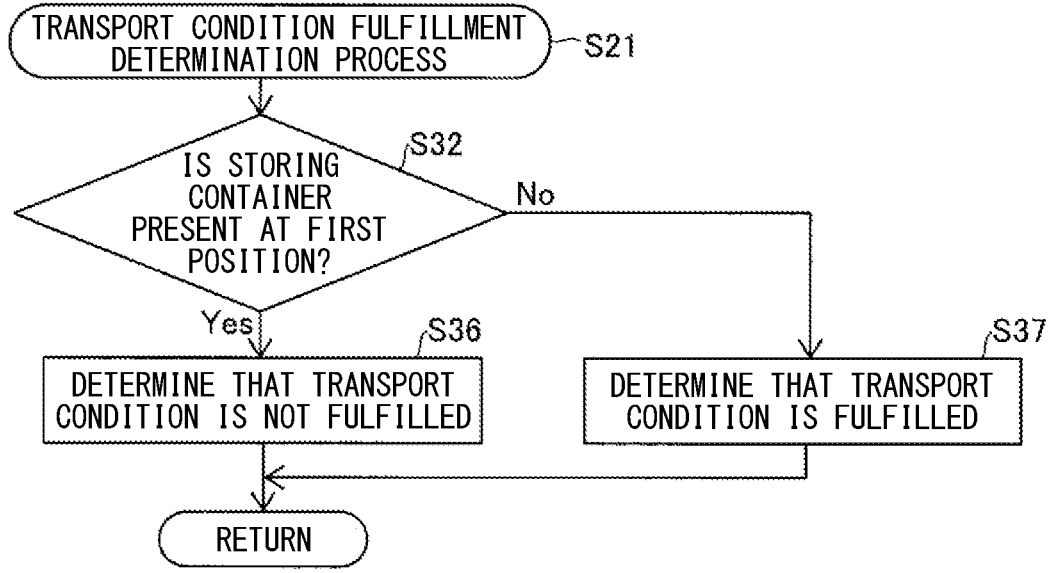
FIG. 22 is a flowchart showing a transport condition fulfillment determination process in the fourth transport mode according to a third modification.

A transport condition fulfillment determination process in the fourth transport mode according to a third modification is shown in FIG. 22. In the third modification, steps S31 and S33 to S35 in the above embodiment shown in FIG. 17 are not provided.

In step S32 of FIG. 22, the first controller 70a determines, on the basis of the output from the container sensor 34a, whether or not a storing container 3 is present at the first position C1. When a storing container 3 is present at the first position C1, the first controller 70a determines that the transport condition is not fulfilled, in step S36. Meanwhile, when no storing container 3 is present at the first position C1, the first controller 70a determines that the transport condition is fulfilled, in step S37.

As in the third modification, the transport timing for the storing container 3 may be controlled on the basis of only information about presence/absence of a storing container 3 at the first position C1. That is, the predetermined condition may include only the condition that no storing container 3 is present at a predetermined position (first position C1) on the transport path.

(Fourth Modification)

Figure 23:
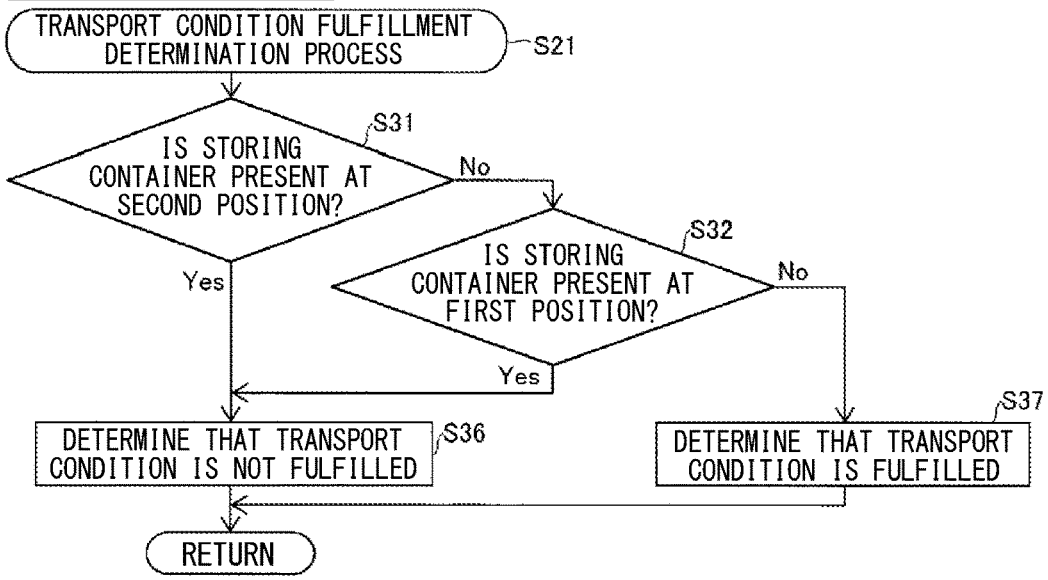
FIG. 23 is a flowchart showing a transport condition fulfillment determination process in the fourth transport mode according to a fourth modification.

A transport condition fulfillment determination process in the fourth transport mode according to a fourth modification is shown in FIG. 23. In the fourth modification, steps S33 to S35 in the above embodiment shown in FIG. 17 are not provided.

In step S31 of FIG. 23, the first controller 70a determines, on the basis of the output from the container sensor 34b, whether or not a storing container 3 is present at the second position C2. When a storing container 3 is present at the second position C2, the first controller 70a determines that the transport condition is not fulfilled, in step S36. Meanwhile, when no storing container 3 is present at the second position C2, the first controller 70a determines, on the basis of the output from the container sensor 34a, whether or not a storing container 3 is present at the first position C1, in step S32. When a storing container 3 is present at the first position C1, the first controller 70a determines that the transport condition is not fulfilled, in step S36. Meanwhile, when no storing container 3 is present at the first position C1, the first controller 70a determines that the transport condition is fulfilled, in step S37.

As in the fourth modification, the transport timing for the storing container 3 may be controlled on the basis of only information about presence/absence of a storing container 3 at each of the first position C1 and the second position C2. That is, the predetermined condition may include only the condition that a storing container 3 is present at neither the first position C1 nor the second position C2.

(Fifth Modification)

Figure 24:
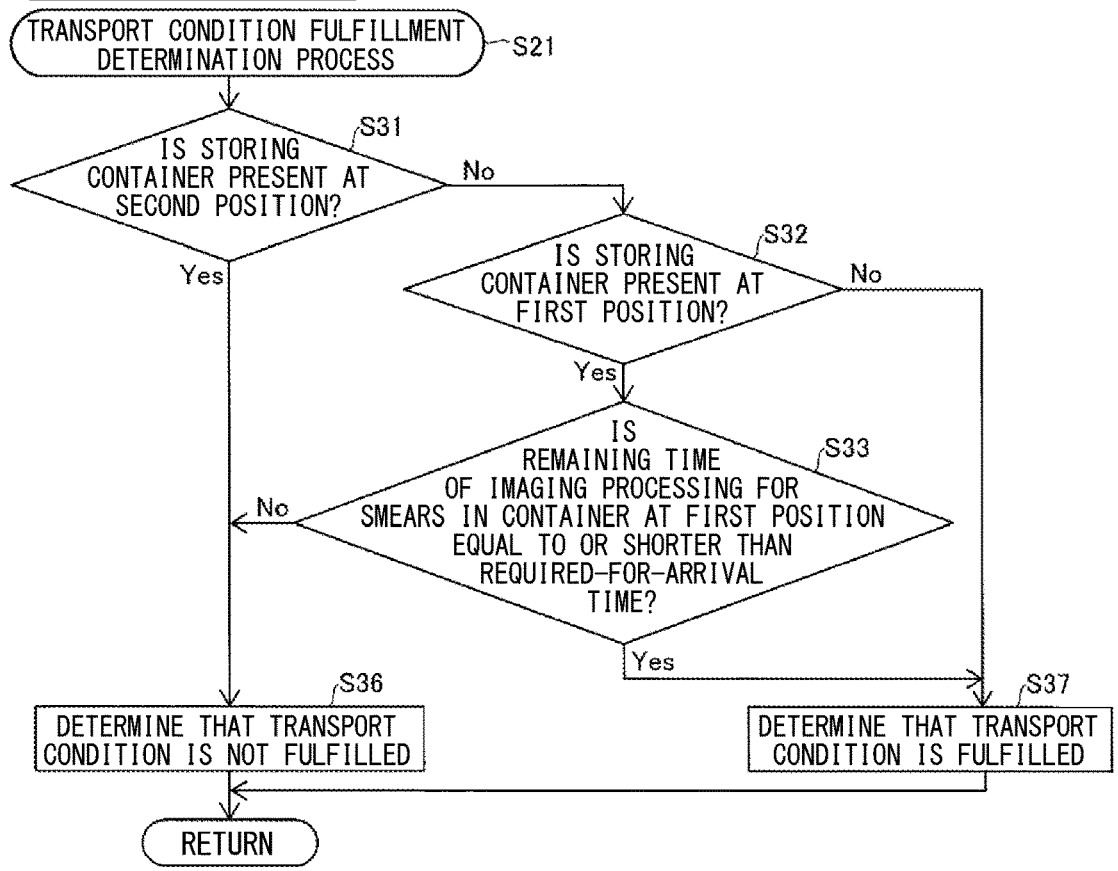
FIG. 24 is a flowchart showing a transport condition fulfillment determination process in the fourth transport mode according to a fifth modification.

A transport condition fulfillment determination process in the fourth transport mode according to a fifth modification is shown in FIG. 24. In the fifth modification, steps S34 and S35 in the above embodiment shown in FIG. 17 are not provided.

In step S31 of FIG. 24, the first controller 70a determines, on the basis of the output from the container sensor 34b, whether or not a storing container 3 is present at the second position C2. When a storing container 3 is present at the second position C2, the first controller 70a determines that the transport condition is not fulfilled, in step S36. Meanwhile, when no storing container 3 is present at the second position C2, the first controller 70a determines, on the basis of the output from the container sensor 34a, whether or not a storing container 3 is present at the first position C1, in step S32. When no storing container 3 is present at the first position C1, the first controller 70a determines that the transport condition is fulfilled, in step S37. Meanwhile, when a storing container 3 is present at the first position C1, the first controller 70a determines whether or not the remaining time Tr of imaging processing for smears 1 in the storing container 3 at the first position C1 is equal to or shorter than the required-for-arrival time T3, in step S33. When the remaining time Tr is longer than the required-for-arrival time T3, the first controller 70a determines that the transport condition is not fulfilled, in step S36. Meanwhile, when the remaining time Tr is equal to or shorter than the required-for-arrival time T3, the first controller 70a determines that the transport condition is fulfilled, in step S37.

As in the fifth modification, the transport timing for the storing container 3 may be controlled on the basis of only information about presence/absence of a storing container 3 at each of the first position C1 and the second position C2; and information about the remaining time Tr lasting until imaging processing for smears 1 in a storing container 3 that has started to be transported is ended. The predetermined condition may include two conditions, i.e., the condition that no storing container 3 being transported is present at either of the predetermined positions and the condition that, when a storing container 3 is present at the first position C1, the remaining time Tr is equal to or shorter than the predetermined time.

(Sixth Modification)

Figure 25:
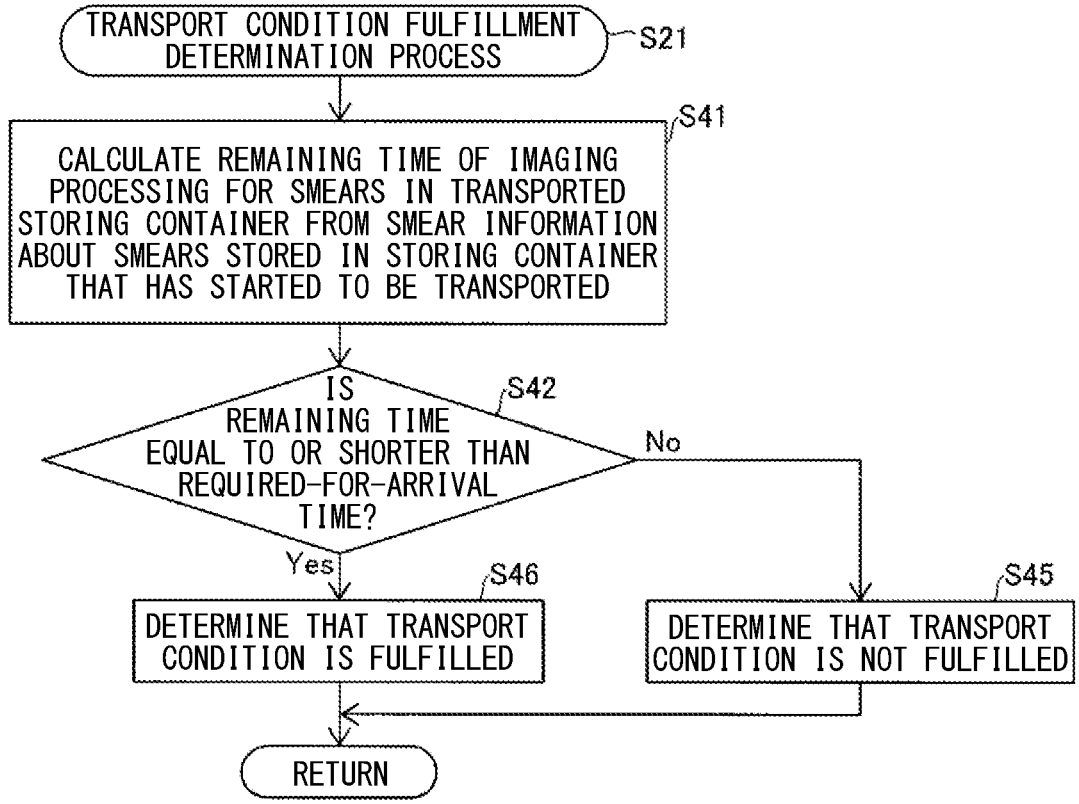
FIG. 25 is a flowchart showing a transport condition fulfillment determination process in the fourth transport mode according to a sixth modification.

Next, a transport condition fulfillment determination process in the fifth transport mode according to a sixth modification is shown in FIG. 25. In the sixth modification, steps S43 and S44 in the above embodiment shown in FIG. 18 are not provided.

In step S41 of FIG. 25, the first controller 70a calculates, from the smear information 71b about smears 1 stored in storing containers 3 that have started to be transported, the remaining time Tr of imaging processing for the smears 1 in all the storing containers 3 that have started to be transported. In step S42, the first controller 70a determines whether or not the remaining time Tr at the present timing calculated in step S41 is equal to or shorter than the required-for-arrival time T3. When the remaining time Tr at the present timing is longer than the required-for-arrival time T3, the first controller 70a determines that the transport condition is not fulfilled, in step S45. Meanwhile, when the remaining time Tr at the present timing is equal to or shorter than the required-for-arrival time T3, the first controller 70a determines that the transport condition is fulfilled, in step S46.

As in the sixth modification, in the fifth transport mode, the transport timing for the storing container 3 may be controlled on the basis of only information about the remaining time Tr lasting until imaging processing for smears 1 in storing containers 3 that have started to be transported is ended. That is, the predetermined condition may include only the condition that the remaining time Tr is equal to or shorter than the predetermined time (required-for-arrival time T3).

[Modification Regarding Smear Preparation Operation]

Next, a modification regarding the smear preparation operation in the above embodiment will be described. In the above embodiment, an example has been shown in which the smear preparation unit 10 sequentially prepares smears 1 from a plurality of specimen containers 7 held by a specimen rack 8. However, the present disclosure is not limited to this example. In the following modification, an example will be shown in which control of the sequence of smear preparation is further performed in addition to control of the transport timing in the above embodiment.

(Seventh Modification)

Figure 26:
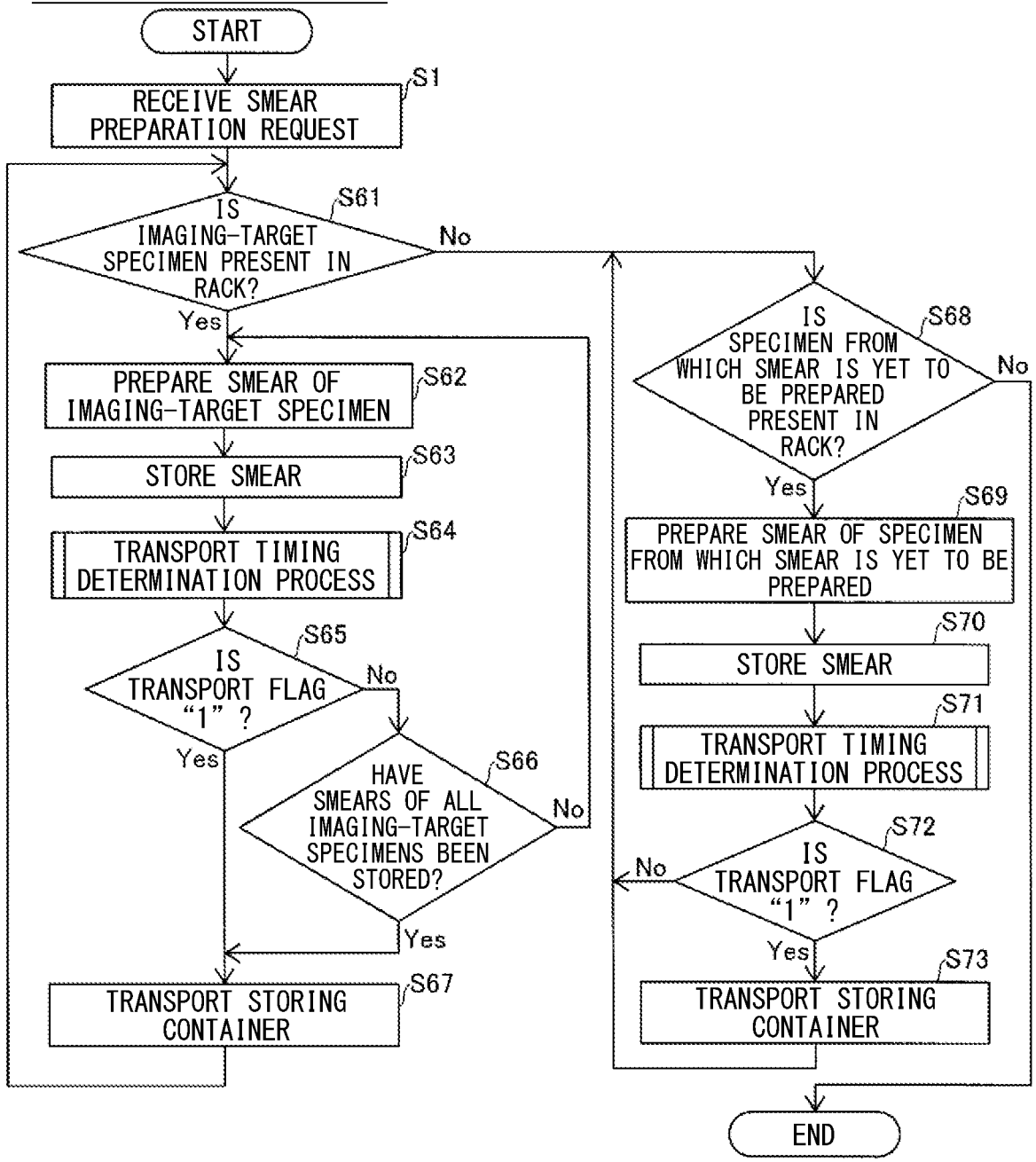
FIG. 26 is a flowchart showing smear preparation and transport operations by the smear preparation unit, according to a seventh modification.

FIG. 26 is a flowchart showing a control process for the smear preparation unit 10 according to a seventh modification. The seventh modification is a modification of the control process for the smear preparation unit 10 shown as steps S1 to S6 of FIG. 11A.

In step S1 of FIG. 26, the first controller 70a receives a smear preparation request. The first controller 70a causes the specimen transport part 6 to transport a specimen rack 8 such that all specimen containers 7 in the specimen rack 8 are sequentially disposed at the reading position B1. The first controller 70a causes the ID reading part 14a to sequentially read identifications (IDs) from all the specimen containers 7 in the specimen rack 8. The first controller 70a transmits, via the communication part 72, the identification (ID) of each specimen and receives, via the communication part 72, a smear preparation request stored in the host computer 200 in association with the identification (ID) from the host computer 200.

In step S61, the first controller 70a determines whether or not an imaging-target (first-type) specimen is present in the specimen rack 8. Specifically, for each of the individual specimen containers 7, the first controller 70a individually determines, on the basis of the smear preparation request regarding the corresponding specimen in the specimen rack 8, whether said specimen container 7 in the specimen rack 8 stores therein an imaging-target specimen or a non-imaging-target (second-type) specimen. Consequently, the first controller 70a identifies at which position in the specimen rack 8 the corresponding specimen container 7 stores therein a first-type specimen. When one or more specimen containers 7 storing therein first-type specimens are present in the specimen rack 8, the first controller 70a determines that imaging-target specimens are present. Meanwhile, when the number of specimen containers 7 that store therein first-type specimens and that are present in the specimen rack 8 is zero, the first controller 70a determines that imaging-target specimens are absent.

When it is determined that imaging-target (first-type) specimens are present, the first controller 70a controls, in step S62, the smear preparation unit 10 to prepare a smear 1 of each of the imaging-target specimens. That is, the first controller 70a performs a first smear preparation process of selecting each of the specimen containers 7 that store therein the first-type specimens and that are present in the specimen rack 8; and precedently preparing a smear with respect to the first-type specimen.

In step S63, the first controller 70a causes the first-type smear 1 having been prepared to be stored in a vacant storing portion 3a of a storing container 3 at the smear storing position Ps. In step S64, the first controller 70a executes a transport timing determination process (i.e., steps S21 to S24 of FIG. 12) of determining whether or not the transport timing for the storing container 3 has arrived. Whether or not the transport timing has arrived is determined according to whether or not a transport condition corresponding to any of the above transport modes is satisfied. In step S65, the first controller 70a determines whether or not the value of the transport flag is "1" as a result of the transport timing determination process in step S64.

When the value of the transport flag is "1", in step S67, the first controller 70a causes the storing container 3 to be transported from the smear storing position Ps, and then resets the value of the transport flag to "0". Meanwhile, when the value of the transport flag is "0", in step S66, the first controller 70a determines whether or not smears 1 have been stored with respect to all the respective imaging-target (first-type) specimens identified in the specimen rack 8.

When smears 1 have not been stored with respect to all the respective imaging-target (first-type) specimens in the specimen rack 8, the first controller 70a returns the process to step S62 and causes smear preparation with respect to a next imaging-target specimen. By repeating steps S62 to S66, smears 1 are prepared and stored with respect to all the respective imaging-target (first-type) specimens in the specimen rack 8, precedently to smears 1 of second-type specimens. When smears 1 have been stored with respect to all the respective imaging-target (first-type) specimens in the specimen rack 8, the first controller 70a advances the process to step S67 and causes transport of the storing container 3.

When, as a result of the first smear preparation process for the imaging-target (first-type) specimens, smear preparation is completed with respect to all the imaging-target specimens in the specimen rack 8, it is determined in step S61 that imaging-target specimens are not present (anymore). In this case, the first controller 70a advances the process to step S68 and determines whether or not specimens from which smears are yet to be prepared are present in the specimen rack 8. When a specimen container 7 storing therein a non-imaging-target (second-type) specimen is present in the specimen rack 8, this specimen corresponds to a specimen from which a smear is yet to be prepared. When specimens from which smears are yet to be prepared are present, the first controller 70a controls, in step S69, the smear preparation unit 10 to prepare a smear 1 of each of the specimens from which smears are yet to be prepared. That is, after the first smear preparation process of precedently preparing smears with respect to the first-type specimens, the first controller 70a performs a second smear preparation process of subsequently preparing a smear with respect to each of the second-type specimens from which no smears have been prepared in the first smear preparation process.

In step S70, the first controller 70a causes the smear 1, which has been prepared from the non-imaging-target (second-type) specimen, to be stored in a vacant storing portion 3a of a storing container 3 at the smear storing position Ps. In step S71, the first controller 70a executes a transport timing determination process (i.e., steps S21 to S24 of FIG. 12) of determining whether or not the transport timing for the storing container 3 has arrived. Processing in step S71 is the same as that in step S64. In step S72, the first controller 70a determines whether or not the value of the transport flag is "1" as a result of the transport timing determination process in step S71. When the value of the transport flag is "1", in step S73, the first controller 70a causes the storing container 3 to be transported from the smear storing position Ps, resets the transport flag, and then returns the process to step S68. Meanwhile, when the value of the transport flag is "0", the first controller 70a returns the process to step S68.

Through steps S68 to S73, the first controller 70a causes a smear to be prepared with respect to the specimen, in the specimen rack 8, from which no smear has been prepared in the first smear preparation process. Upon completion of the smear preparation with respect to all the specimens, in the specimen rack 8, from which smears had yet to be prepared, the first controller 70a determines that a specimen from which a smear is yet to be prepared is not present (anymore), in step S68, and ends the process. Meanwhile, when all the specimens in the specimen rack 8 are imaging-target (first-type) specimens, the process is not advanced to step S69 but is ended as a result of determination, in step S68, that a specimen from which a smear is yet to be prepared is not present.

In this manner, in the seventh modification, the first controller 70a performs, through steps S61 to S67, control to precedently prepare smears 1 with respect to imaging-target (first-type) specimens; and transport, when all the imaging-target smears 1 having been prepared are stored in a storing container 3, the storing container 3 regardless of the stored number. Consequently, the imaging-target smears 1 are precedently prepared and precedently transported to the smear imaging unit 50. Thus, a user can check a taken image of each smear 1 at an earlier stage.

(Eighth Modification)

An eighth modification will be described with reference to FIG. 27. Unlike in the above seventh modification in which imaging-target (first-type) smears 1 are precedently prepared, an example in which non-imaging-target (second-type) smears 1 are precedently prepared will be shown in the eighth modification.

The eighth modification differs in that steps S81, S82, and S86 are provided instead of steps S61, S62, and S66 in the seventh modification in FIG. 26. In the eighth modification, the same steps as those in the above seventh modification are denoted by the same reference characters and will not be described.

In step S81, the first controller 70a determines whether or not a non-imaging-target (second-type) specimen is present in the specimen rack 8. The first controller 70a identifies, on the basis of the smear preparation requests for the respective specimens in the specimen rack 8, at which position in the specimen rack 8 the corresponding specimen container 7 stores therein a second-type specimen. When one or more specimen containers 7 storing therein second-type specimens are present in the specimen rack 8, the first controller 70a determines that non-imaging-target specimens are present. Meanwhile, when the number of specimen containers 7 that store therein second-type specimens and that are present in the specimen rack 8 is zero, the first controller 70a determines that non-imaging-target specimens are absent.

When it is determined that non-imaging-target specimens are present, the first controller 70a controls, in step S82, the smear preparation unit 10 to prepare a smear 1 of each of the non-imaging-target (second-type) specimens. That is, the first controller 70a performs a first smear preparation process of selecting each of the specimen containers 7 that store therein the second-type specimens and that are present in the specimen rack 8; and precedently preparing a smear with respect to the second-type specimen.

Thereafter, steps S63 to S65 are performed, and, in step S86, the first controller 70a determines whether or not smears 1 have been stored with respect to all the respective non-imaging-target (second-type) specimens identified in the specimen rack 8.

When smears 1 have not been stored with respect to all the respective non-imaging-target (second-type) specimens in the specimen rack 8, the first controller 70a returns the process to step S82 and causes smear preparation with respect to a next non-imaging-target (second-type) specimen. By repeating steps S82, S63 to S65, and S86, smears 1 are prepared and stored with respect to all the respective non-imaging-target specimens in the specimen rack 8, precedently to smears 1 of first-type specimens. When smears 1 have been stored with respect to all the respective non-imaging-target specimens in the specimen rack 8, the first controller 70a advances the process to step S67 and causes transport of the storing container 3.

When, as a result of the first smear preparation process for the non-imaging-target (second-type) specimens, smear preparation is completed with respect to all the non-imaging-target specimens in the specimen rack 8, it is determined in step S81 that non-imaging-target specimens are not present (anymore). In this case, the first controller 70a advances the process to step S68 and determines whether or not specimens from which smears are yet to be prepared are present in the specimen rack 8. When a specimen container 7 storing therein an imaging-target (first-type) specimen is present in the specimen rack 8, this specimen corresponds to a specimen from which a smear is yet to be prepared. Processing in steps S68 to S73 in the case where specimens from which smears are yet to be prepared are present is the same as that in the above seventh modification, except that the specimens from which smears are yet to be prepared are imaging-target specimens. That is, after the first smear preparation process of precedently preparing smears with respect to the second-type specimens, the first controller 70a performs a second smear preparation process of subsequently preparing a smear with respect to each of the first-type specimens from which no smears have been prepared in the first smear preparation process.

In this manner, in the eighth modification, the first controller 70a performs, through steps S81, S82, S63 to S65, S86, and S67, control to precedently prepare smears 1 with respect to non-imaging-target (second-type) specimens; and transport, when all the non-imaging-target smears 1 having been prepared are stored in a storing container 3, the storing container 3 regardless of the stored number. Consequently, the non-imaging-target smears 1 are precedently prepared and precedently transported to the smear imaging unit 50. Thus, a user can start a microscopic test of each second-type smear 1 at an earlier stage. This effect exhibited in the eighth modification satisfies the third need with respect to the test system 100 described above (the need to start a microscopic test of second-type smears 1 at as early a stage as possible after smear preparation is started).

In the present disclosure, the first controller 70a is preferably configured to: receive selection of any of a plurality of smear preparation modes including the first smear preparation mode described in the above seventh modification (a mode of selecting a specimen container 7 that stores therein a first-type specimen and that is present in a specimen rack 8; and precedently preparing a smear with respect to the first-type specimen) and the second smear preparation mode applied in the eighth modification (a mode of performing a first smear preparation process of selecting a specimen container 7 that stores therein a second-type specimen and that is present in the specimen rack 8; and precedently preparing a smear with respect to the second-type specimen); and prepare a smear 1 according to the selected smear preparation mode. Consequently, since a mode is selected according to the need of the user, it is possible to satisfy both the need to check a taken image of a smear 1 early and the need to perform a microscopic test of a smear 1 early.

(Ninth Modification)

A ninth modification will be described with reference to FIG. 28. In the ninth modification, an example will be shown in which whether or not to precedently prepare an imaging-target (first-type) smear 1 is determined according to whether or not the smear imaging unit 50 is in the standby state.

The ninth modification differs in that step S91 is further provided in addition to steps S61 to S73 in the seventh modification in FIG. 26. In the ninth modification, the same steps as those in the above seventh modification are denoted by the same reference characters and will not be described.

Figure 28:
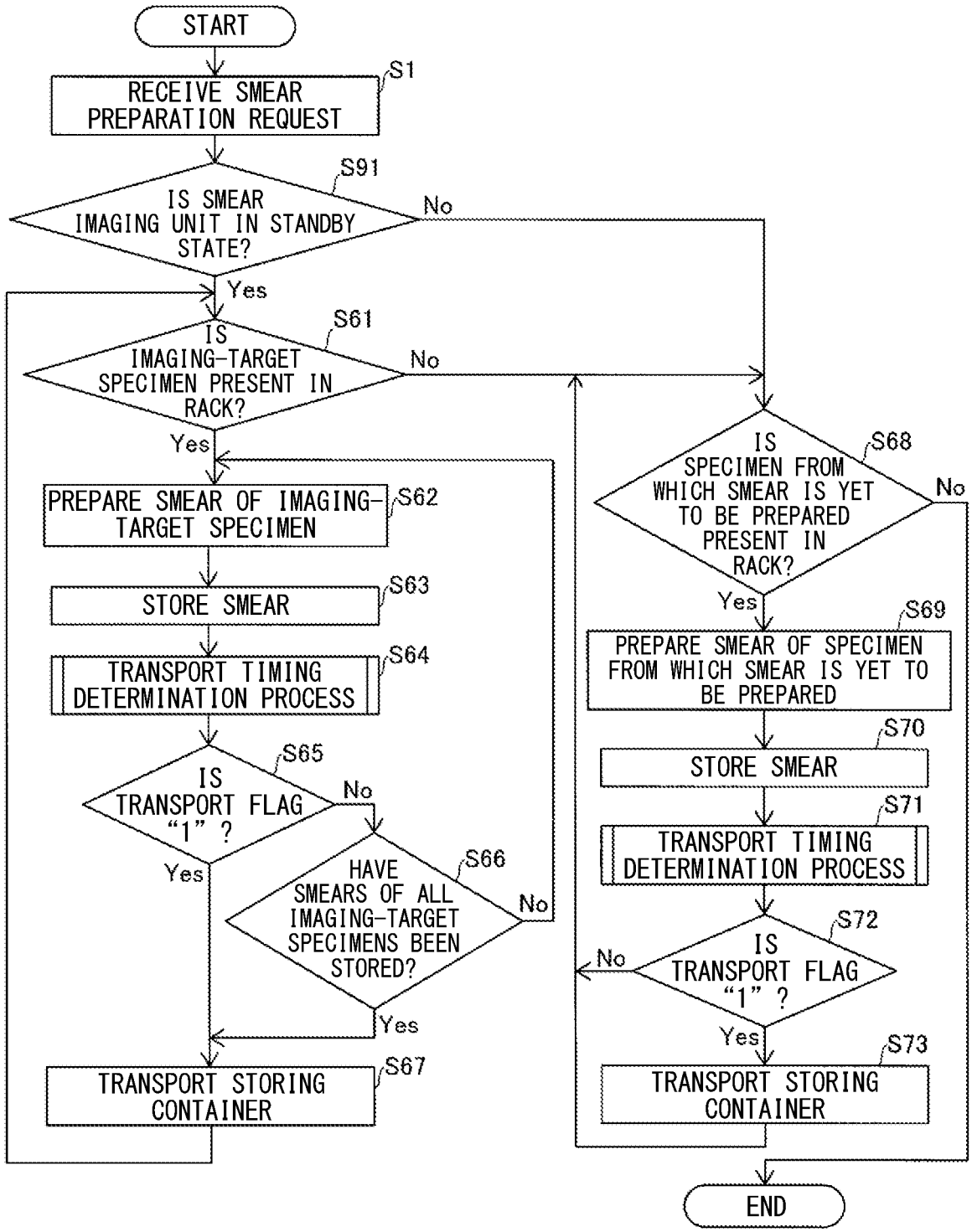
FIG. 28 is a flowchart showing smear preparation and transport operations by the smear preparation unit, according to a ninth modification.

In step S91 of FIG. 28, the first controller 70a determines whether or not the smear imaging unit 50 is in the standby state. Whether or not the smear imaging unit 50 is in the standby state may be determined according to, for example: the condition that a storing container 3 is not present at the first position C1; the condition that a storing container 3 is present at neither the first position C1 nor the second position C2; or the condition that a storing container 3 is present at neither the first position C1 nor the second position C2, and the elapsed time Te from the transport start time point of a previously transported storing container 3 is longer than the required-for-arrival time T3. Whether or not the smear imaging unit 50 is in the standby state may be determined, on the basis of the remaining time Tr lasting until imaging processing for smears 1 in a storing container 3 that has started to be transported is ended, according to the condition that, for example, the remaining time Tr is zero.

When the smear imaging unit 50 is in the standby state, the first controller 70a advances the process to step S61. In the same manner as in the above seventh modification, the first controller 70a performs steps S61 to S67 to select a specimen container 7 that stores therein a first-type specimen and that is present in the specimen rack 8; and cause, with respect to the first-type specimen, precedent preparation of a smear, storing of the smear in a storing container 3, and transport of the storing container 3. Thereafter, in the same manner as in the above seventh modification, the first controller 70a performs steps S68 to S73 to cause, with respect to a remaining specimen from which a smear is yet to be prepared, subsequent preparation of a smear, storing of the smear in a storing container 3, and transport of the storing container 3.

Meanwhile, when the smear imaging unit 50 is not in the standby state in step S91, the first controller 70a advances the process to step S68. When transition from step S91 to step S68 occurs, specimens from which smears are yet to be prepared in step S68 refer to all specimens including imaging-target (first-type) specimens and non-imaging-target (second-type) specimens. Thus, through steps S68 to S73, smears 1 are prepared according to, for example, the sequence of the holding positions in the specimen rack 8 without determining whether or not the specimens are imaging targets.

As a result of the above process, in the ninth modification, the test system 100 can be controlled such that an imaging-target (first-type) smear 1 is precedently prepared and supplied to the smear imaging unit 50 in the case where the smear imaging unit 50 is in the standby state, whereby the standby time of the smear imaging unit 50 can be shortened, and the timing at which imaging processing for all the imaging-target specimens is ended can be hastened.

(Tenth Modification)

A tenth modification will be described with reference to FIG. 29. In the tenth modification, an example will be shown in which whether or not to precedently prepare a non-imaging-target (second-type) smear 1 is determined according to whether or not congestion is occurring in imaging processing by the smear imaging unit 50 (whether or not the smear imaging unit 50 is in a busy state).

Figure 27:
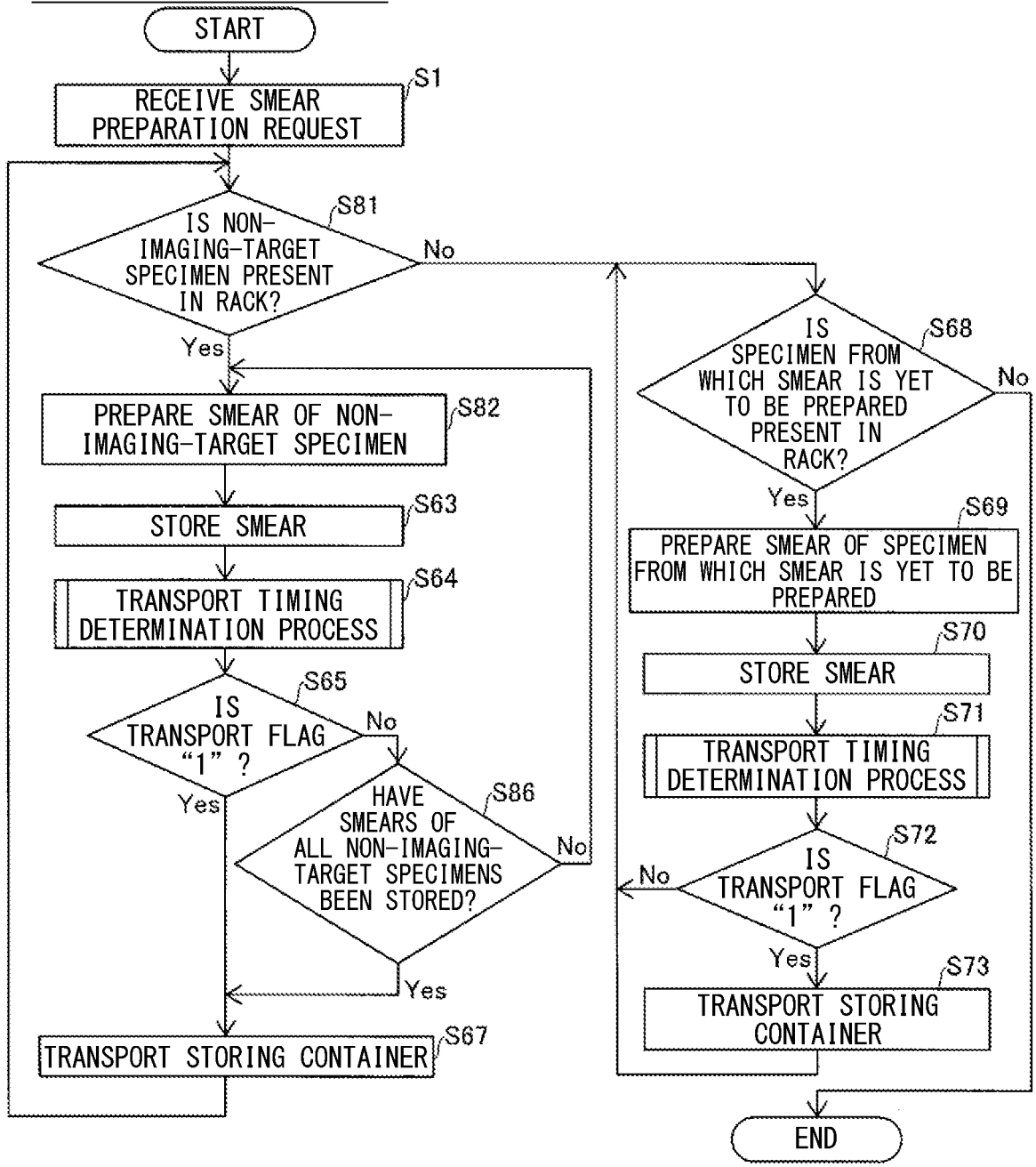
FIG. 27 is a flowchart showing smear preparation and transport operations by the smear preparation unit, according to an eighth modification.

The tenth modification differs in that step S92 is further provided in addition to the steps in the eighth modification in FIG. 27. In the tenth modification, the same steps as those in the above eighth modification are denoted by the same reference characters and will not be described.

Figure 29:
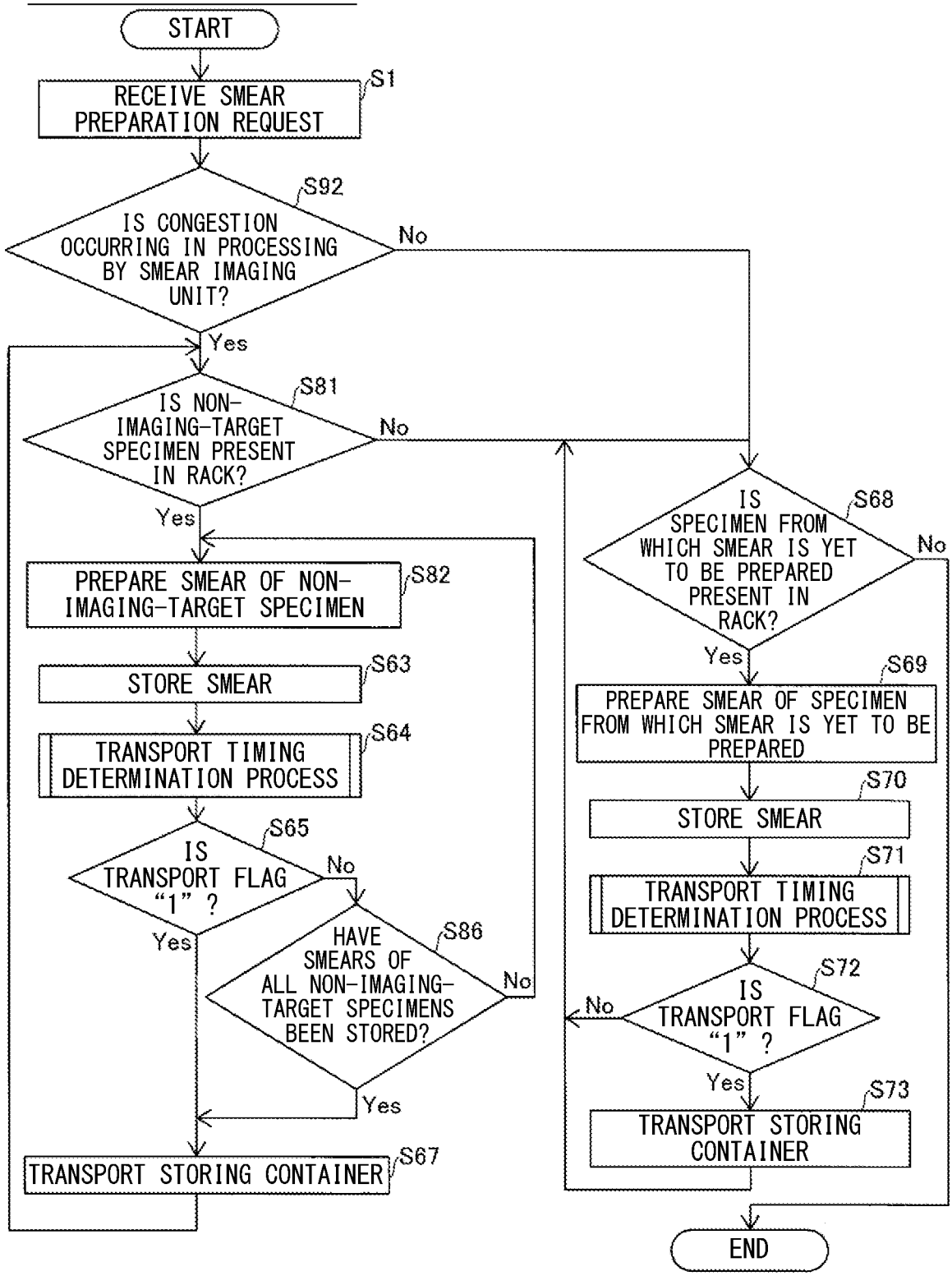
FIG. 29 is a flowchart showing smear preparation and transport operations by the smear preparation unit, according to a tenth modification.

In step S92 of FIG. 29, the first controller 70a determines whether or not congestion is occurring in imaging processing by the smear imaging unit 50. Whether or not congestion is occurring in imaging processing by the smear imaging unit 50 may be determined according to, for example: the condition that a storing container 3 is present at the first position C1; the condition that a storing container 3 is present at each of the first position C1 and the second position C2; or the condition that a storing container 3 is present at each of the first position C1 and the second position C2, or the elapsed time Te from the transport start time point of a previously transported storing container 3 is shorter than the required-for-arrival time T3. Whether or not congestion is occurring in imaging processing by the smear imaging unit 50 may be determined, on the basis of the remaining time Tr lasting until imaging processing for smears 1 in a storing container 3 that has started to be transported is ended, according to the condition that, for example, the remaining time Tr is longer than the required-for-arrival time T3.

When congestion is occurring in imaging processing by the smear imaging unit 50, the first controller 70a advances the process to step S81. In the same manner as in the above eighth modification, the first controller 70a performs steps S81, S82, S63 to S65, S86, and S67 to select a specimen container 7 that stores therein a second-type specimen and that is present in the specimen rack 8; and cause, with respect to the second-type specimen, precedent preparation of a smear, storing of the smear in a storing container 3, and transport of the storing container 3. Thereafter, in the same manner as in the above eighth modification, the first controller 70a performs steps S68 to S73 to cause, with respect to a remaining specimen from which a smear is yet to be prepared, subsequent preparation of a smear, storing of the smear in a storing container 3, and transport of the storing container 3.

Meanwhile, when congestion is not occurring in imaging processing by the smear imaging unit 50 in step S92, the first controller 70a advances the process to step S68. When transition from step S92 to step S68 occurs, specimens from which smears are yet to be prepared in step S68 refer to all specimens including imaging-target (first-type) specimens and non-imaging-target (second-type) specimens. Thus, through steps S68 to S73, smears 1 are prepared according to, for example, the sequence of the holding positions in the specimen rack 8 without determining whether or not the specimens are imaging targets.

As a result of the above process, in the tenth modification, the test system 100 can be controlled such that a nonimaging-target (second-type) smear 1 can be precedently prepared and supplied to the smear imaging unit 50 in the case where congestion is occurring in imaging processing by the smear imaging unit 50. Consequently, setting can be performed so as to enable a user to execute a microscopic test on a second-type smear 1 during execution of imaging processing by the smear imaging unit 50 in consideration of the processing situation of the smear imaging unit 50 (the fact that it takes time to enable checking of a smear image), whereby test tasks including also a microscopic test by a user can be performed smoothly and efficiently.

[Other Modifications]

For example, although an example in which the test system 100 is composed of the smear preparation unit 10, the container transport unit 30, and the smear imaging unit 50 has been shown in the embodiment described above, the present disclosure is not limited to this example. In the present disclosure, the test system 100 does not have to include the smear preparation unit 10. For example, an accumulation device in which storing containers 3 storing therein smears 1 are accumulated and each storing container 3 is transported to the container transport unit 30 upon arrival of the transport timing thereof may be provided instead of the smear preparation unit 10. In this case, a user may store manually-prepared smears 1 into a storing container 3 and set, in the accumulation device, the storing container 3 that stores therein the smears 1. Alternatively, the test system 100 may include, in addition to the smear preparation unit 10, the container transport unit 30, and the smear imaging unit 50, an analysis part which analyzes specimens stored in specimen containers 7 and a specimen transport part which transports a specimen rack 8 holding the specimen containers 7 to the analysis part and the smear preparation unit 10. The test system 100 may further include: a specimen loading unit which accumulates a specimen rack 8 holding pre-test specimen containers 7 and supplies the specimen rack 8 to the specimen transport part; and a specimen collection unit which accumulates a specimen rack 8 holding post-test specimen containers 7.

In addition, although the controller 70 of the smear preparation unit 10 determines, on the basis of a detection result from the detector 60, whether or not the smear 1 is an imaging target in the embodiment described above, image data obtained through imaging by the detector 60 may be transmitted to the host computer 200, and the host computer 200 may determine whether or not the smear 1 is an imaging target.

In addition, although the controller 70 (second controller 70b) of the smear preparation unit 10 controls the container transport unit 30 in the embodiment described above, a controller may be provided to each of the smear preparation unit 10 and the container transport unit 30. One controller may control the smear preparation unit 10, the container transport unit 30, and the smear imaging unit 50.

Figure 30:
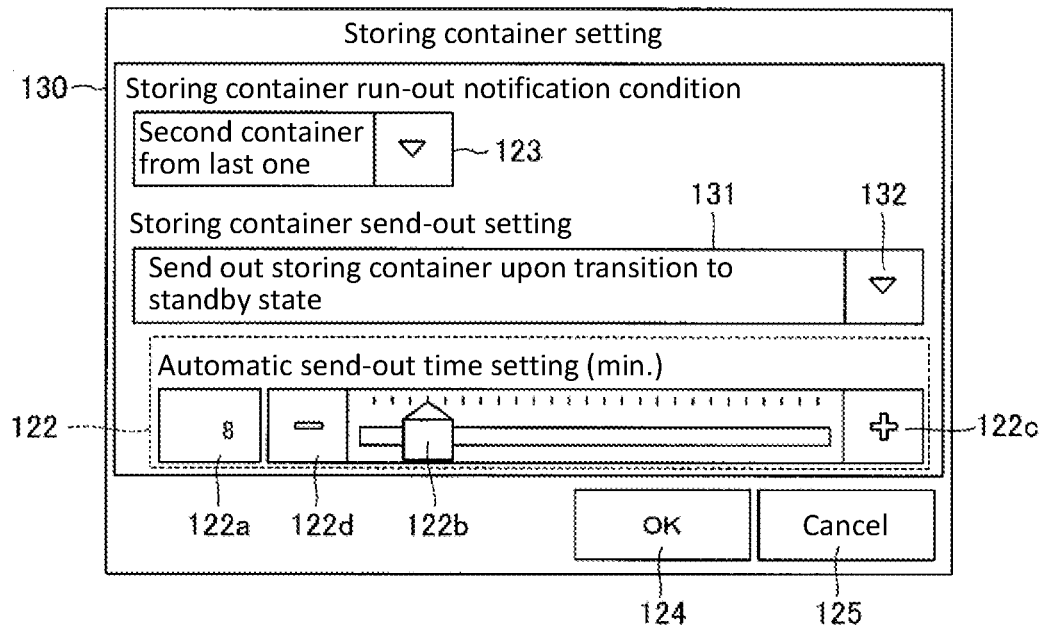
FIG. 30 shows another example of the transport mode setting screen.
Figure 31:
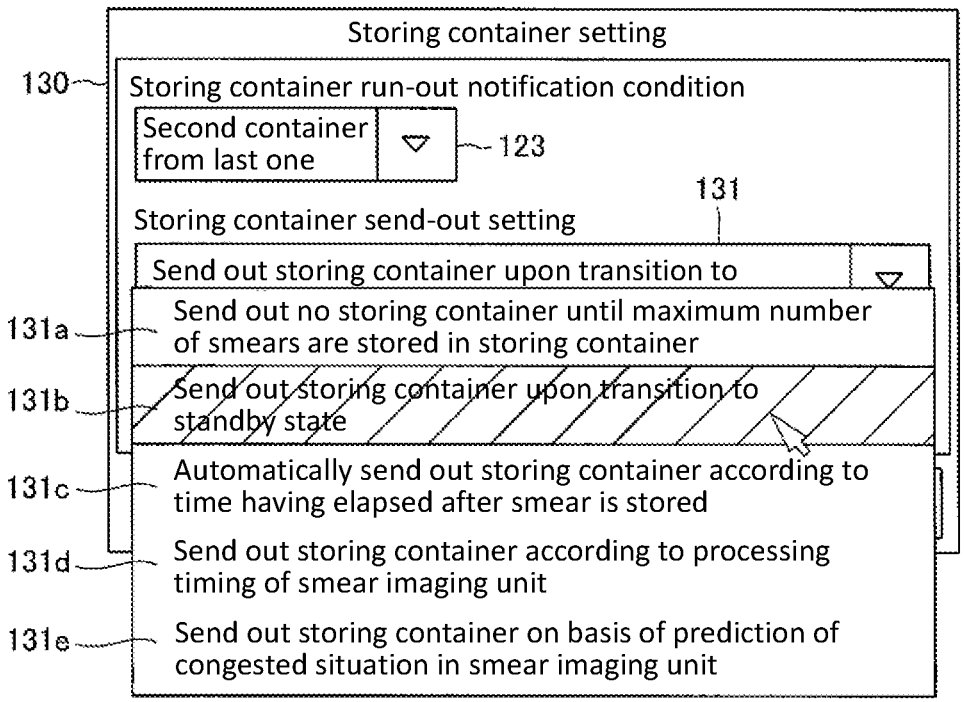
FIG. 31 shows the setting screen at the time of selecting a transport mode in FIG. 30.

In addition, although the choices 121a to 121e which are each of a radio button type enable selection of a transport mode in the setting screen 120 shown in FIG. 14, a selection portion 131 of a drop-down list type may enable selection of a transport mode as shown in FIG. 30 and FIG. 31. In the example in FIG. 30, when a button 132 of the selection portion 131 is selected (tapped), the selection portion 131 displays transport-mode choices 131a to 131e in the form of a list as shown in FIG. 31. When any of the choices 131a to 131e is selected (tapped), the first controller 70a receives selection of the transport mode. In FIG. 31, the selected transport mode is shown in a state of being hatched. When selection of any of the transport modes is received, the list is hidden in the selection portion 131. Consequently, the display mode is returned to that shown in FIG. 30, and content of the selected transport mode is displayed in a display field of the selection portion 131. FIG. 30 shows an example in which the text "Transport storing container upon transition to standby state" indicating the second transport mode is displayed. The display mode of the setting screen 120 may be one other than the modes shown in FIG. 14, FIG. 30, and FIG. 31.

Figure 32:
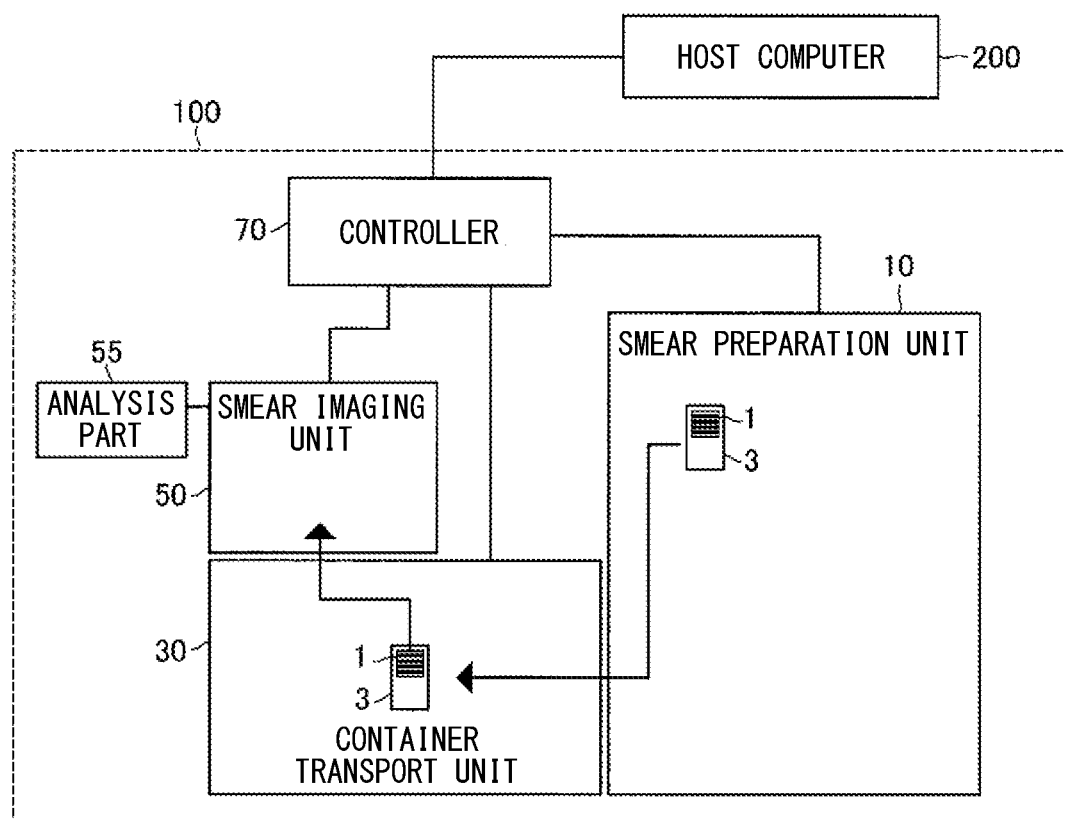
FIG. 32 is a schematic diagram showing a modification of a controller.

In addition, although the controller 70 (first controller 70a) of the smear preparation unit 10 performs transport control for storing containers 3 in the embodiment described above, the controller 70 may be provided separately from the smear preparation unit 10 as shown in FIG. 32. In FIG. 32, the controller 70 is provided as a control unit separate from the smear preparation unit 10, the container transport unit 30, and the smear imaging unit 50. In FIG. 32, the controller 70 controls each of the smear preparation unit 10, the container transport unit 30, and the smear imaging unit 50. Alternatively, a controller that performs transport control for storing containers 3 may be provided to the container transport unit 30 or the smear imaging unit 50.

Remarks

The present disclosure includes the following items 1-30:

Item 1: A control method for a test system including a smear imaging unit configured to image a smear of a specimen, the control method comprising: preparing a plurality of the smears; sequentially storing, in a storing container capable of storing therein a plurality of the smears, the smears having been prepared; and transporting, when information about a standby situation for imaging processing by the smear imaging unit satisfies a predetermined condition, the storing container that stores therein the smears to the smear imaging unit regardless of the number of the smears stored in the storing container.

Item 2: The control method for the test system, of item 1, wherein the information about the standby situation includes at least information about presence/absence of the storing container that is being transported and that is present at a predetermined position on a transport path, and the predetermined condition includes a condition that the storing container that is being transported is absent at the predetermined position.

Item 3: The control method for the test system, of item 2, wherein the predetermined position includes a first position at which each of the smears to be supplied to the smear imaging unit is taken out from the storing container, and a second position at which the storing container stands by to be transported to the first position, and the predetermined condition includes a condition that the storing container is absent at at least one of the first position and the second position.

Item 4: The control method for the test system, of item 3, wherein the predetermined condition includes a condition that the storing container is present at neither the first position nor the second position.

Item 5: The control method for the test system, of item 4, wherein the information about the standby situation includes information about a remaining time of imaging processing for the smears in the storing container that has started to be transported, and the predetermined condition includes a condition that, when the storing container is present at the first position, the remaining time is equal to or shorter than a predetermined time.

Item 6: The control method for the test system, of item 4, wherein the information about the standby situation includes information about a transport start time point of the storing container, and the predetermined condition further includes a condition regarding the transport start time point of the storing container that has been previously transported.

Item 7: The control method for the test system, of item 6, the control method further comprising controlling transport of the storing container such that transport of the storing container is not started when an elapsed time from the transport start time point of the storing container that has been previously transported is equal to or shorter than a required-for-arrival time required for the storing container to arrive at the first position from start of transport of the storing container.

Item 8: The control method for the test system, of item 7, wherein the smears include a first-type smear that is an imaging target and a second-type smear that is not an imaging target, and the predetermined condition includes a condition that, when the elapsed time from the transport start time point of the storing container that has been previously transported is longer than the required-for-arrival time, the first-type smear is present in the storing container that is located at a smear storing position.

Item 9: The control method for the test system, of item 5, wherein the test system further includes a detector configured to detect the smears stored in the storing container that has been transported toward the smear imaging unit, the control method further comprising obtaining the remaining time on the basis of a detection result, from the detector, regarding the smears stored in the storing container that has started to be transported and a time required for performing imaging processing on one of the smears.

Item 10: The control method for the test system, of item 1, wherein the information about the standby situation includes information about a remaining time of imaging processing for the smears in the storing container that has started to be transported, and the test system includes, in addition to the smear imaging unit, a smear preparation unit configured to prepare the smears and store, in the storing container, the smears having been prepared, the control method further comprising obtaining the remaining time on the basis of smear information about the smears stored, by the smear preparation unit, in the storing container that has started to be transported and a time required for performing imaging processing on one of the smears.

Item 11: The control method for the test system, of item 1, the control method further comprising: receiving selection of any transport mode from among a plurality of types of transport modes including at least a transport mode in which a transport condition including the predetermined condition is set; and transporting, when the transport condition having been set in the selected transport mode is satisfied, the storing container that stores therein the smears to the smear imaging unit.

Item 12: The control method for the test system, of item 11, wherein the plurality of types of transport modes include a first transport mode in which a transport timing is determined to have arrived when the information about the standby situation satisfies the transport condition including the predetermined condition, and a second transport mode in which the transport timing is determined to have arrived when the number of the smears stored in the storing container reaches a maximum storable number in the storing container.

Item 13: The control method for the test system, of item 1, the control method further comprising performing, when preparation of a plurality of the smears is started, transport control for the storing container based on whether or not the information about the standby situation for imaging processing satisfies the predetermined condition.

Item 14: A control method for a test system including a smear preparation unit configured to prepare a smear of a specimen and a smear imaging unit configured to image the smear, the control method comprising: setting one transport mode from among a plurality of transport modes; preparing a plurality of the smears; sequentially storing, in a storing container capable of storing therein a plurality of the smears, the smears having been prepared; and transporting the storing container that stores therein the smears from the smear preparation unit according to the transport mode having been set, wherein the plurality of transport modes include a mode of transporting, regardless of a transport situation of the storing container, the storing container that stores therein a maximum number of the smears capable of being stored in the storing container, and a mode of transporting, depending on the transport situation of the storing container, the storing container that stores therein the smears the number of which is smaller than the maximum number.

Item 15: A control method for a smear preparation device to be incorporated in a test system including a smear imaging unit configured to image a smear of a specimen, the control method comprising: preparing a plurality of the smears; sequentially storing, in a storing container capable of storing therein a plurality of the smears, the smears having been prepared; and sending out, when information about a transport situation of the storing container satisfies a predetermined condition, the storing container that stores therein the smears from the smear preparation device regardless of the number of the smears stored in the storing container.

Item 16: A test system comprising: a smear preparation unit configured to prepare a plurality of smears and sequentially store, in a storing container capable of storing therein a plurality of the smears, the plurality of smears having been prepared; a container transport unit configured to transport the storing container sent out from the smear preparation unit; a smear imaging unit configured to image the smears transported together with the storing container from the container transport unit; and a controller programmed to perform control to transport, when information about a standby situation for imaging processing by the smear imaging unit satisfies a predetermined condition, the storing container that stores therein the smears to the smear imaging unit regardless of the number of the smears stored in the storing container.

Item 17: The test system of item 16, wherein the information about the standby situation includes at least information about presence/absence of the storing container that is being transported and that is present at a predetermined position on a transport path of the container transport unit, and the predetermined condition includes a condition that the storing container that is being transported is absent at the predetermined position.

Item 18: The test system of item 17, wherein the predetermined position includes a first position at which each of the smears to be supplied to the smear imaging unit is taken out from the storing container, and a second position at which the storing container stands by to be transported to the first position, and the predetermined condition includes a condition that the storing container is absent at at least one of the first position and the second position.

Item 19: The test system of item 18, wherein the predetermined condition includes a condition that the storing container is present at neither the first position nor the second position.

Item 20: The test system of item 19, wherein the information about the standby situation includes information about a remaining time of imaging processing for the smears in the storing container that has started to be transported, and the predetermined condition includes a condition that, when the storing container is present at the first position, the remaining time is equal to or shorter than a predetermined time.

Item 21: The test system of item 19, wherein the information about the standby situation includes information about a transport start time point of the storing container, and the predetermined condition further includes a condition regarding the transport start time point of the storing container that has been previously transported.

Item 22: The test system of item 21, wherein the controller is programmed to control transport of the storing container such that transport of the storing container is not started when an elapsed time from the transport start time point of the storing container that has been previously transported is equal to or shorter than a required-for-arrival time required for the storing container to arrive at the first position from start of transport of the storing container.

Item 23: The test system of item 22, wherein the smears include a first-type smear that is an imaging target and a second-type smear that is not an imaging target, and the predetermined condition includes a condition that, when the elapsed time from the transport start time point of the storing container that has been previously transported is longer than the required-for-arrival time, the first-type smear is present in the storing container that is located at a smear storing position.

Item 24: The test system of item 20, further comprising a detector configured to detect the smears stored in the storing container that has been transported toward the smear imaging unit, wherein the controller is programmed to obtain the remaining time on the basis of a detection result, from the detector, regarding the smears stored in the storing container that has started to be transported and a time required for performing imaging processing on one of the smears.

Item 25: The test system of item 16, wherein the information about the standby situation includes information about a remaining time of imaging processing for the smears in the storing container that has started to be transported, and the controller is programmed to obtain the remaining time on the basis of smear information about the smears stored, by the smear preparation unit, in the storing container that has started to be transported and a time required for performing imaging processing on one of the smears.

Item 26: The test system of item 16, wherein the controller is programmed to receive selection of any transport mode from among a plurality of types of transport modes including at least a transport mode in which a transport condition including the predetermined condition is set, and transport, when the transport condition having been set in the selected transport mode is satisfied, the storing container that stores therein the smears to the smear imaging unit.

Item 27: The test system of item 26, wherein the plurality of types of transport modes include a first transport mode in which a transport timing is determined to have arrived when the information about the standby situation satisfies the transport condition including the predetermined condition, and a second transport mode in which the transport timing is determined to have arrived when the number of the smears stored in the storing container reaches a maximum storable number in the storing container.

Item 28: The test system of item 16, wherein the controller is programmed to perform, when preparation of a plurality of the smears by the smear preparation unit is started, transport control for the storing container based on whether or not the information about the standby situation for imaging processing satisfies the predetermined condition.

Item 29: A test system comprising: a smear preparation unit configured to prepare a plurality of smears and sequentially store, in a storing container capable of storing therein a plurality of the smears, the plurality of smears having been prepared; a container transport unit configured to transport the storing container that is sent out from the smear preparation unit; a smear imaging unit configured to image the smears transported together with the storing container from the container transport unit; and a controller programmed to perform control to transport the storing container that stores therein the smears from the smear preparation unit according to one transport mode having been set from among a plurality of transport modes, wherein the plurality of transport modes include a mode of transporting, regardless of a transport situation of the storing container, the storing container that stores therein a maximum number of the smears capable of being stored in the storing container, and a mode of transporting, depending on the transport situation of the storing container, the storing container that stores therein the smears the number of which is smaller than the maximum number.

Item 30: A smear preparation device capable of being combined with a test system including a smear imaging device, the smear preparation device comprising: a preparation process part configured to prepare a plurality of smears; a transfer part configured to sequentially store, in a storing container capable of storing therein a plurality of the smears, the plurality of smears having been prepared; a transport part configured to be connectable to another device forming the test system, and transport the storing container that stores therein the smears; and a controller programmed to perform control to send out, when information about a transport situation of the storing container satisfies a predetermined condition, the storing container that stores therein the smears from the transport part regardless of the number of the smears stored in the storing container.

What is claimed is:

1. A test system comprising:
   a smear maker configured to prepare smears each having a specimen smeared on a glass slide;
   a smear loader configured to store the prepared smears in storing containers, wherein each storing container has a maximum number of smears it can store therein;
   a smear imaging device configured to image the smears in the storing containers, wherein the storing containers store a variable number, up to the maximum number, of the prepared smears;
   a container transporter configured to receive the storing containers that store the variable number of the prepared smears and transport the received storing containers to the smear imaging device for imaging of the smears in the storing containers; and
   a controller programmed to: monitor an imaging process standby state inclusive of a number of the storing containers waiting on the container transporter to be transported to the smear imaging device for imaging of the smears in the storing containers;
   upon a determination that the imaging process standby state meets a predetermined condition, control the smear loader to stop loading the smears in one storing container before the smear loader loads the maximum number of the smears in said one storing container; and control the container transporter to transport said one storing container to the smear imaging device for imaging of the smears in said one storing container, regardless of a number of the smears stored in said one storing container being less than the maximum number, wherein the controller is programmed to monitor the imaging process standby state to determine a remaining time for the storing container being transported by the container transporter to complete imaging, by the smear imaging device, of all of the smears stored in the storing container being transported by the container transporter, and further wherein the predetermined condition requires the remaining time to be equal to or shorter than a predetermined time.

2. The test system of claim 1, wherein the controller is programmed to monitor the imaging process standby state to determine whether or not any storing containers are waiting at a predetermined position in the container transporter to be transported to the smear imaging device, and the predetermined condition requires no storing container waiting at the predetermined position in the container transporter.

3. The test system of claim 2, wherein the predetermined position includes a first position at which the smears are taken out from the storing container for transport to the smear imaging device, or a second position at which the storing container waits to be transported to the first position.

4. The test system of claim 3, wherein the predetermined condition requires the storing container waiting to be transported to the smear imaging device at either the first position or the second position.

5. The test system of claim 3, wherein the predetermined condition requires no storing container waiting to be transported to the smear imaging device at either the first position or the second position.

6. The test system of claim 5, wherein the controller is programmed to monitor the imaging process standby state to determine a start point in time at which a preceding storing container started to be transported.

7. The test system of claim 6, wherein the controller is programmed to monitor the imaging process standby state to determine whether an elapsed time from the start point in time at which the preceding storing container started to be transported is equal to or shorter than a required-for-arrival time that the storing container is expected to take to arrive at the first position after the start point in time.

8. The test system of claim 7, wherein the smears include a first type of smears that undergo imaging by the smear imaging device and a second type of smears that do not undergo imaging by the smear imaging device, and further wherein the predetermined condition requires determination of whether the smears being loaded in the storing container by the smear loader include the first type of smear, in response to a determination that the elapsed time after the start point in time at which the preceding storing container started to be transported is longer than the required-for-arrival time.

9. The test system of claim 8, further comprising a detector configured to identify each of the smears stored in the storing container being transported toward the smear imaging device to be either the first type of smear or the second type of smear, wherein the controller is programmed to calculate the remaining time using a number of the first type of smears stored in the storing container being transported toward the smear imaging device and an imaging time expected to take for one smear to undergo imaging by the smear imaging device.

10. The test system of claim 3, wherein the controller is programmed to monitor the imaging process standby state to determine a remaining time for the storing container being transported by the container transporter to complete imaging, by the smear imaging device, of all of the smears stored in the storing container being transported by the container transporter, further wherein the controller is programmed to calculate the remaining time using a number of the smears stored in the storing container being transported by the container transporter and an imaging time expected to take for one smear to undergo imaging by the smear imaging device.

11. The test system of claim 3, wherein the controller is programmed to receive a selection of a transport mode from among a plurality of transport modes regarding when to transport the storing containers to the smear imaging device, wherein the plurality of transport modes include a first transport mode in which the storing container starts to be transported before a number of the smears stored in the storing container reaches the maximum number, and a second transport mode in which the storing container does not start to be transported until the number of smears in the storing container reaches the maximum number.

\* \* \* \* \*